A1

US011429385B2

(12) United States Patent
Ghetie

(10) Patent No.: US 11,429,385 B2
(45) Date of Patent: *Aug. 30, 2022

(54) HARDWARE PROCESSORS AND METHODS FOR EXTENDED MICROCODE PATCHING AND RELOADING

(71) Applicant: Intel Corporation, Santa Clara, CA (US)

(72) Inventor: Sergiu D. Ghetie, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,434

(22) Filed: Dec. 29, 2018

(65) Prior Publication Data

US 2020/0210196 A1 Jul. 2, 2020

(51) Int. Cl.
*G06F 9/24* (2006.01)
*G06F 12/0875* (2016.01)
(Continued)

(52) U.S. Cl.
CPC ............. *G06F 9/24* (2013.01); *G06F 1/3203* (2013.01); *G06F 9/268* (2013.01); *G06F 12/0875* (2013.01)

(58) Field of Classification Search
CPC ...... G06F 1/3202; G06F 9/24; G06F 12/0875; G06F 9/268; G06F 9/328
See application file for complete search history.

(56) References Cited

U.S. PATENT DOCUMENTS 5,796,972 A * 8/1998 Johnson .................. G06F 8/66
712/208
5,950,012 A * 9/1999 Shiell ...................... G06F 8/64
712/209

(Continued)

FOREIGN PATENT DOCUMENTS

EP 2023240 A1 2/2009

OTHER PUBLICATIONS

Intel, "Intel® 64 and IA-32 Architectures Software Developer Manuals," Oct. 12, 2016, Updated—May 18, 2018, 19 pages.

(Continued)

*Primary Examiner* — David J. Huisman
(74) *Attorney, Agent, or Firm* — Nicholson De Vos Webster & Elliott LLP

(57) ABSTRACT

Hardware processors and methods for extended microcode patching through on-die and off-die secure storage are described. In one embodiment, the additional storage resources used for storing micro-operations are section(s) of a cache that are unused at runtime and/or unused by a configuration of a processor. For example, the additional storage resources may be a section of a cache that is used to store context information from a core when the core is transitioned to a power state that shuts off voltage to the core. Non-limiting examples of such sections are one or more sections for: storage of context information for a transition of a thread to idle or off, storage of context information for a transition of a core for a multiple core processor to idle or off, or storage of coherency information for a transition of a cache coherency circuit (e.g., cache box (CBo)) to idle or off.

63 Claims, 26 Drawing Sheets

(51) Int. Cl.
  *G06F 1/3203* (2019.01)
  *G06F 9/26* (2006.01)

(56) References Cited

U.S. PATENT DOCUMENTS

| | | | |
|---|---|---|---|
| 6,049,672 | A | 4/2000 | Shiell et al. |
| 8,296,528 | B2 | 10/2012 | Zimmer et al. |
| 2007/0088939 | A1 | 4/2007 | Baumberger et al. |
| 2007/0157036 | A1 | 7/2007 | Jahagirdar et al. |
| 2009/0235099 | A1* | 9/2009 | Branover ............... G06F 1/3203 713/322 |
| 2011/0131381 | A1* | 6/2011 | Kaplan ............... G06F 12/0875 711/141 |
| 2011/0296096 | A1 | 12/2011 | Zou et al. |
| 2012/0079304 | A1 | 3/2012 | Weissmann et al. |
| 2012/0254526 | A1* | 10/2012 | Kalyanasundharam ................... G06F 12/1441 711/104 |
| 2015/0067666 | A1* | 3/2015 | Henry ................... G06F 11/366 717/168 |

OTHER PUBLICATIONS

European Search Report and Search Opinion, EP App. No. 19209889.5, dated Jun. 3, 2020, 11 pages.

Taram et al., "Mobilizing the Micro-Ops: Exploiting Context Sensitive Decoding for Security and Energy Efficiency", 2018 ACM/IEEE 45th Annual International Symposium on Computer Architecture, 2018, pp. 624-637.

Hewlett-Packard Corporation, Intel Corporation, Microsoft Corporation, Phoenix Technologies Ltd., Toshiba Corporation, "Advanced Configuration and Power Interface Specification", Revision 5.0 Errata A, Nov. 13, 2013, 956 pages.

Intel (Registered) Architecture, "Instruction Set Extensions and Future Features Programming Reference," 319433-034, May 2018, 145 pages.

Intel, "6th Generation Intel (Registered) Processor Families for H-Platforms," Data sheet, vol. 1 of 2, 332986-010EN, Aug. 2018, 172 pages.

Intel, Intel (Registered) 64 and IA-32 Architectures Optimization Reference Manual, 248966-033, Jun. 2016, 672 pages.

Final Office Action, U.S. Appl. No. 16/932,682, dated Nov. 30, 2020, 17 pages.

Non-Final Office Action, U.S. Appl. No. 16/932,682, dated Aug. 14, 2020, 21 pages.

Office Action, EP App. No. 19209889.5, dated Feb. 15, 2022, 11 pages.

Non-Final Office Action, U.S. Appl. No. 16/932,682, dated Mar. 9, 2022, 9 pages.

\* cited by examiner

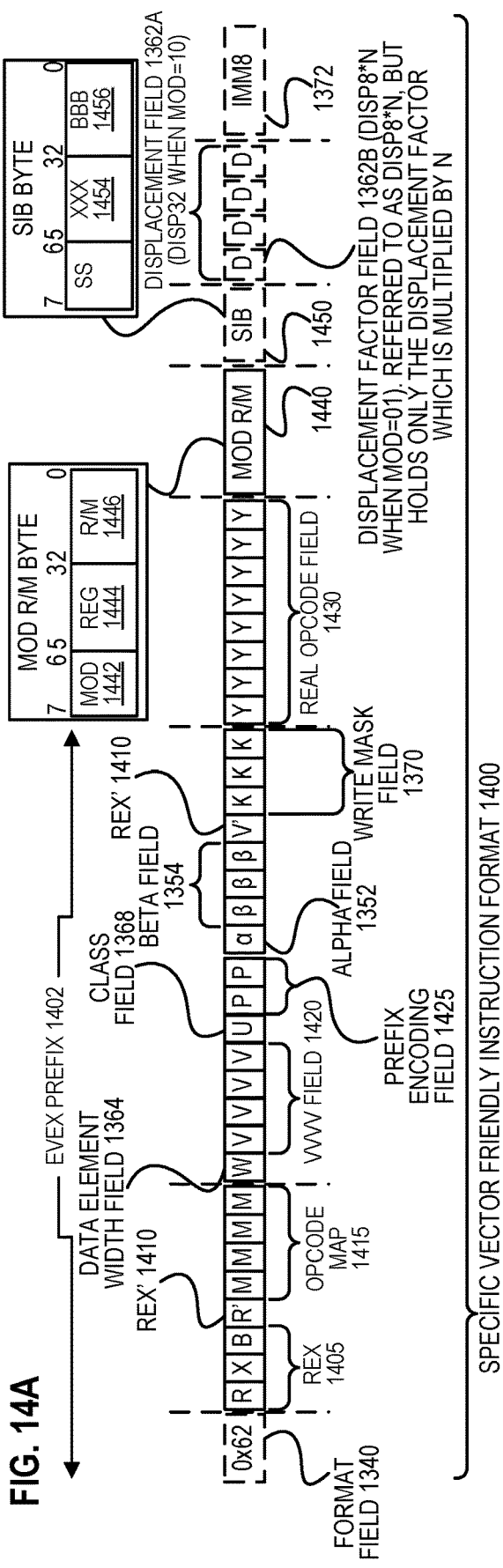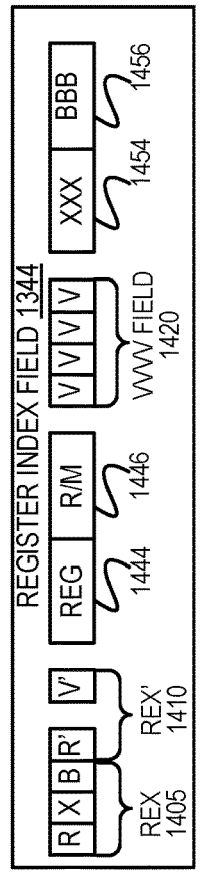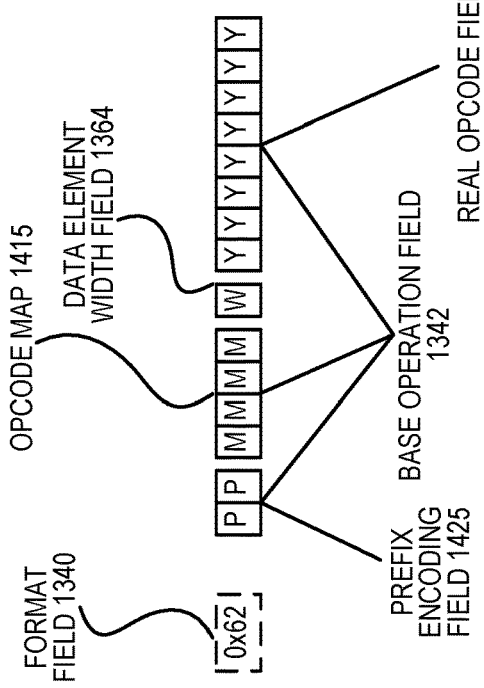

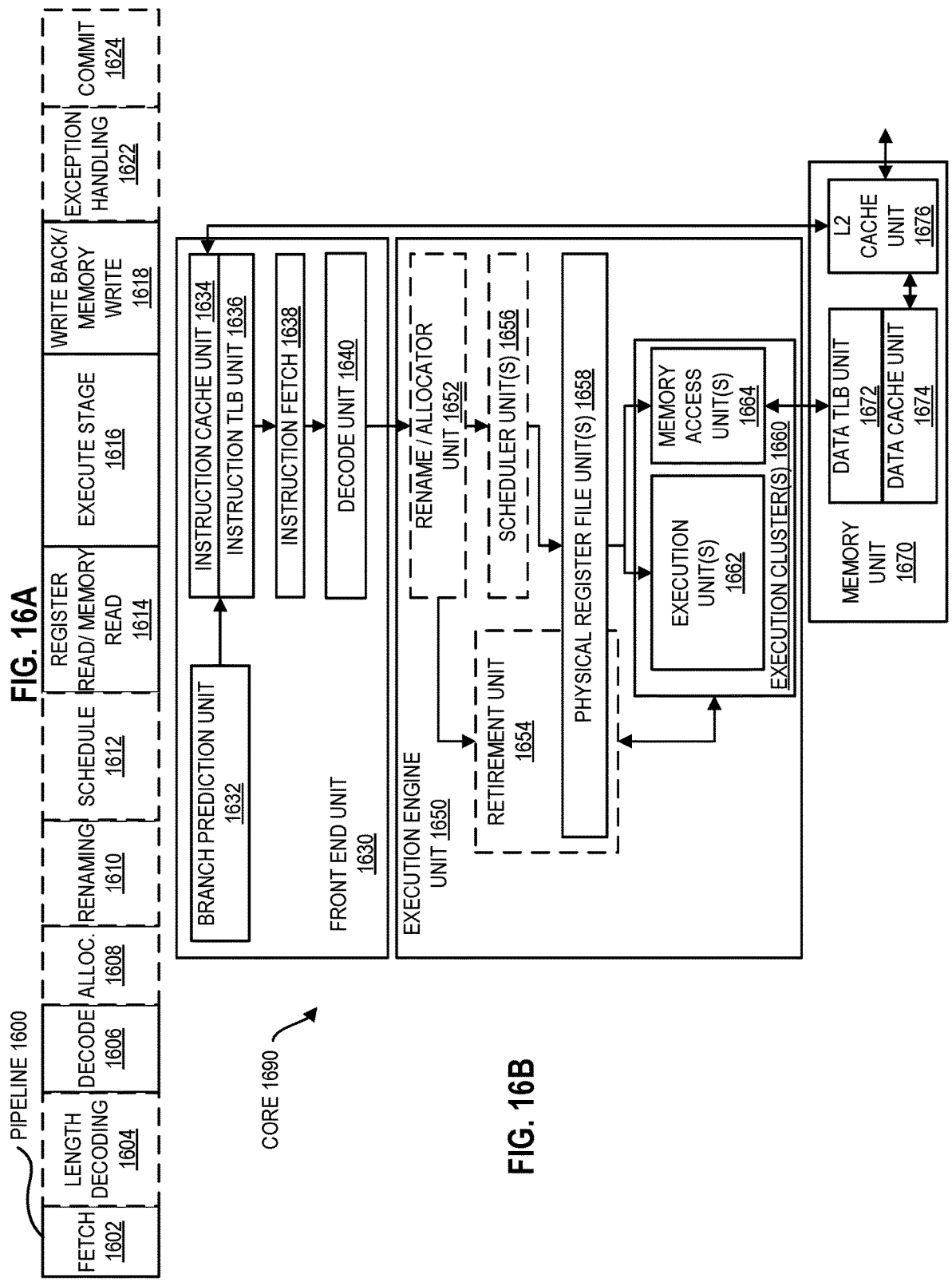

HARDWARE PROCESSORS AND METHODS FOR EXTENDED MICROCODE PATCHING AND RELOADING

TECHNICAL FIELD

The disclosure relates generally to electronics, and, more specifically, an embodiment of the disclosure relates to extended microcode patching for a core of a processor through on-die and off-die secure storage.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution.

BRIEF DESCRIPTION OF THE DRAWINGS

The present disclosure is illustrated by way of example and not limitation in the figures of the accompanying drawings, in which like references indicate similar elements and in which:

FIG. 14A is a block diagram illustrating fields for the generic vector friendly instruction formats in FIGS. 13A and 13B according to embodiments of the disclosure.

FIG. 14B is a block diagram illustrating the fields of the specific vector friendly instruction format in FIG. 14A that make up a full opcode field according to one embodiment of the disclosure.

FIG. 14C is a block diagram illustrating the fields of the specific vector friendly instruction format in FIG. 14A that make up a register index field according to one embodiment of the disclosure.

FIG. 16A is a block diagram illustrating both an exemplary in-order pipeline and an exemplary register renaming, out-of-order issue/execution pipeline according to embodiments of the disclosure.

FIG. 16B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
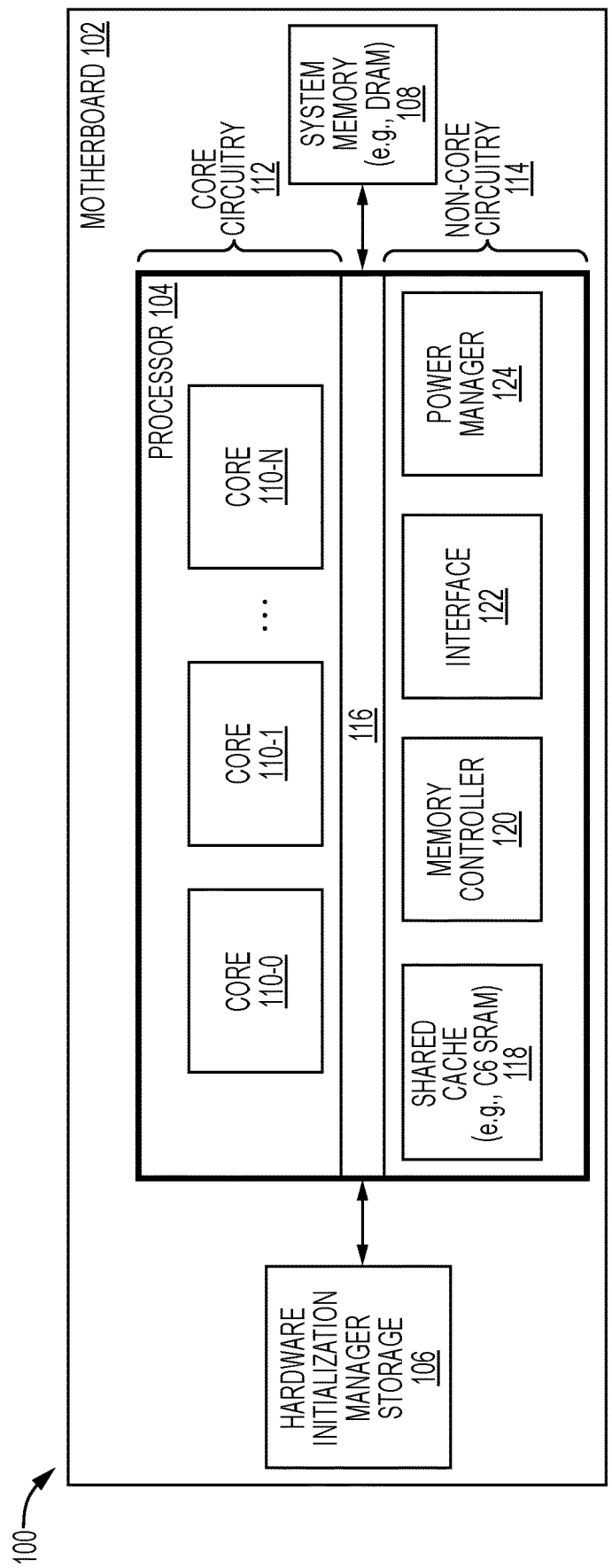
FIG. 1 illustrates a system including a motherboard with a hardware processor according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., a decoder circuit) to translate (e.g., decode) an instruction into one or more micro-operations (μops or micro-ops), for example, with these micro-operations directly executed by the hardware. One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA). In certain embodiments, the translation of an instruction into one or more micro-operations is associated with the instruction fetch and decode portion of a processor's pipeline.

In certain (e.g., out-of-order) processors, microcode (e.g., comprising micro-operations) is stored in a read-only memory (ROM) of the processor, for example, with the ROM generally referred to as a microcode ROM or μROM. Reading of microcode (e.g., reading of one or more micro-operations) out of a read-only memory is performed by a microcode sequencer (e.g., microcode sequencer circuit) of the processor. In one embodiment, the data (e.g., micro-operations) in the read-only memory is stored there during the manufacturing process, for example, the data is not modifiable (e.g., when in possession by a consumer). Thus, in certain embodiments, the non-modifiable nature of a read-only memory storing microcode prevents updates to that microcode.

Certain processors include a patch memory that is used to patch one or more micro-operations of the read-only memory. For example, where a processor is to, for an instruction that is to be executed, source a set of micro-operations for the instruction from the patch memory instead of the (e.g., obsolete) set of micro-operations for the instruction stored in the read-only memory. In certain embodiments, the data stored in the patch memory is modifiable (e.g., when in possession by a consumer).

In certain embodiments, the patch memory is within a microcode sequencer circuit (e.g., within a core of the processor) and thus places a practical limit on the size of the available patch memory. In one embodiment, the patch memory stores about 512 micro-operations. In certain embodiments, the read-only memory is within a microcode sequencer circuit and thus places a practical limit on the size of the available read-only memory. In one embodiment, the read-only memory stores about 40,000 micro-operations. As one example, multiple critical functionality or security issues that are to be fixed in the field via microcode patching (e.g., by patching to different micro-operations, which may be referred to as patch micro-code) may include providing a plurality (e.g., of a size greater than the patch memory) of micro-operations, and a fixed storage size (e.g., about 512 micro-operations) of patch memory may result in the inability to patch such critical issues.

Certain embodiments herein improve the functioning of a processor by extending microcode patching through on-die and off-die (e.g., secure) memory (e.g., storage elements). Certain embodiments herein provide additional storage resources for storing numerous (e.g., a thousand or thousands) of additional micro-operations, for example, micro-operations that are used for patching of critical issues and/or adding innovating features and capabilities after manufacturing (e.g., after product launch). In one embodiment, the additional storage resources used for storing micro-operations are section(s) of a cache that are unused at runtime and/or unused by a configuration (e.g., environment of use) of a processor. For example, the additional storage resources may be a section of a cache that is used to store context information from a core when the core is transitioned to a power state that shuts off voltage to the core. Non-limiting examples of such sections are one or more sections for: storage of context information for a transition of a thread (e.g., when a core supports multi-threading) to idle or off, storage of context information for a transition of a core (e.g., for a multiple core processor) to idle or off, or storage of coherency information for a transition of a cache coherency circuit (e.g., cache box (CBo)) to idle or off. For example, the additional storage resources, of a processor (e.g., core) used in a server configuration that does not utilize a graphics processor, may be a section of a cache that was reserved for storing context information for the graphics thread(s). For example, the additional storage resources, of a processor (e.g., core) that does not implement a virtual machine, may be a section of a cache that was reserved for storing context information for a virtual machine (e.g., a virtual machine control structure (VMCS)). Certain embodiments herein provide for (e.g., non-transitory storage for) enhanced patch code to allow (e.g., secure) use of additional storage resources for microcode patching. Examples of a processor having a core or cores utilizing extended microcode patching are initially discussed below in reference to FIGS. 1-3.

FIG. 1 illustrates a system 100 including a motherboard 102 with a hardware processor 104 according to embodiments of the disclosure. Depicted motherboard 102 includes a processor 104 coupled to hardware initialization manager (non-transitory) storage 106 and system memory 108 (e.g., dynamic random-access memory (DRAM)). In one embodiment, the hardware initialization manager (non-transitory) storage 106 stores hardware initialization manager firmware (e.g., or software). In one embodiment, the hardware initialization manager (non-transitory) storage 106 stores Basic Input/Output System (BIOS) firmware. In another embodiment, the hardware initialization manager (non-transitory) storage 106 stores Unified Extensible Firmware Interface (UEFI) firmware. In certain embodiments (e.g., triggered by the power-on or reboot of a processor), processor 104 executes the hardware initialization manager firmware (e.g., or software) stored in hardware initialization manager (non-transitory) storage 106 to initialize the processor for operation, for example, to begin executing an operating system (OS) and/or initialize and test the (e.g., hardware) components of system 100.

Figure 2:
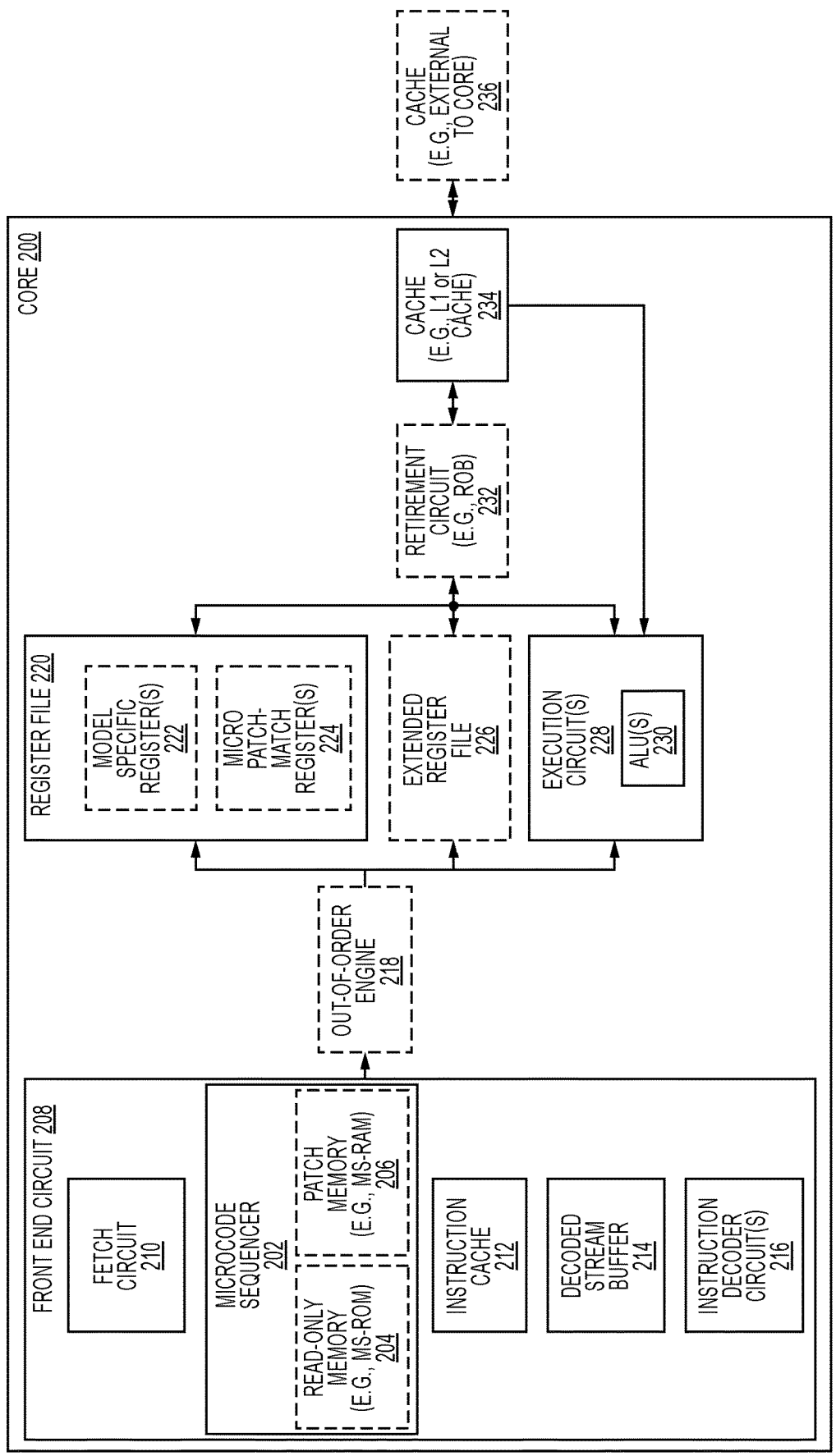
FIG. 2 illustrates a processor core coupled to a cache according to embodiments of the disclosure.
Figure 3:
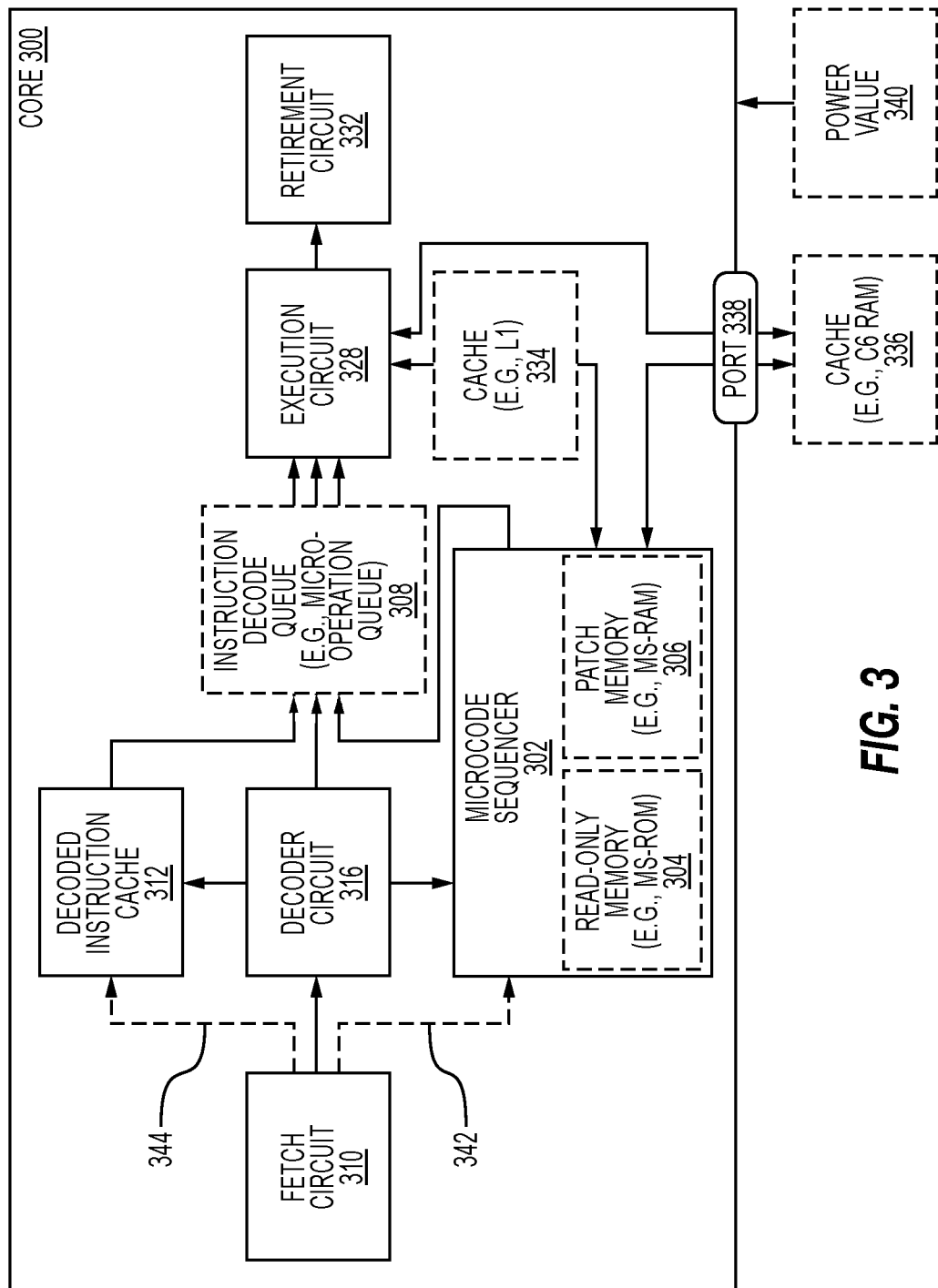
FIG. 3 illustrates a processor core according to embodiments of the disclosure.

Depicted processor 104 is a multicore processor including core circuitry 112 having a plurality of cores 110_0 to 110_N, where N is any integer. In another embodiment, processor only includes a single core. Cores 110_0 to 110_N may be coupled to each other via interconnect 116 or other electrical coupling. Each core may include the components discussed herein, for example, as shown in FIG. 2 or 3. Depicted processor 104 includes non-core circuitry 114 separate from (e.g., outside of) the core circuitry 112. Non-core circuitry 114 may include any combination of shared cache 118 (e.g., static random-access memory (SRAM)) (e.g., a last level cache), memory controller 120 (e.g., to maintain cache coherency in caches and/or fetch and retrieve data from system memory 108 or other memory), interface 122 (e.g., to provide a coupling to various components that are not part of processor 104), such as, but not limited to, peripheral devices, mass storage, etc.).

Each core may include its own (e.g., not shared) cache layer inside that core, for example, as shown in FIGS. 2 and 3. Each core (e.g., and individual components of that core) and/or other components of system 100 may be separately powered, for example, placed into or out of one of multiple power states. In certain embodiments, each power state is power state according to an Advanced Configuration and Power Interface (ACPI) standard (e.g., the Advanced Configuration and Power Interface (ACPI) Specification Revision 5.0A of Nov. 13, 2013). In certain embodiments, there are core states (c-states) for each core and/or processor (or package) states (p-states) for each processor.

Non-limiting examples of p-states are: P0 Performance State where a device or processor in this state uses its maximum performance capability and may consume maximum power, P1 Performance State where the performance capability of a device or processor is limited below its maximum (e.g., via lower voltage and/or frequency than P0) and consumes less than maximum power, up to the Pn Performance State where the performance capability of a device or processor is at its minimum level and consumes minimal power while remaining in an active state (e.g., where state n is a maximum number and is processor or device dependent). In certain embodiments, processors and devices define support for an arbitrary number of performance states (e.g., not to exceed 16).

Non-limiting examples of c-states are: C0 processor core power state (e.g., the operating power state) where the processor core is in an executing power state, C1 processor core power state where the processor core has a hardware latency low enough that the operating software does not consider the latency aspect of the state when deciding whether to use it (e.g., aside from putting the processor in a nonexecuting power state, this state has no other software-visible effects), C2 processor core power state that offers improved power savings over the C1 state (e.g., where the worst-case hardware latency for this state is provided via the ACPI system firmware and the operating software can use this information to determine when the C1 state should be used instead of the C2 state and/or aside from putting the processor core in a non-executing power state, this state has no other software-visible effects), and C3 processor core power state that offers improved power savings over the C1 and C2 states (e.g., where the worst-case hardware latency for this state is provided via the ACPI system firmware and the operating software can use this information to determine when the C2 state should be used instead of the C3 state and/or while in the C3 state, the processor's (e.g., core's) caches maintain state but ignore any snoops. For example, where the operating software is responsible for ensuring that the caches maintain coherency. Additional states may be defined by manufacturers for their processors. As one example, a C6 processor core power state may be used wherein the power (e.g., voltage) to the core is shut off, for example, where entry into the C6 state causes the core state (e.g., context information for the core and/or threads operating on that core) to be saved (e.g., to a dedicated C6 storage section in shared cache 118) before the core is shut off (e.g., core clocks are stopped and/or core voltage is reduced to zero Volts). As another example, a C7 processor core power state may be used that includes the C6 state changes but also where a last level cache (e.g., shared cache 118) is flushed. In one embodiment, power manager 124 (e.g., circuit) controls the power levels of the components of system 100 (e.g., cores), e.g., according to a power state. In one embodiment, an operating system executing on processor 104 requests the power state changes that are implemented by power manager 124.

A processor (e.g., each core thereof) may include a microcode sequencer. Certain embodiments herein improve the functioning of a processor by extending microcode patching by a microcode sequencer (e.g., circuit). Turning to FIGS. 2 and 3, examples of cores (e.g., where each core of cores 110_0 to 110_N of FIG. 1 is an instance of core 200 in FIG. 2 or core 300 in FIG. 3).

FIG. 2 illustrates a processor core 200 coupled to a cache 236 (e.g., a cache external to the core 200) according to embodiments of the disclosure. In one embodiment, cache 236 includes a dedicated section for storage of context information (e.g., core state, which is different than a core power state) from the core 200 when the core is transitioned (e.g., from an active power state) to a power state (e.g., C6 or C7 power state) that shuts off voltage to the core, but does not shut down the cache 236. Certain embodiments herein utilize cache 236 (e.g., a cache external to the core 200) to extend microcode patching by microcode sequencer 202 (e.g., circuit). Certain embodiments herein utilize the dedicated (e.g., C6 or C7) section of cache 236 (e.g., a cache external to the core 200) to extend microcode patching by microcode sequencer 202 (e.g., circuit). Certain embodiments herein utilize system memory (e.g., system memory 108 in FIG. 1) to further extend microcode patching by microcode sequencer 202 (e.g., circuit), for example, by utilizing the system memory to provide further (or back-up) storage for microcode patches for the microcode sequencer 202 (e.g., circuit).

Microcode sequencer 202 may include (i) a read-only memory 204 (ROM) therein (e.g., with the ROM generally referred to as a microcode ROM or microcode sequencer ROM (MS-ROM or MS-μROM)) 204 and/or (ii) a patch memory 206 therein (e.g., with the patch memory generally referred to as microcode sequencer writable memory or microcode sequencer random access memory (MS-RAM or MS-μRAM). In one embodiment, the read-only memory 204 of microcode sequencer 202 stores microcode (e.g., comprising micro-operations), for example, with the microcode sequencer 202 (e.g., microcode sequencer circuit) reading one or more micro-operations out of the read-only memory 204 in response to a request for those one or more micro-operations for the instruction (e.g., macro-instruction). In one embodiment, the micro-operations in the read-only memory 204 are stored there during the manufacturing process, for example, such that the data is not modifiable (e.g., when in possession by a consumer). Thus, in certain embodiments, the non-modifiable nature of a read-only memory storing microcode prevents updates to that microcode.

Certain processors include a patch memory 206 that is used to patch one or more micro-operations of the read-only memory 204. For example, where a processor is to, for an instruction that is to be executed, source a set of micro-operations for the instruction from the patch memory 206 instead of the (e.g., obsolete) set of micro-operations for the instruction stored in the read-only memory 204. In certain embodiments, the data stored in the patch memory 206 is modifiable (e.g., when in possession by a consumer).

Depicted core 200 includes front end circuit 208, which may be used to perform instruction fetch and to translate (e.g., decode) a fetched instruction into one or more micro-operations (pops or micro-ops), for example, with these micro-operations directly executed by the execution circuit(s) 228. Front end circuit 208 may include any combination of: fetch circuit 210 to fetch instructions that were requested for execution (e.g., by software), microcode sequencer 202 (e.g., that utilizes extended patching as disclosed herein), an instruction cache 212 (for example, that stores macro-instructions, e.g., as a backing store of instruction bytes), a decoded stream buffer 214 (e.g., decoded instruction cache) (e.g., to provide a stream of micro-operations for an instruction), and an instruction decoder circuit 216 (e.g., to perform decode operations to decode an instruction into micro-operation(s)). In one embodiment, the instruction decoder circuit 216 includes a plurality of instruction inputs and concurrently determines a set of one or more micro-operations for each instruction. In one embodiment, there are a first proper subset of the plurality of inputs of decoder circuit 216 that decode all instructions up to a certain number of micro-operations for each set (e.g., decode all instructions up to having 2, 3, 4, 5, 6, 7, 8, 9, 10, or any other number of micro-operations) and/or a second proper subset of the plurality of inputs of decoder circuit 216 that decode all instructions up to a different number of micro-operations for each set (e.g., decode only instructions that have a single micro-operation in their set). In certain embodiments, instructions having a set of micro-operations greater than a threshold number (e.g., 2, 3, 4, 5, 6, 7, 8, 9, 10, or any other number of micro-operations) are sent to the microcode sequencer 202 for it to determine the set of micro-operations for each instruction. Front end circuit 208 may include a queue for micro-operations at an output of the front end circuit 208. An instruction may be identified by its opcode, e.g., as discussed below. Decoded stream buffer 214 (e.g., decoded instruction cache) may receive an instruction (e.g., an opcode for that instruction) from a branch predictor circuit (e.g., branch predictor unit).

In certain embodiments, fetch circuit 210 fetches instructions (e.g., from memory or instruction cache 212) and feeds them to instruction decoder circuit 216 to decode them into micro-operations (e.g., primitives) for execution by the execution circuit(s) 228. In certain embodiments, microcode sequencer 202 interfaces with one or more of the various front end components to initiate and handle microcode fetches from wherever the microcode is stored, e.g., when the instruction decoder circuit 216 does not decode a given instruction. Streaming buffer 214 may be used to interface with a memory hierarchy to enable the fetch of instructions that miss in instruction cache 212. In one embodiment, an instruction is provided to the decoder circuit 216, which then causes a search of the decoded stream buffer 214 for the set of one or more micro-operations for that instruction. Additionally or alternatively, an instruction is provided to the decoder circuit 216, which (for example, when the set of micro-operations for that instruction are to exceed a threshold number or when the instruction is an instruction that is to be patched, e.g., with this information determined from a table of the circuitry for the instructions) then causes the microcode sequencer 202 to search for the set of one or more micro-operations. After the instruction is translated (e.g., decoded) into its set of one or more micro-operations, it is then sent to the execution circuit(s) 228 for execution in certain embodiments.

In FIG. 2, an optional out-of-order (OoO) engine 218 (e.g., circuit) is coupled between front end circuit 208 and execution circuits circuit(s) 228 (e.g., execution unit(s)). Out-of-order engine 218 may be used to receive the micro-operations and prepare them for execution. In one embodiment, out-of-order engine 218 may include various buffers to re-order micro-operation flow and allocate various resources used for execution, as well as to provide renaming of logical registers onto storage locations within various register files such as register file 220 and extended register file 226. Register file 220 may include separate register files for integer and floating-point operations. Register file 220 may include model specific register(s) 222 and/or micro patch-match register(s) 224. In one embodiment, model specific register(s) 222 are used as control registers, for example, to control operation of a core (e.g., to control operation of the microcode sequencer 202). Extended register file 226 may provide storage for vector data, e.g., 256 or 512 bits per register.

Various resources may be present in execution circuits 228, including, for example, one or more integer, floating point, or single instruction multiple data (SIMD) execution stacks (e.g., execution units), and/or other specialized hardware. For example, such execution circuits 228 may include one or more arithmetic logic units (ALUs) 230. In certain embodiments, results are provided to retirement circuit 232 (e.g., reorder buffer (ROB)). In one embodiment, retirement circuit 232 includes various arrays and circuitry to receive information associated with each instruction that is executed, and this information is then examined to determine whether the instruction can be validly retired and the resultant data committed to the architectural state of the processor, e.g., or whether one or more exceptions occurred that prevent a proper retirement of the instruction. Retirement circuit 232 may handle other operations associated with retirement.

In certain embodiments, the resultant data is saved into cache 234 of core 200 (e.g., as level 1 (L1) cache or level 2 (L2) cache) and/or into cache 236 separate from the core (for example, as a cache shared by multiple cores, e.g., shared L2 or shared level 3 (L3) cache). In one embodiment, a cache shared by multiple cores is powered separately from the cores, e.g., so that a single core may be powered down without powering down the shared cache (e.g., and thus not deleting the data stored in the shared cache).

In certain embodiments, an in-program order core 200 fetches instructions and decodes them into micro-operations (micro-ops) to feed the next pipeline stages with a continuous stream of micro-operations from the (e.g., most likely) path that the program will execute. In certain embodiments, an out-of-program-order core 200 includes an out-of-order engine 218 that reorders micro-ops to dataflow order so they can execute as soon as their sources (e.g., input operands) are ready and execution resources are available and retirement circuit 232 ensures that the results of execution of the micro-ops, including any exceptions they may have encountered, are visible according to the original program order.

FIG. 3 illustrates a processor core 300 according to embodiments of the disclosure. In one embodiment, cache 336 includes a dedicated section for storage of context information (e.g., core state, which is different than a core power state) from the core 300 (e.g., via port 338) when the core is transitioned (e.g., from an active power state) to a power state (e.g., C6 or C7 power state) that shuts off voltage to the core, but does not shut down the cache 336. In one embodiment, a power manager (e.g., power manager 124 in FIG. 1) provides a power value 340 to core to set the core into a power level (e.g., to turn on, lower without shutting off, and/or shut off power to the core).

Certain embodiments herein utilize cache 336 (e.g., a cache external to the core 300) to extend microcode patching by microcode sequencer 302 (e.g., circuit). Certain embodiments herein utilize the dedicated (e.g., C6 or C7) section of cache 336 (e.g., a cache external to the core 300) to extend microcode patching by microcode sequencer 302 (e.g., circuit). Certain embodiments herein utilize system memory (e.g., system memory 108 in FIG. 1) to further extend microcode patching by microcode sequencer 302 (e.g., circuit), for example, by utilizing the system memory to provide further (or back-up) storage for microcode patches for the microcode sequencer 302 (e.g., circuit).

Microcode sequencer 302 may include (i) a read-only memory 304 (ROM) therein (e.g., with the ROM generally referred to as a microcode ROM or microcode sequencer ROM (MS-ROM or MS-μROM)) 304 and/or (ii) a patch memory 306 therein (e.g., with the patch memory generally referred to as microcode sequencer writable memory or microcode sequencer random access memory (MS-RAM or MS-μRAM). In one embodiment, the read-only memory 304 of microcode sequencer 302 stores microcode (e.g., comprising micro-operations), for example, with the microcode sequencer 302 (e.g., microcode sequencer circuit) reading one or more micro-operations out of the read-only memory 304 in response to a request for those one or more micro-operations for the instruction (e.g., macro-instruction). In one embodiment, the micro-operations in the read-only memory 304 are stored there during the manufacturing process, for example, such that the data is not modifiable (e.g., when in possession by a consumer). Thus, in certain embodiments, the non-modifiable nature of a read-only memory storing microcode prevents updates to that microcode.

Certain processors include a patch memory 306 that is used to patch one or more micro-operations of the read-only memory 304. For example, where a processor is to, for an instruction that is to be executed, source a set of micro-operations for the instruction from the patch memory 306 instead of the (e.g., obsolete) set of micro-operations for the instruction stored in the read-only memory 304. In certain embodiments, the data stored in the patch memory 306 is modifiable (e.g., when in possession by a consumer).

Depicted core 300 includes fetch circuit 310 to fetch instructions that were requested for execution (e.g., by software), microcode sequencer 302 (e.g., that utilizes extended patching as disclosed herein), a decoded instruction cache 312 (for example, that provides a set of micro-operations for a previously decoded instruction), and an instruction decoder circuit 316 (e.g., to perform decode operations to decode an instruction into micro-operation(s)). In one embodiment, the instruction decoder circuit 316 includes a plurality of instruction inputs and concurrently determines a set of one or more micro-operations for each instruction. In one embodiment, there are a first proper subset of the plurality of inputs of decoder circuit 316 that decode all instructions up to a certain number of micro-operations for each set (e.g., decode all instructions up to having 3, 3, 4, 5, 6, 7, 8, 9, 10, or any other number of micro-operations) and/or a second proper subset of the plurality of inputs of decoder circuit 316 that decode all instructions up to a different number of micro-operations for each set (e.g., decode only instructions that have a single micro-operation in their set). In certain embodiments, instructions having a set of micro-operations greater than a threshold number (e.g., 3, 3, 4, 5, 6, 7, 8, 9, 10, or any other number of micro-operations) are sent to the microcode sequencer 302 for it to determine the set of micro-operations for each instruction. Core 300 may include an instruction decode queue 308 (e.g., micro-operation queue) to store micro-operations (e.g., from microcode sequencer 302, decoded instruction cache 312, instruction decoder circuit 316, or any combination thereof) and then input them to execution circuit(s) 328. An instruction may be identified by its opcode, e.g., as discussed below.

Fetch circuit 310 may send a fetched instruction to microcode sequencer 302 (e.g., via line 342), decoded instruction cache 312 (e.g., via line 344), instruction decoder circuit 316, or any combination thereof. In one embodiment, fetch circuit 310 sends a fetched instruction to instruction decoder circuit 316, and instruction decoder circuit 316 sends that instruction to microcode sequencer 302 (e.g., via line 342) and/or decoded instruction cache 312.

Certain arrows indicate two-way communication (e.g., to and from a component), but one-way communication may be used in certain embodiments. Certain arrows indicate one-way communication (e.g., to a component), but two-way communication may be used in certain embodiments.

In certain embodiments, fetch circuit 310 fetches instructions (e.g., from memory or an instruction cache) and feeds them to instruction decoder circuit 316 to decode them into micro-operations (e.g., primitives) for execution by the execution circuit(s) 328. In certain embodiments, microcode sequencer 302 interfaces with one or more of the core components to initiate and handle microcode fetches from wherever the microcode is stored, e.g., when the instruction decoder circuit 316 does not decode a given instruction. In one embodiment, an instruction is provided to the decoder circuit 316, which then causes a search of the decoded instruction cache 312 for the set of one or more micro-operations for that instruction. Additionally or alternatively, an instruction is provided to the decoder circuit 316, which (for example, when the set of micro-operations for that instruction are to exceed a threshold number or when the instruction is an instruction that is to be patched, e.g., with this information determined from a table of the circuitry for the instructions) then causes the microcode sequencer 302 to search for the set of one or more micro-operations. After the instruction is translated (e.g., decoded) into its set of one or more micro-operations, it is then sent (e.g., via optional instruction decode queue 308) to the execution circuit(s) 328 for execution in certain embodiments.

Various resources may be present in execution circuits 328, including, for example, one or more integer, floating point, or single instruction multiple data (SIMD) execution stacks (e.g., execution units), and/or other specialized hardware. For example, such execution circuits 328 may include one or more arithmetic logic units (ALUs). In certain embodiments, results are provided to retirement circuit 332. In one embodiment, retirement circuit 332 includes various arrays and circuitry to receive information associated with each instruction that is executed, and this information is then examined to determine whether the instruction can be validly retired and the resultant data committed to the architectural state of the processor, e.g., or whether one or more exceptions occurred that prevent a proper retirement of the instruction. Retirement circuit 332 may handle other operations associated with retirement.

In certain embodiments, the resultant data is saved into optional cache 334 of core 300 (e.g., as level 1 (L1) cache or level 3 (L2) cache) and/or into cache 336 separate from the core (for example, as a cache shared by multiple cores, e.g., shared L2 or shared level 3 (L3) cache). In one embodiment, cache 336 is powered separately from core 300, e.g., so that core 300 may be powered down without powering down the cache 336 (e.g., and thus not deleting the data stored in the shared cache). An example of how a microcode sequencer utilizes certain storage (e.g., memory and cache) to extend microcode patching.

Figure 4:
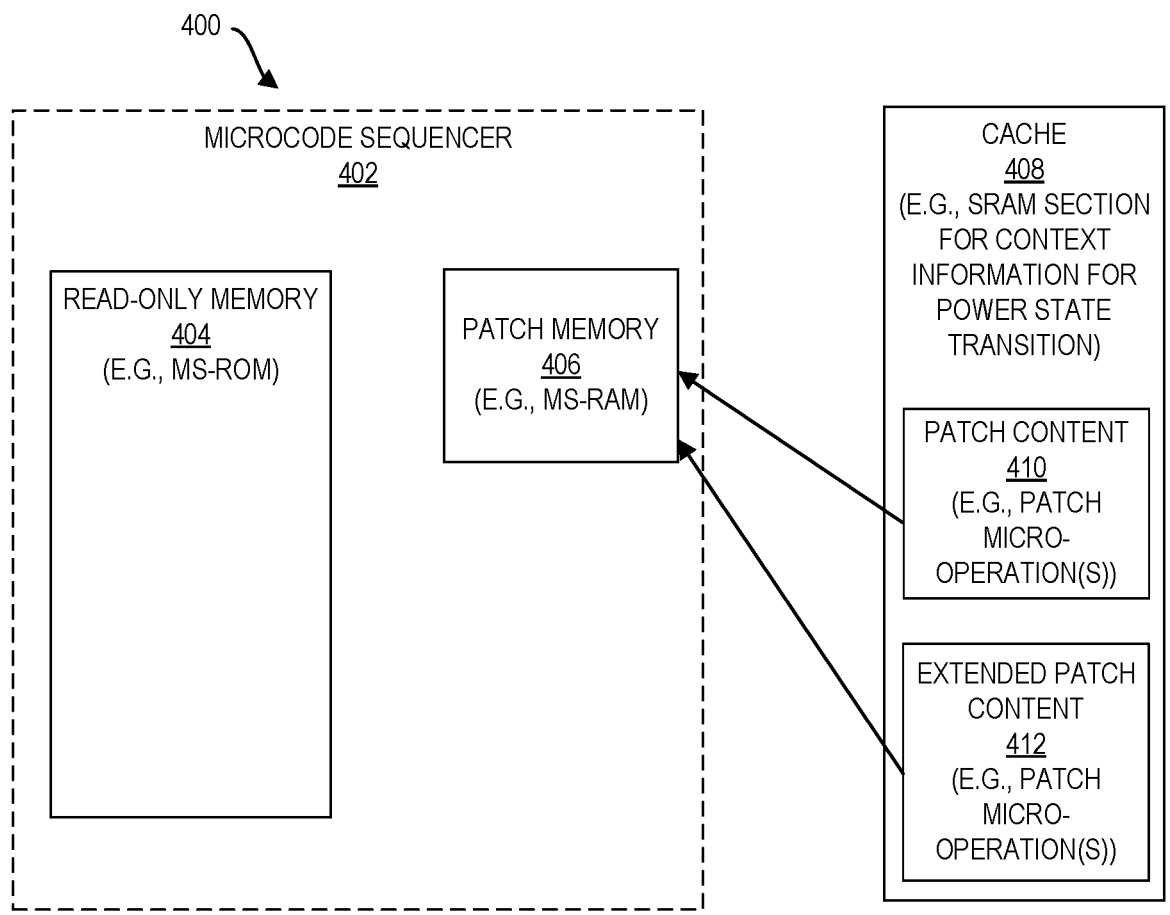
FIG. 4 illustrates a system including a read-only memory, a patch memory, and a cache according to embodiments of the disclosure.

FIG. 4 illustrates a system 400 including a read-only memory 404, a patch memory 406, and a cache 408 according to embodiments of the disclosure. In certain embodiments, system 400 utilizes cache 408 to extend microcode patching. In certain embodiments, read-only memory 404 (ROM) (e.g., with the ROM generally referred to as a microcode ROM or microcode sequencer ROM (MS-ROM or MS-µROM)) 404 and/or (ii) a patch memory 406 (e.g., with the patch memory generally referred to as microcode sequencer writable memory or microcode sequencer random access memory (MS-RAM or MS-µRAM) are located within a microcode sequencer 402 (e.g., microcode sequencer circuit) and/or are reserved for exclusive use (e.g., and/or access) by the microcode sequencer 402. In one embodiment, microcode sequencer 402 is an instance of microcode sequencer 202 in FIG. 2 or microcode sequencer 302 in FIG. 3. In one embodiment, the read-only memory 404 of microcode sequencer 402 stores microcode (e.g., comprising micro-operations), for example, with the microcode sequencer 402 (e.g., microcode sequencer circuit) reading one or more micro-operations out of the read-only memory 404 in response to a request for those one or more micro-operations for an instruction (e.g., macro-instruction). In one embodiment, the micro-operations in the read-only memory 404 are stored there during the manufacturing process, for example, such that the data is not modifiable (e.g., when in possession by a consumer). Thus, in certain embodiments, the non-modifiable nature of a read-only memory storing microcode prevents updates to that microcode. Certain processors include a patch memory 406 that is used to patch one or more micro-operations of the read-only memory 404. For example, where a processor is to, for an instruction that is to be executed, source a set of one or more micro-operations for the instruction from the patch memory 406 instead of the (e.g., now obsolete) set of micro-operations for the instruction stored in the read-only memory 404. In certain embodiments, the data stored in the patch memory 406 is modifiable (e.g., when in possession by a consumer).

In certain embodiments, the patch memory 406 is within a microcode sequencer circuit (e.g., within a core of the processor) and thus places a limit on the size of the available patch memory. In one embodiment, the patch memory 406 stores about 512 micro-operations. In certain embodiments, the read-only memory 404 is within a microcode sequencer circuit and thus places a practical limit on the size of the available read-only memory. In one embodiment, the read-only memory stores about 40,000 micro-operations. As one example, multiple critical functionality or security issues that are to be fixed in the field via microcode patching (e.g., by patching to different micro-operations, which may be referred to as patch micro-code) may include providing a plurality (e.g., of a size greater than the patch memory) of micro-operations, and a fixed storage size (e.g., about 512 micro-operations) of patch memory 406 may result in the inability to patch such critical issues.

Certain embodiments herein improve the functioning of system 400 by extending microcode patching through on-die and off-die (e.g., secure) memory (e.g., storage elements).

Certain embodiments herein provide additional storage resources in cache 408 for storing numerous (e.g., a thousand or thousands) of additional micro-operations. Cache 408 may include a copy of the micro-operations (e.g., patches) for patch memory 406, e.g., to restore the content of volatile patch memory 406 that is lost when the power is lowered from it and the cache 408 is non-volatile or does not have its power lowered to a level that causes a loss of content. Certain embodiments herein include storage of extended patch content 412 (e.g., patch micro-operations). In one embodiment, microcode sequencer 402 executes code that causes a copy of data from cache 408 to patch memory 406. However, as real-world resources may be limited in a system 400, such that the solution is not merely to allocate new storage that is used only for storing extended patch content, certain embodiments herein utilize (e.g., scavenge) section(s) of memory that have other uses as well. In one embodiment, the storage used for extended patch content (e.g., micro-operations) is not user accessible, e.g., for security purposes.

Certain embodiments herein leverage on-die secure storage in cache (e.g., in C6 SRAM) for extended patch content (e.g., micro-operations). A first mode of extended patching (e.g., a "ghost" patch embodiment) uses a section of cache (e.g., in C6 SRAM) that is not used in runtime, idle time, and/or off time for a core. A second mode of extended patching (e.g., a "super-ghost" patch embodiment) uses a section of cache (e.g., in C6 SRAM) that is not used in runtime for a core (e.g., storage that is used to store context information from the core when the core is transitioned to a power state that shuts off voltage to the core) (e.g., thread 0, thread 1, to thread N in C6 SRAM) and may also be stored (e.g., encrypted with integrity) in external storage (e.g., DRAM) (e.g., system memory 108 in FIG. 1). The micro-operations of the extended patch content may be called ghost micro-operations as they are not located in the patch memory (e.g., MS-RAM) but in cache (e.g., C6 SRAM) or in system memory (e.g., DRAM). A third mode of extended patching (e.g., an "uber-ghost" patch embodiment) allows for the dynamic selection (e.g., via a control register) of a proper subset of enhanced patch components of the first mode or the second mode of extended patching, e.g., depending on the platform configuration and/or workload requirements. In certain embodiments, the third mode of extended patching allows a user to dynamically select specific pieces of performance-sensitive functionality at runtime from a unified, extended microcode patch with first mode or second mode components depending on the platform configuration and/or workload requirements.

Certain embodiments of microcode patching are extended by storing a (e.g., small) microcode routine (e.g., code including a set of micro-operations, which may be referred to as enhanced patch code) in patch memory that, when executed, causes one or more of the patch micro-operations of the extended patch content to be stored (e.g., copied) from the extended patch storage (e.g., C6 power state storage section of cache) into the patch memory, for example, for use by a micro-code sequencer to translate (e.g., decode) a patched instruction. Note that enhanced patch code may refer to the micro-operations that cause the extending of storage, but extended patch storage may refer to storage for the micro-operations that are used as the patch itself for an instruction (e.g., that change the functionality of the instruction).

In one embodiment, the microcode routine (e.g., code including a set of micro-operations, which may be referred to as enhanced patch code) may be any combination of:

called from different patch points, gets exclusive access to execution resources so only one (e.g., central-processing unit (CPU) or logical core) thread is executing, loads (e.g., copies without destroying) a (e.g., given) number of micro-operations per instruction from the extended patch storage into the patch memory, executes those micro-operations for the instruction, restores any micro-operations (that were overwritten by the load) from the copy of the previous patch memory data (e.g., patch content 410 in FIG. 4) (e.g., where they were stored at microcode patch load time), releases exclusive access, and returns after the patch point that called the microcode routine (e.g., ghost, super-ghost, or uber-ghost patch routine). In one embodiment of the third mode of patching (e.g., an "uber-ghost" patch embodiment), a microcode sequencer performs dynamic reconfiguration of runtime patch memory (e.g., MS-RAM) to include performance-sensitive micro-operation sections grouped per function (e.g., per macro-instruction) that the platform owner can select via a software interface (e.g., a control register) from a microcode patch function menu of multiple functions selectable but that cannot all fit in the runtime patch memory (e.g. there may be two performance-sensitive functions included in the microcode patch as components 1 and 2 but either 1 or 2, not both, can fit in the runtime patch memory).

In certain embodiments, microcode patching is extended (e.g., to allow storage of numerous micro-operations that can be used to address critical functionality and security bugs or drive innovative capabilities post product launch) by leveraging (i) completely unused sections of a cache (e.g., the C6 power state section of the cache) (e.g., in a "ghost" patch embodiment) and/or (ii) unused at runtime sections of a cache (e.g., the C6 power state section of the cache) and system memory (e.g., DRAM back-up of C6 SRAM) (e.g., in a "super-ghost" patch embodiment).

In certain embodiments, the patch swapping may have a performance penalty due to single thread execution for the copying of the extended patch content from cache (e.g., C6 SRAM) into the patch memory (e.g., MS-RAM) and then copying of the runtime patch content (e.g., patch content 410 from FIG. 4) from cache (e.g., C6 SRAM) into the patch memory (e.g., MS-RAM), but there are a plurality of functional and security fixes that are not latency sensitive or that are infrequently invoked (e.g., filtering of processor accesses to devices, such as the platform controller hub (PCH), that may take thousands of core cycles to complete) that can fully benefit from extended patch capability.

Certain processor cores (e.g., for client use or for server use) may employ on-die storage (e.g., a section of cache that is used to store context information for a power state change) that is used to store thread, core, and/or non-core circuitry state (e.g., context information) for various environments (e.g., a runtime or other copy of the microcode patch of patch memory, thread state for (e.g., TC6/TC7) low power states, core state for (e.g., CC6/CC7) low power states, virtual machine caching structure (VMCS) state, graphics state storage (e.g., for a graphics thread (GT)), a section that is used when not in runtime, but is not used during runtime, storage of coherency information for a transition of a cache coherency circuit (e.g., cache box (CBo)) (e.g., low power package states), thread state when entering system management mode (SMM), etc.).

For example, a processor core for server use may include an unused section of the cache (e.g., C6 SRAM) called the address hole with storage behind it and/or other unused sections of the cache (e.g., C6 SRAM) (e.g. graphics state storage when the server does not perform graphics processing), and these unused sections of the cache (e.g., C6 SRAM) can be used to store additional microcode patch micro-operations contents (e.g., in a "ghost" patch embodiment). In one embodiment, the extended patch content are micro-operations used to patch an instruction, and the extended patch content is part of the microcode patch binary image that is encrypted and signed by a manufacturer, and at patch load time after the successful authentication of the patch, it is written into an unused section of the cache (e.g., C6 SRAM). In certain embodiments, the extended patch content (e.g., also) includes a list of micro patch-match registers (e.g., that when a bit(s) is set) causes an intercept (e.g., interrupt) of processor execution and calls for execution of enhanced patch code (e.g., "ghost" patch routine) from any flow that is desired to use the extended patching (e.g., "ghost" patch) functionality. In one embodiment, a micro-patch match register includes a bit or bits. In one embodiment, a microcode patch loader code, when executed, causes a copy of the patch memory (e.g., the runtime section of the microcode patch that includes micro-operations and micro patch-match registers) to be saved in a section of the cache (e.g., C6 SRAM), for example, with the extended patch content saved in a different section. In certain embodiments, the enhanced patch code (e.g., the "ghost" patch routine part of the runtime MS-RAM) gets exclusive access so that only one thread is executing (e.g., in a core), then copies a requested section of the extended patch content (e.g., patch micro-operation(s)) from the corresponding location in the cache (e.g., C6 SRAM) into the patch memory (e.g., MS-RAM). In one embodiment, the core will execute the patch micro-operation(s) from patch memory (e.g., MS-RAM) (e.g., patch memory 206 in FIG. 2, patch memory 306 in FIG. 4, or patch memory 406 in FIG. 4) and at the end will copy back into the (e.g., runtime) patch memory (e.g., MS-RAM) the "original" micro-operations from the copy of the patch memory (e.g., the runtime section of the microcode patch that includes micro-operations and micro patch-match registers) stored in another section of the cache (e.g., C6 SRAM) (e.g., from patch content 410 in FIG. 4), and may then release exclusive access and return to the interrupted flow.

In certain embodiments, a microcode update populates both the patch memory (e.g., MS-RAM 206 in FIG. 2) and match register(s) (e.g., micro patch-match register(s) 224 in FIG. 2) that act as breakpoints within the read-only memory (e.g., MS-ROM 204 in FIG. 2), to allow jumping to the updated micro-operation(s) in the patch memory (e.g., MS-RAM 206 in FIG. 2). In one embodiment, a match operation is performed for each micro-operation (that is requested to be executed) against the micro-operations identified by the match register(s) as including a patch (for example, by comparing a micro-operation pointer (e.g., microcode instruction pointer (UIP)) to all of a plurality of pointers stored in match registers for patched micro-operations) and with any match resulting in a jump (e.g., of execution) to the corresponding destination micro-operation address in the patch memory. In one embodiment, a match then triggers execution of code (e.g., microcode patch match trigger code 512 in FIGS. 5A-5C). In one embodiment, a match register includes a microcode match address (for example, a micro-operation address of the read only-memory, e.g., an address for a particular micro-operation in the MS-ROM 204 in FIG. 2) and a microcode destination address of the patch memory (e.g., address for a patched micro-operation(s) in the MS-RAM 206 in FIG. 2).

In certain embodiments, the subset of (e.g., less than all of) the extended patch content (e.g., micro-operation(s)) copied from the extended patch storage section of the cache (e.g., C6 SRAM) into patch memory (e.g., MS-RAM) depends on the function calling the enhanced patch code. In one embodiment, execution of the enhanced patch code causes loading (e.g., copying) of only a subset of less than all of the extended patch content (e.g., micro-operation(s)) for performance reasons.

For example, a processor core for client use may not have enough unused space in the section of the cache (e.g., C6 SRAM), and utilize one of the other patch extension modes discussed herein (e.g., the second or third mode). For example, a processor core for server use may need more microcode patch storage space than what is available in previously unused sections of the cache (e.g., C6 SRAM). In one embodiment, a second mode of patching micro-operations uses existing sections of the cache (e.g., C6 SRAM) that are used when the core/thread is in a low power state but are not used at runtime (e.g., where a thread/core cannot be simultaneously in both an active and a sleep state, such as TC6 or TC7 or CC6 or CC7). In one embodiment when the second mode is enabled, the hardware initialization manager (e.g., BIOS) or software (e.g., OS or virtual machine monitor (VMM)) allocates a reserved area in the system memory (e.g., main memory) (e.g., DRAM) via a control register (e.g., model specific register (MSR) interface).

In one embodiment when the second mode is enabled, at the patch load time, if the reserved area was allocated prior to the microcode patch load trigger operation, the load time microcode patch section will store the extended patch content (e.g., micro-operations) in the corresponding thread's context information storage section (e.g., for TC6/TC7 low power states) of the cache (e.g., C6 section of SRAM) and will also store it encrypted with integrity protection in the reserved area in the system memory. In certain embodiments, low power state exit code (e.g., restoration code) (e.g., implementing the TC6/TC7 exit restoration) causes the loading (e.g., copying) of the encrypted version of the extended patch content from the system memory, decrypting it, and storing (e.g., if authenticated) of the decrypted extended patch content back into the context information storage section (e.g., for TC6/TC7 low power states) of the cache (e.g., C6 SRAM). In one embodiment, the low power state exit code is stored in a (e.g., different) section of the cache (e.g., C6 SRAM), for example, that is previously unused in the cache. In one embodiment, the encryption is performed with an (e.g., 128-bit) encryption algorithm (e.g., of the Advanced Encryption Standard (AES)) key generated by an on-die digital random number generator (DRNG), the initialization vector (IV) is a same number of bits (e.g., 128-bit) value generated by the on-die digital random number generator (DRNG), the computed key schedule and IV are stored in (e.g., fast scratchpad) registers located in the core, and the integrity is computed based on the (e.g., AES-Galois/Counter Mode (AES-GCM)) encryption algorithm. In one embodiment, a thread will enter unbreakable shutdown in case the microcode patch integrity check failed.

In certain embodiments, at runtime, a second mode of extended patching (e.g., a "super-ghost" patch embodiment) functions the same as a first mode of extended patching (e.g., a "ghost" patch embodiment) except the extended patch content is being copied from a same location that is also used to store a thread's or core's context information when the thread or core, respectively, is not in runtime, for example, instead of copying the extended patch content from a previously unused (e.g., it was a "hole" that was not set aside for any use) section.

Figure 9:
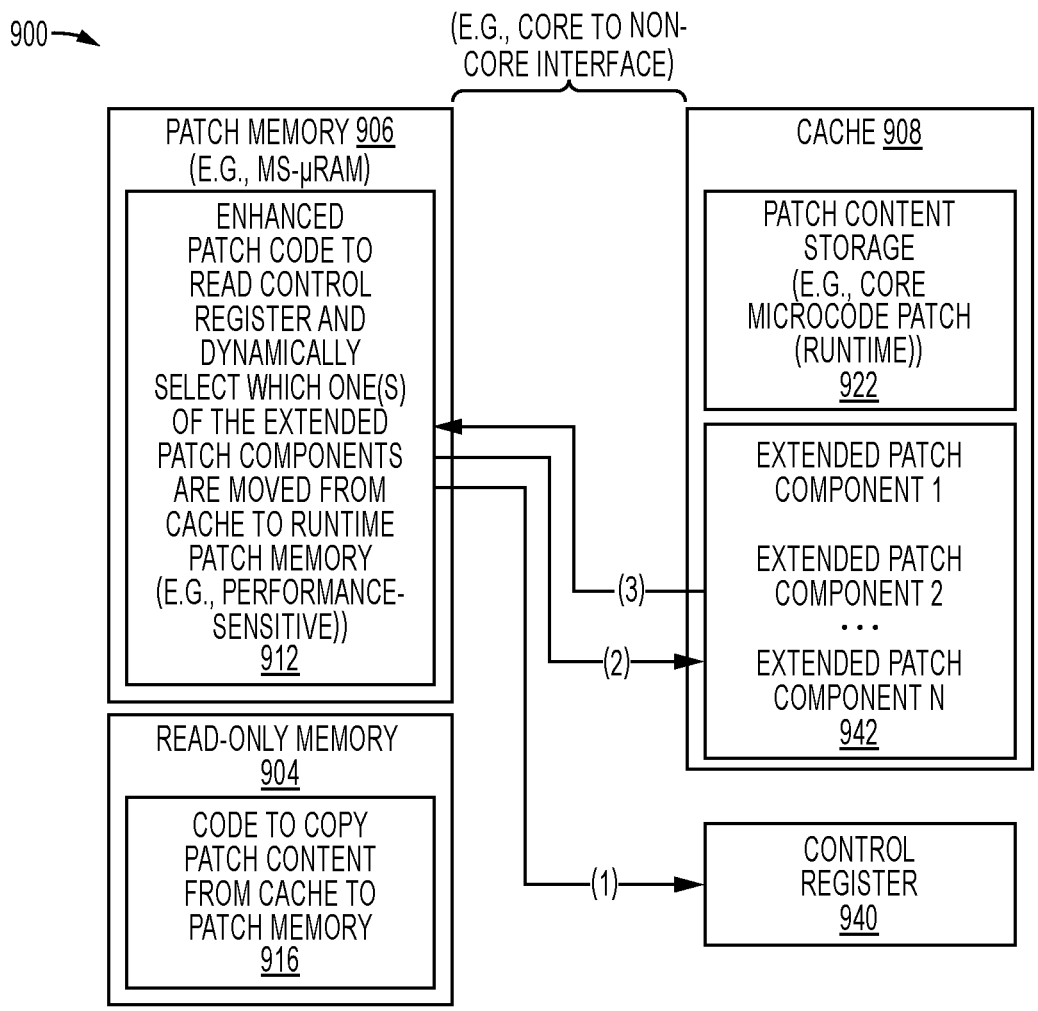
FIG. 9 illustrates extended patching in a system including a control register, a read-only memory, a patch memory, and a cache according to embodiments of the disclosure.

In certain embodiments, a third mode of extended patching (e.g., an "uber-ghost" patch embodiment) allows for dynamic reconfiguration of runtime patch memory (e.g., MS-RAM) for performance-sensitive pieces of functionality (e.g., to select a proper subset of the components shown in FIG. 9. In one embodiment, a user (e.g., platform owner or administrator) selects which extended patching functionality (e.g., component(s)) is active at runtime based on a control register (e.g., MSR). In certain embodiments, a third mode of extended patching (e.g., an "uber-ghost" patch embodiment) includes a plurality of components that are part of a microcode patch, for example, and are defined as first mode or second mode patch components. In one embodiment, all of the plurality of components of the extended patch content will not fit in the runtime patch memory (e.g., MS-RAM). For example, there may be two components as part of a given microcode patch but only one of them will fit in patch memory (e.g., MS-RAM). In one embodiment, the control register (e.g., MSR) allows the selection of either component, and causes the microcode (e.g., micro-operations) for that component to be copied from the section of the cache (e.g., C6 section of SRAM) into the patch memory (e.g., MS-RAM).

FIGS. 5A-9 each illustrate various storage locations for code and extended patch content. It should be understood that each read-only memory in FIGS. 5A-9 may be any read-only memory, e.g., read-only memory 204 in FIG. 2, read-only memory 304 in FIG. 3, or read-only memory 404 in FIG. 4. It should be understood that each patch memory in FIGS. 5A-9 may be any patch memory, e.g., patch memory 206 in FIG. 2, patch memory 306 in FIG. 4, or patch memory 406 in FIG. 4. It should be understood that each system memory in FIGS. 5A-9 may be any system memory, e.g., system memory 108 in FIG. 1. It should be understood that all storage (e.g., memory) may be non-transitory.

In certain embodiments, a read-only memory is loaded with its (e.g., as depicted in the Figures) data at manufacture time. In certain embodiments, the patch memory and/or cache are loaded with its data (e.g., as depicted in the Figures) or firmware is updated to cause a load of that data by a microcode patch binary image sent by the manufacturer.

Figure 5A:
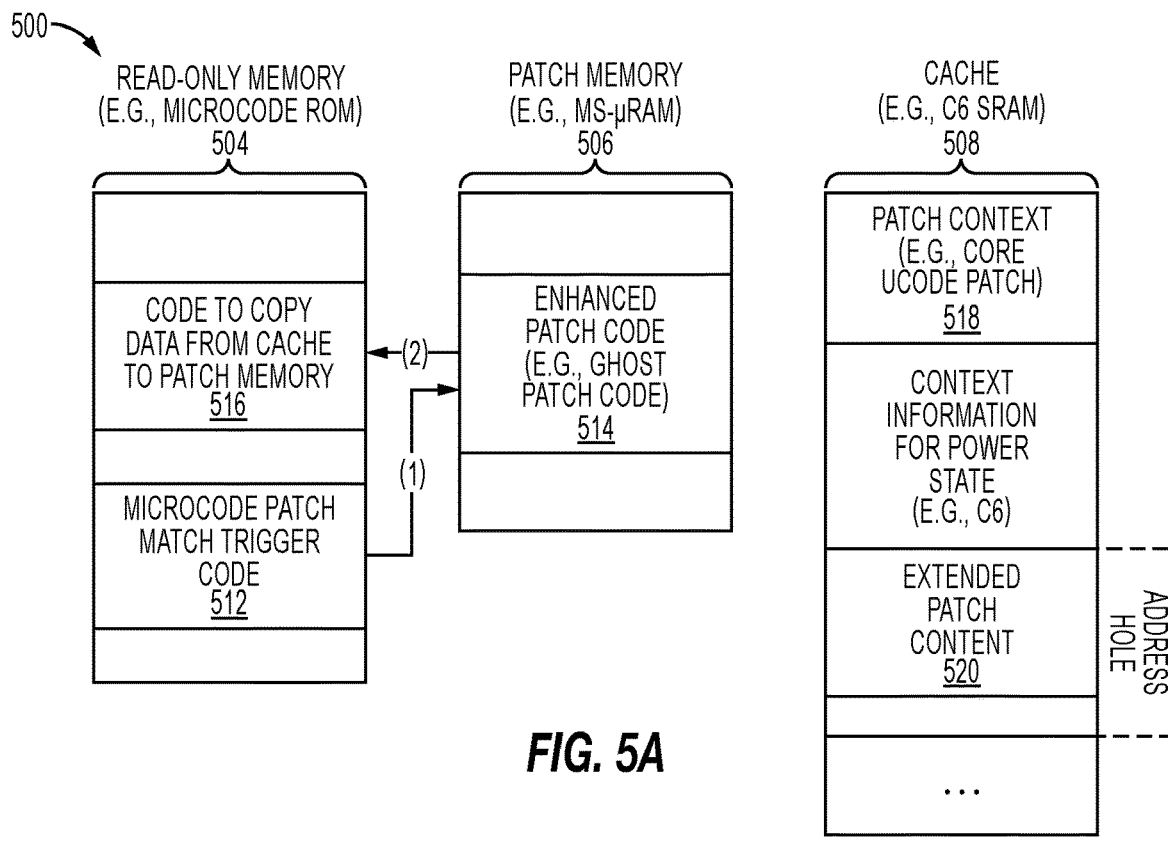
FIGS. 5A-5C illustrate extended patching in a system including a read-only memory, a patch memory, and a cache according to embodiments of the disclosure.
Figure 5B:
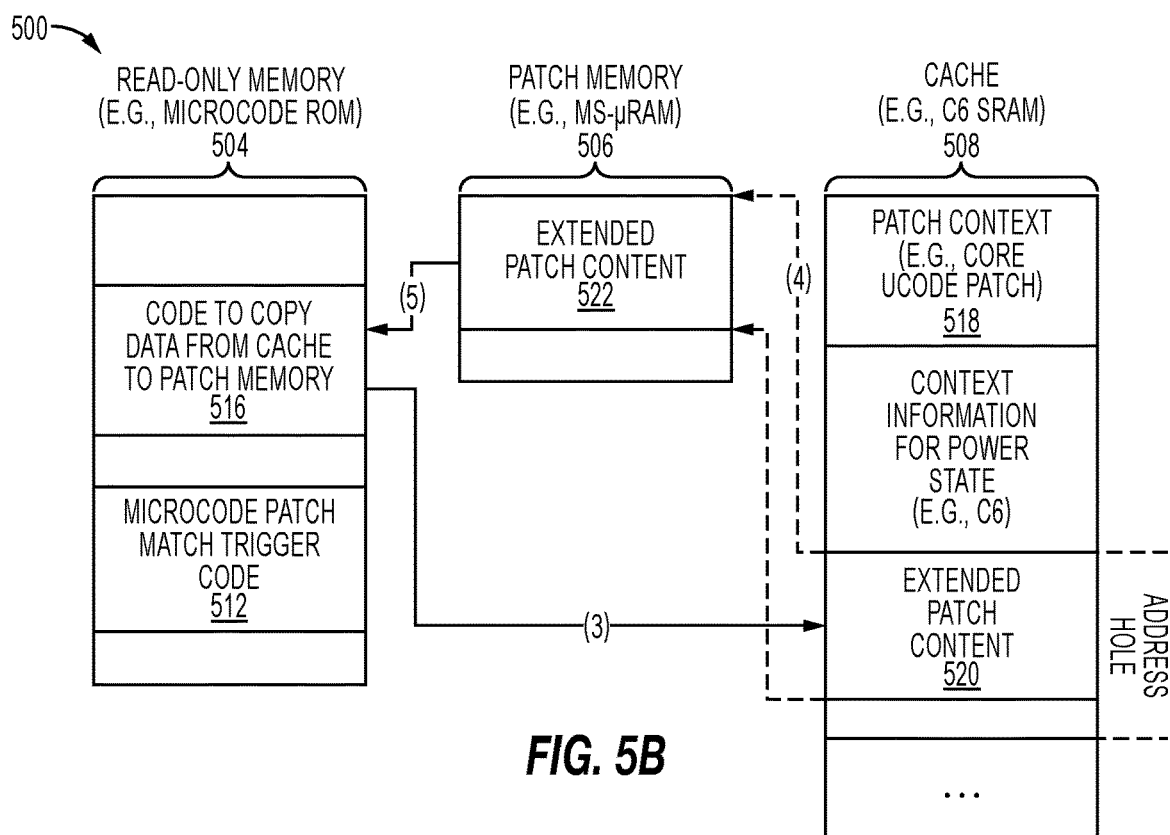
Figure 5C:
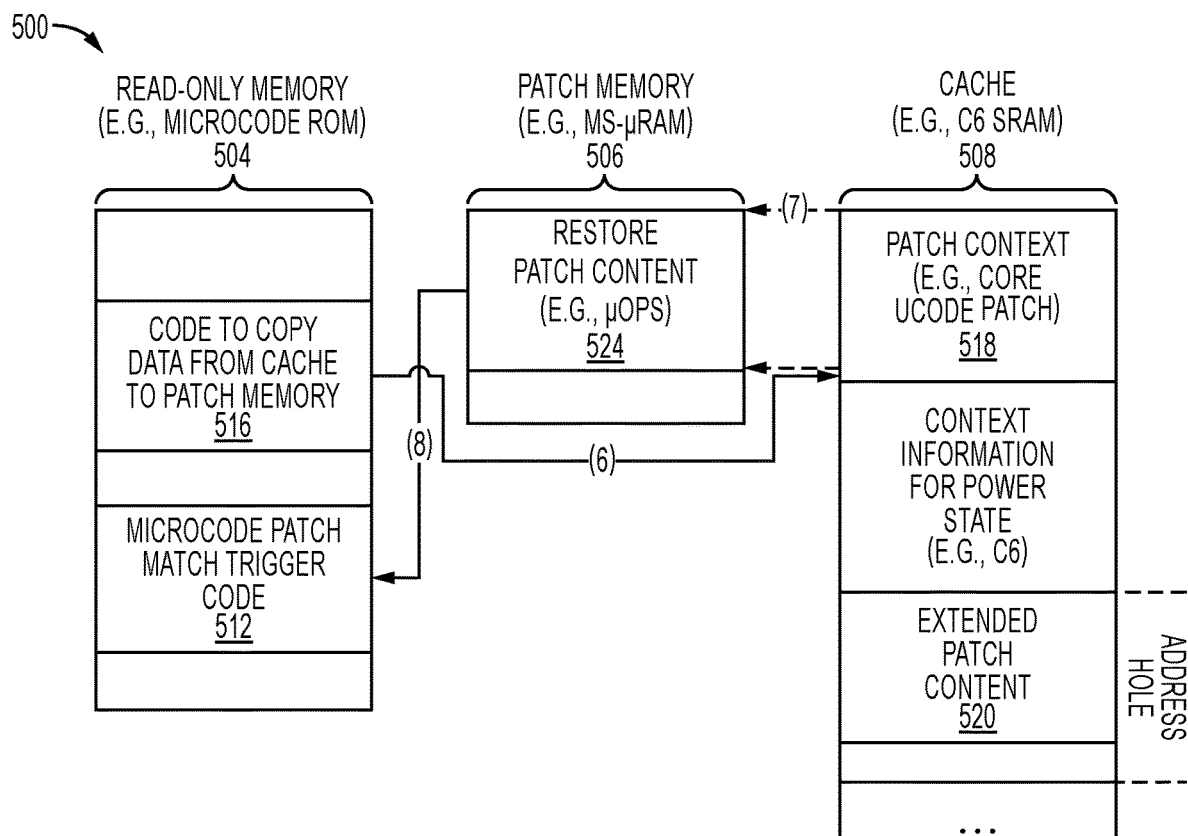

FIGS. 5A-5C illustrate extended patching in a system 500 including a read-only memory 504, a patch memory 506, and a cache 508 according to embodiments of the disclosure. In FIG. 5A, read-only memory 504 includes microcode patch-match trigger code 512 and code 516 to copy data from cache 508 to patch memory 506. In certain embodiments, an instruction is received (e.g., by a microcode sequencer) for decoding, and it is determined (e.g., by the comparing the address, pointer, or opcode of that instruction to a list of addresses, pointers, or opcodes for patched instructions) that the instruction is one that is to-be-patched (e.g., using additional and/or different micro-operations than those stored in read-only memory 504). In certain embodiments, receipt of an instruction (e.g., for decoding) causes a comparison (e.g., by a microcode sequencer) of that instruction (e.g., one or more micro-operations for that instruction) to a list of patched instructions (e.g., patched micro-operations). In one embodiment, when a match is determined (e.g., for an enhanced patch), the microcode patch-match trigger code 512 then triggers the execution of the enhanced patch code 514 (e.g., "ghost" patch code) stored in patch memory 506. In certain embodiments, the execution of the enhanced patch code 514 (e.g., "ghost" patch code) stored in patch memory 506 causes execution of code 516 to copy (e.g., all or a proper subset of) extended patch content 520 (e.g., micro-operations) from the cache 508 to patch memory 506, e.g., and the over-writing of micro-operations that were already stored in the patch memory 506.

In FIG. 5B, the copy 522 of the extended patch content 520 has been saved in patch memory 506. In one embodiment, the copy 522 overwrites the enhanced patch code 514. In another embodiment, the copy 522 does not overwrite the enhanced patch code 514. Optionally, the completion of saving the copy 522 of the extended patch content in patch memory 506 is indicated to the code 516, e.g., as that code is to cause execution of the copy 522 of the extended patch content from patch memory 506.

In FIG. 5C, the execution of the copy 522 of the extended patch content from patch memory 506 is complete, so the code 516 is then to cause a load (e.g., restoration) of the (e.g., all or only the overwritten) data in the patch memory 506 from the copy 518 of the overwritten data (e.g., the patch content, but not the extended patch content) to restore the patch content 524. In one embodiment, after patch content 524 is stored (e.g., restored) into patch memory 506, an indication of that is sent to the microcode patch-match trigger code 512, for example, which then allows the microcode sequencer to move onto decoding the next instruction (e.g., and/or removes the core from being in single thread mode).

Figure 6:
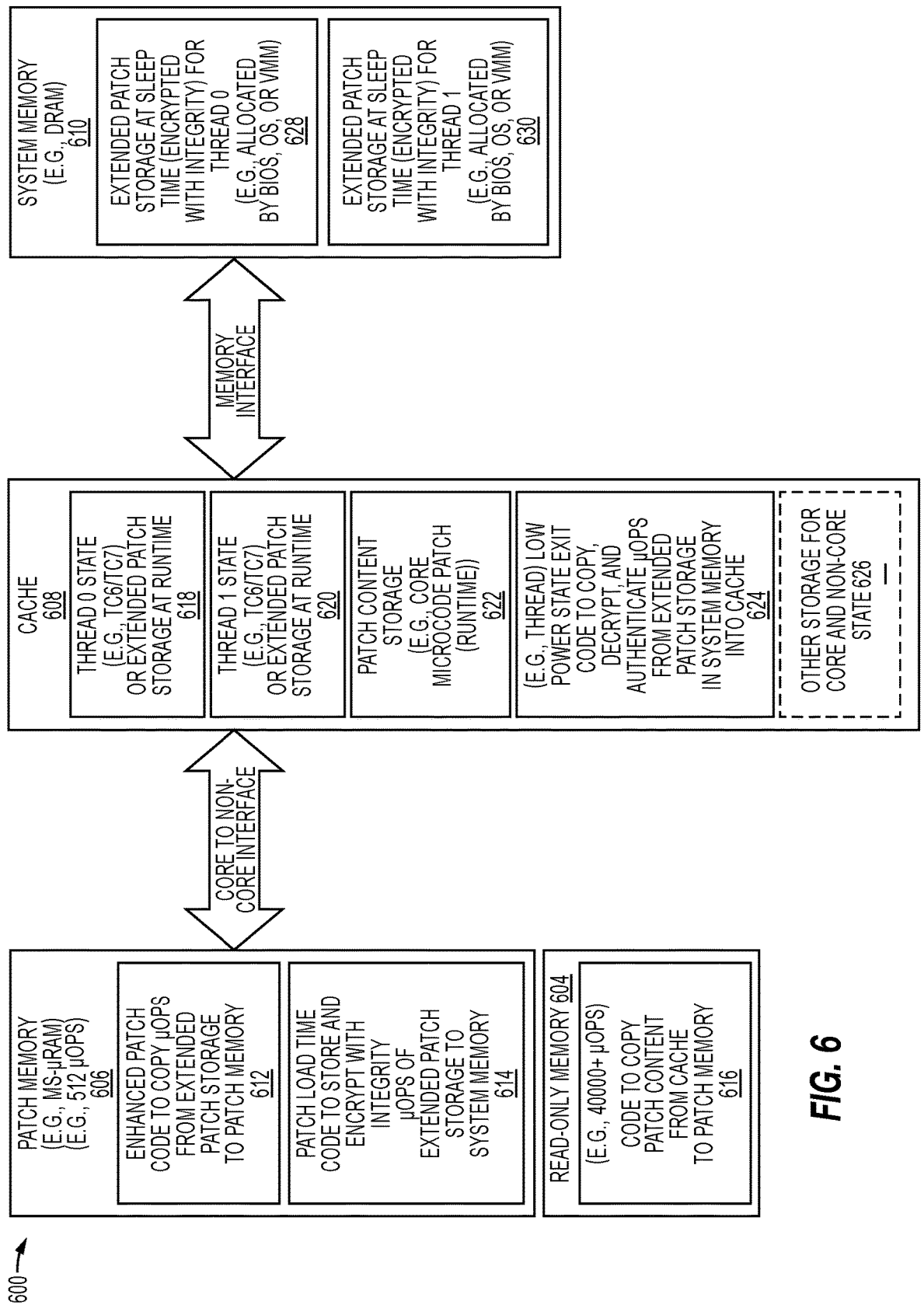
FIG. 6 illustrates extended patching in a system including a read-only memory, a patch memory, a cache, and a system memory according to embodiments of the disclosure.

FIG. 6 illustrates extended patching in a system 600 including a read-only memory 604, a patch memory 606, a cache 608, and a system memory 610 according to embodiments of the disclosure. Although FIG. 6 illustrates storage and code for multiple patching modes (e.g., first, second, and third modes), it should be understood that any one or more of these components may be used, e.g., for a core operating in a single patching mode.

In FIG. 6, patch memory 606 includes enhanced patch code 612, that when executed, causes data (e.g., micro-operation or micro-operations) to be copied from extended patch storage (e.g., 618, 620 in cache 608) to patch memory 606. Enhanced patch code 612 may include microcode patch-match trigger code. In certain embodiments, an instruction is received (e.g., by a microcode sequencer) for decoding, and it is determined (e.g., by the comparing the opcode of that instruction to a list of opcodes for patched instructions) that the instruction is one that is to-be-patched (e.g., using additional and/or different micro-operations than those stored in read-only memory 604). In certain embodiments, receipt of an instruction for decoding causes execution of enhanced patch code 612, which compares that instruction, e.g., its opcode, to a list of opcodes for patched instruction(s). In one embodiment, when a match is determined, the enhanced patch code 612 then causes a load of (e.g., all or a proper subset of) extended patch content (e.g., 618 or 620) (e.g., micro-operations) from the cache 608 to patch memory 606, e.g., and the over-writing of micro-operations that were already stored in the patch memory 606.

Patch memory 606 (or read-only memory 604) may include patch load time code 614, that when executed, causes a store (e.g., and encrypt with integrity) of the extended patch code (e.g., micro-operations) into system memory 610. Read-only memory 604 (or patch memory 606) may include code 616, that when executed, causes a load of the patch content from patch content storage 622 of cache 608 (e.g., C6 section of cache) into patch memory 606. In one embodiment, a reset of a processor (e.g., core) causes execution of code 616.

Depicted cache 608 includes two sections 618 and 620 (although a single or any plurality may be used) that are reserved (e.g., takes the highest priority) for context information (e.g., thread state) for a respective thread (T0 and T1) that is to be turned off (e.g., power shut off to the core or execution resources for that thread). In one embodiment, a thread state includes the content of register(s), cache(s), and/or other data in execution resources at the time of stoppage. In certain embodiments, one or more of sections 618 and 620 are used (e.g., when a respective thread is running, and thus is not storing its state yet) as extended patch storage for microcode patching. Depicted system memory 610 (e.g., in a second mode of microcode patching) includes a partition 628 allocated to store (e.g., encrypted) a copy of the extended patch content (e.g., micro-operations) that is stored (e.g., in runtime) in thread 0's reserved section 618 of cache 608, for example, so that when reserved section 618 is used to store the thread 0 state, when that thread state is restored into the thread's execution resources, the copy of the extended patch content is loaded (e.g., copied) from partition 628 of system memory 610 into thread 0's now unused, yet reserved, section 618 of cache 608. Depicted system memory 610 (e.g., in a second mode of microcode patching) includes a partition 630 allocated to store (e.g., encrypted) a copy of the extended patch content (e.g., micro-operations) that is stored (e.g., in runtime) in thread 1's reserved section 620 of cache 608, for example, so that when reserved section 620 is used to store the thread 1 state, when that thread state is restored into the thread's execution resources, the copy of the extended patch content is loaded (e.g., copied) from partition 630 of system memory 610 into thread 1's now unused, yet reserved, section 620 of cache 608.

Cache 608 may include a copy of the (non-extended) patch content stored in patch content storage 622, e.g., a copy of the patch memory 606 before it is overwritten with extended patch content (e.g., micro-operations).

Cache 608 may include lower power state exit code 624 (e.g., core or thread context information restore code) that, when executed, copies (e.g., and decrypts and authenticates) extended patch content from (e.g., partition 628 and/or partition 630 of) system memory 610 into (e.g., section 618 and/or section 620 of) cache 608. Cache 608 may include other storage for non-core circuitry state or core state 626, e.g., that is not utilized during extended microcode patching.

Figure 7:
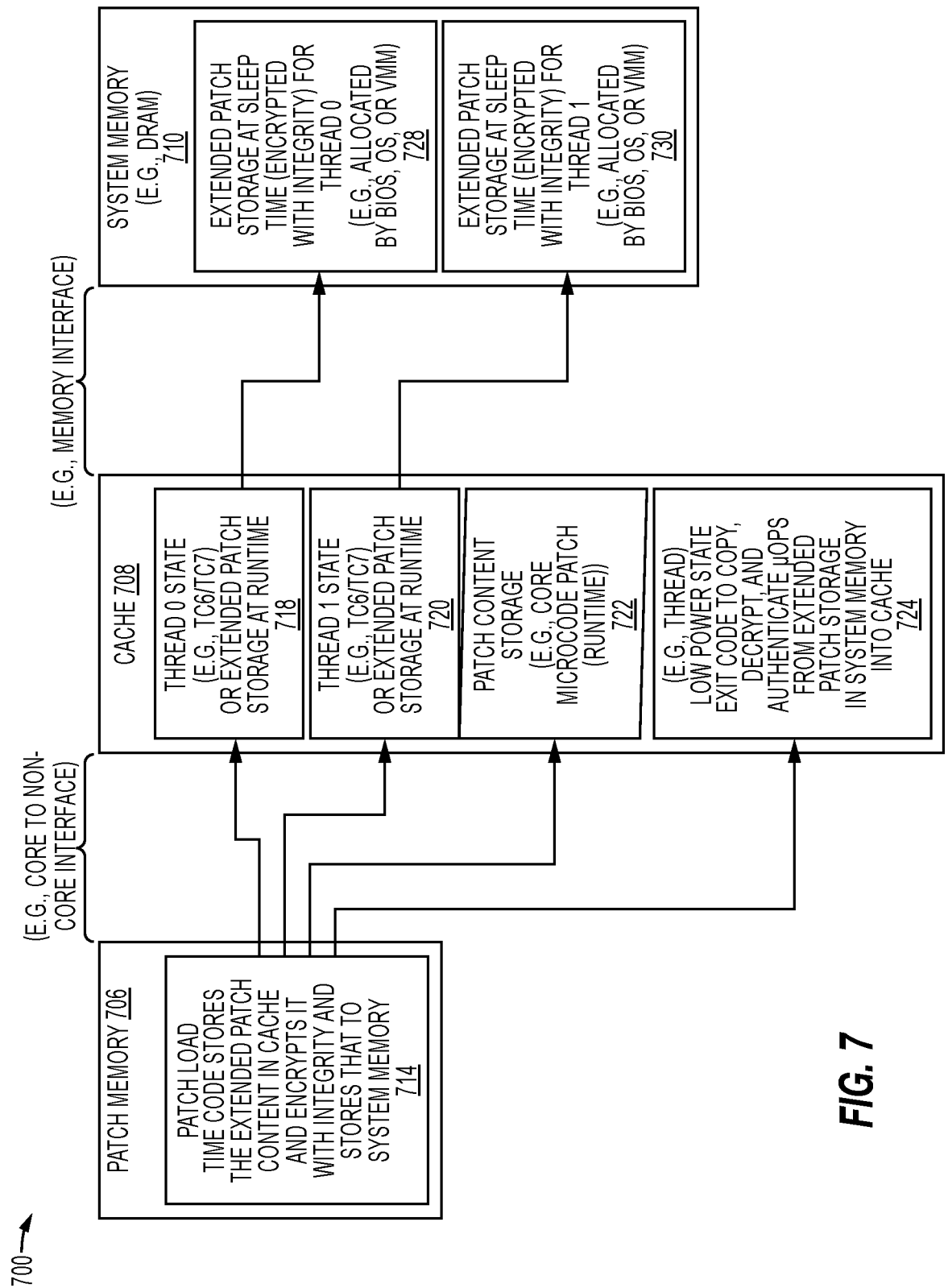
FIG. 7 illustrates extended patching in a system including a patch memory, a cache, and a system memory according to embodiments of the disclosure.

FIG. 7 illustrates extended patching in a system 700 including a patch memory 706, a cache 708, and a system memory 710 according to embodiments of the disclosure. In one embodiment, system 700 implements a second mode of extended patching (e.g., a "super-ghost" patch embodiment).

In FIG. 7, patch memory 706 may include patch load time code 714, that when executed, causes a store of the extended patch code (e.g., micro-operations) into cache 708 (e.g., into the C6 context information storage section (e.g., block) of the cache) and a store (e.g., and encrypts with integrity) of the extended patch code into system memory 710. Depicted cache 708 includes two sections 718 and 720 (although a single or any plurality may be used) that are reserved (e.g., takes the highest priority) for context information (e.g., thread state) for a respective thread (T0 and T1) that is to be turned off (e.g., power shut off to the core or execution resources for that thread). In one embodiment, a thread state includes the content of register(s), cache(s), and/or other data in execution resources at the time of stoppage. In certain embodiments, one or more of sections 718 and 720 are used (e.g., when a respective thread is running, and thus is not storing its state yet) as extended patch storage for microcode patching. Depicted system memory 710 (e.g., in a second mode of microcode patching) includes a partition 728 allocated to store (e.g., encrypted) a copy of the extended patch content (e.g., micro-operations) that is stored (e.g., in runtime) in thread 0's reserved section 718 of cache 708, for example, so that when reserved section 718 is used to store the thread 0 state, when that thread state is restored into the thread's execution resources, the copy of the extended patch content is loaded (e.g., copied) from partition 728 of system memory 710 into thread 0's now unused, yet reserved, section 718 of cache 708. Depicted system memory 710 (e.g., in a second mode of microcode patching) includes a partition 730 allocated to store (e.g., encrypted) a copy of the extended patch content (e.g., micro-operations) that is stored (e.g., in runtime) in thread 1's reserved section 720 of cache 708, for example, so that when reserved section 720 is used to store the thread 1 state, when that thread state is restored into the thread's execution resources, the copy of the extended patch content is loaded (e.g., copied) from partition 730 of system memory 710 into thread 1's now unused, yet reserved, section 720 of cache 708.

Cache 708 may include a copy 722 of the (non-extended) patch content, e.g., a copy of the patch memory 706 before it is overwritten with extended patch content (e.g., micro-operations).

Cache 708 may include low (e.g., lower) power state exit code 724 (e.g., core or thread context information restore code) that, when executed, copies (e.g., and decrypts and authenticates) extended patch content from (e.g., partition 728 and/or partition 730 of) system memory 710 into (e.g., section 718 and/or section 720 of) cache 708.

In certain embodiments, at microcode patch load time (e.g., triggered by executing a write to control register instruction to set a bit or bits of a control register), patch load time code 714 (e.g., microcode patch loader) (e.g., after authenticating the new microcode patch specified by software) executes to cause a store of the extended patch content (e.g., micro-operations) in the corresponding thread's context information storage section (e.g., 718 or 720 for TC6/TC7 low power states) of the cache (e.g., C6 section of SRAM) and will also store it encrypted with integrity protection in the reserved area in the system memory 710. In certain embodiments, low power state exit code 724 (e.g., restoration code) (e.g., implementing the TC6/TC7 exit restoration) causes the loading (e.g., copying) of the encrypted version of the extended patch content from the system memory 710, decrypting it, and storing (e.g., if authenticated) of the decrypted extended patch content back into the context information storage section (e.g., 718 or 720 for TC6/TC7 low power states) of the cache 708 (e.g., C6 SRAM).

In one embodiment, execution of the patch load time code 714 causes a store of one or more (e.g., any combination) of the items depicted in cache 708 and/or system memory 710 in FIG. 7.

Figure 8:
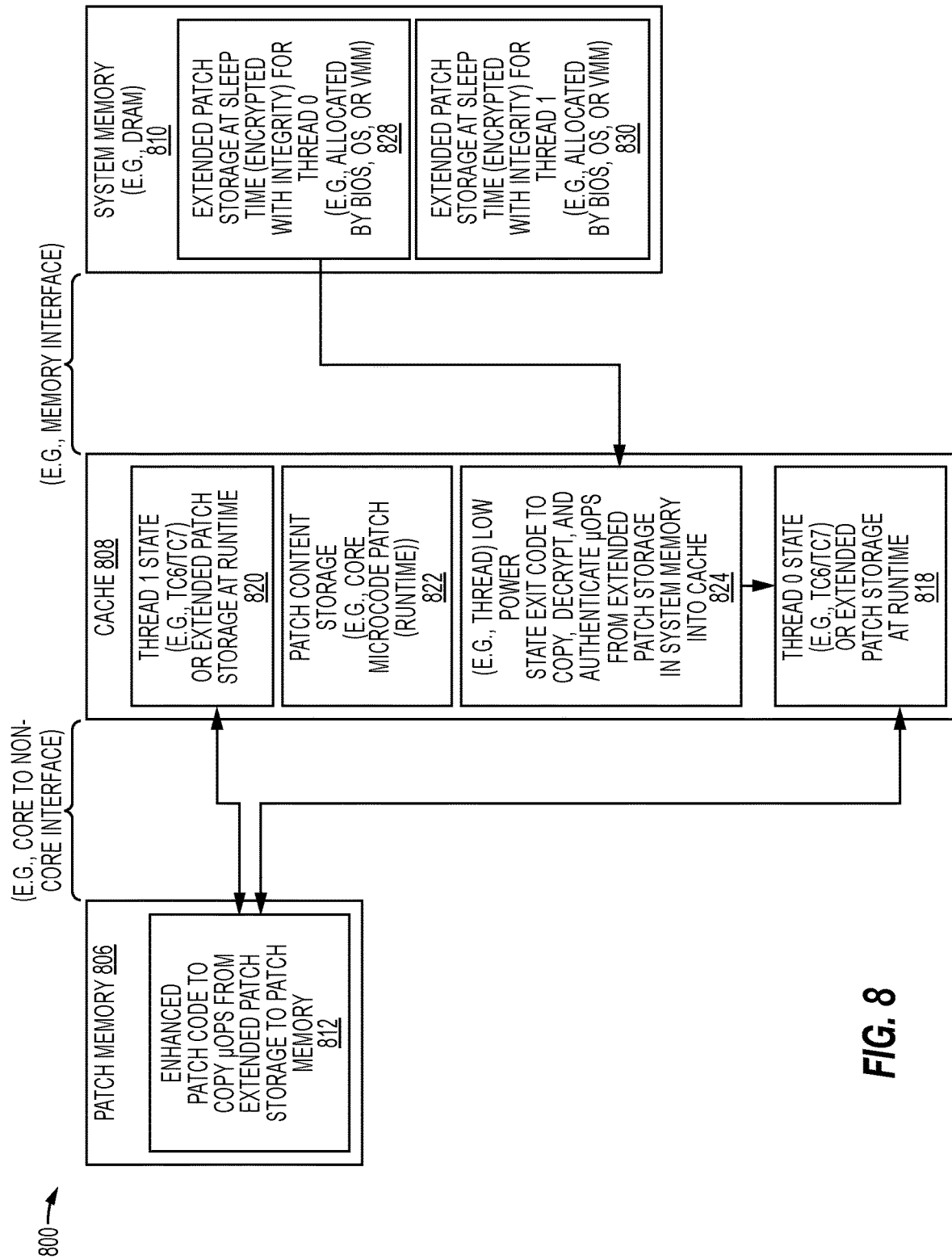
FIG. 8 illustrates extended patching in a system including a patch memory, a cache, and a system memory according to embodiments of the disclosure.

FIG. 8 illustrates extended patching in a system 800 including a patch memory 806, a cache 808, and a system memory 810 according to embodiments of the disclosure. In one embodiment, system 800 implements a second mode of extended patching (e.g., a "super-ghost" patch embodiment).

In FIG. 8, patch memory 806 includes enhanced patch code 812, that when executed, causes data (e.g., micro-operation or micro-operations) to be copied from extended patch storage (e.g., 818, 820 in cache 808) to patch memory 806. Enhanced patch code 812 may include microcode patch-match trigger code. In certain embodiments, an instruction is received (e.g., by a microcode sequencer) for decoding, and it is determined (e.g., by the comparing the opcode of that instruction to a list of opcodes for patched instructions) that the instruction is one that is to-be-patched (e.g., using additional and/or different micro-operations than those stored in read-only memory). In certain embodiments, receipt of an instruction for decoding causes execution of enhanced patch code 812, which compares that instruction, e.g., its opcode, to a list of opcodes for patched instruction(s). Note the discussion of opcode fields below. In one embodiment, when a match is determined, the enhanced patch code 812 then causes a load of (e.g., all or a proper subset of) extended patch content (e.g., from 818 or 820) (e.g., micro-operations) from the cache 808 to patch memory 806, e.g., and the over-writing of micro-operations that were already stored in the patch memory 806.

Patch memory 806 (or read-only memory) may include patch load time code, that when executed, causes a store (e.g., and encrypt with integrity) of the extended patch code (e.g., micro-operations) into system memory 810.

Depicted cache 808 includes two sections 818 and 820 (although a single or any plurality may be used) that are reserved (e.g., takes the highest priority) for context information (e.g., thread state) for a respective thread (T0 and T1) that is to be turned off (e.g., power shut off to the core or execution resources for that thread). In one embodiment, a thread state includes the content of register(s), cache(s), and/or other data in execution resources at the time of stoppage. In certain embodiments, one or more of sections 818 and 820 are used (e.g., when a respective thread is running, and thus is not storing its state yet) as extended patch storage for microcode patching. Depicted system memory 810 (e.g., in a second mode of microcode patching) includes a partition 828 allocated to store (e.g., encrypted) a copy of the extended patch content (e.g., micro-operations) that is stored (e.g., in runtime) in thread 0's reserved section 818 of cache 808, for example, so that when reserved section 818 is used to store the thread 0 state, when that thread state is restored into the thread's execution resources, the copy of the extended patch content is loaded (e.g., copied) from partition 828 of system memory 810 into thread 0's now unused, yet reserved, section 818 of cache 808. Depicted system memory 810 (e.g., in a second mode of microcode patching) includes a partition 830 allocated to store (e.g., encrypted) a copy of the extended patch content (e.g., micro-operations) that is stored (e.g., in runtime) in thread 1's reserved section 820 of cache 808, for example, so that when reserved section 820 is used to store the thread 1 state, when that thread state is restored into the thread's execution resources, the copy of the extended patch content is loaded (e.g., copied) from partition 830 of system memory 810 into thread 1's now unused, yet reserved, section 820 of cache 808.

Cache 808 may include a copy 822 of the (non-extended) patch content, e.g., a copy of the patch memory 806 before it is overwritten with extended patch content (e.g., micro-operations). Cache 808 may include lower power state exit code 824 (e.g., core or thread context information restore code) that, when executed, copies (e.g., and decrypts and authenticates) extended patch content from (e.g., partition 828 and/or partition 830 of) system memory 810 into (e.g., section 818 and/or section 820 of) cache 808.

In one embodiment, execution of the extended patch code 812 causes a store and/or load of one or more (e.g., any combination) of the items depicted in cache 808 and/or system memory 810 in FIG. 8.

In one embodiment, exiting a power state (e.g., the TC6 low power state or TC7 low power state) that caused the store of core and/or thread context information into storage section 818 or 820, causes execution of lower power state exit code 824 (e.g., core or thread context information restore code) that copies (e.g., and decrypts and authenticate/integrity check it) extended patch content from (e.g., partition 828 and/or partition 830 of) system memory 810 into (e.g., section 818 and/or section 820 of) cache 808.

FIG. 9 illustrates extended patching in a system including a control register 940, a read-only memory 904, a patch memory 906, and a cache 908 according to embodiments of the disclosure. In one embodiment, system 900 implements a third mode of extended patching (e.g., an "uber-ghost" patch embodiment).

In FIG. 9, patch memory 906 includes enhanced patch code 912, that when executed, reads a value stored in control register 940 and, based on that value, selects one or more (e.g., any combination of) extended patch components 1–N (where N is any integer), and causes the components (e.g., micro-operation or micro-operations) to be copied from extended patch storage 942 to patch memory 906.

In one embodiment, the component(s) of the enhanced patch code 912 that are loaded from extended patch component storage 942 of the cache 908 remain stored in patch memory 906, e.g., and the over-writing of micro-operations that were already stored in the patch memory 906. In one embodiment, the extended patch content remains stored in the patch memory until the core is reset or the workload changes (e.g., a change from a first virtual machine to a second virtual machine).

Cache 908 may include a copy of the (non-extended) patch content stored in patch content storage 922, e.g., a copy of the patch memory 906 before it is overwritten with extended patch content component(s) (e.g., micro-operations). In one embodiment, a user (e.g., platform owner or administrator) selects which extended patching functionality (e.g., which of component or components 1–N) is active at runtime based on control register 940. In certain embodiments, a third mode of extended patching (e.g., an "uber-ghost" patch embodiment) includes a plurality of components 1–N that are part of a microcode patch, for example, and are also defined under a first mode or second mode of patching. In one embodiment, all of the plurality of components of the extended patch components will not fit in the runtime patch memory 906 (e.g., MS-RAM). For example, there may be N number of components as part of a given microcode patch but only a proper subset (e.g., less than N) will fit in patch memory 906 (e.g., MS-RAM). In certain embodiments, the control register 940 allows the selection (e.g., by software) of any component(s), and causes the microcode (e.g., micro-operations) for that component to be copied from the extended patch storage section 942 of the cache (e.g., C6 section of SRAM) and then reside in the patch memory 906 (e.g., MS-RAM).

Read-only memory 904 (or patch memory 906) may include code 916, that when executed, causes a load of the patch content from patch content storage 922 of cache 908 (e.g., C6 section of cache) into patch memory 906. In one embodiment, a reset of a processor (e.g., core) causes execution of code 916.

In certain embodiments herein, a patch memory does not have storage space for an entire set of micro-operations, so a microcode sequencer may iteratively (e.g., serially) swap portions of less than all of the entire set from the cache (e.g., C6 section of SRAM) into the patch memory (e.g., MS-RAM) until the instruction that caused the extended patching to be used has executed the entire set of micro-operations. In one embodiment, the latency for a core to non-core operation is lower (e.g., about 40 cycles of the core clock) than the latency for a core to system memory operation (e.g., about 300 cycles of the core clock).

In certain embodiments, only microcode (e.g., and not user supplied instructions) can access a certain section (e.g., the C6 section) of cache. In one embodiment, the hardware initialization manager (e.g., executing BIOS or UEFI firmware) causes one or more of the code discussed herein to be loaded into storage, e.g., into a certain section (e.g., the C6 section) of cache.

In certain embodiments, a microcode sequencer (e.g., microcode sequencer circuit) includes the code discussed herein, for example, the microcode sequencer causes the code that performs the extending patching to be executed, e.g., on receipt by the microcode sequencer of an instruction that is to be decoded. A microcode sequencer may utilize any of the methods or flow discussed herein, e.g., any of the flows discussed in FIGS. 10-12.

Figure 10:
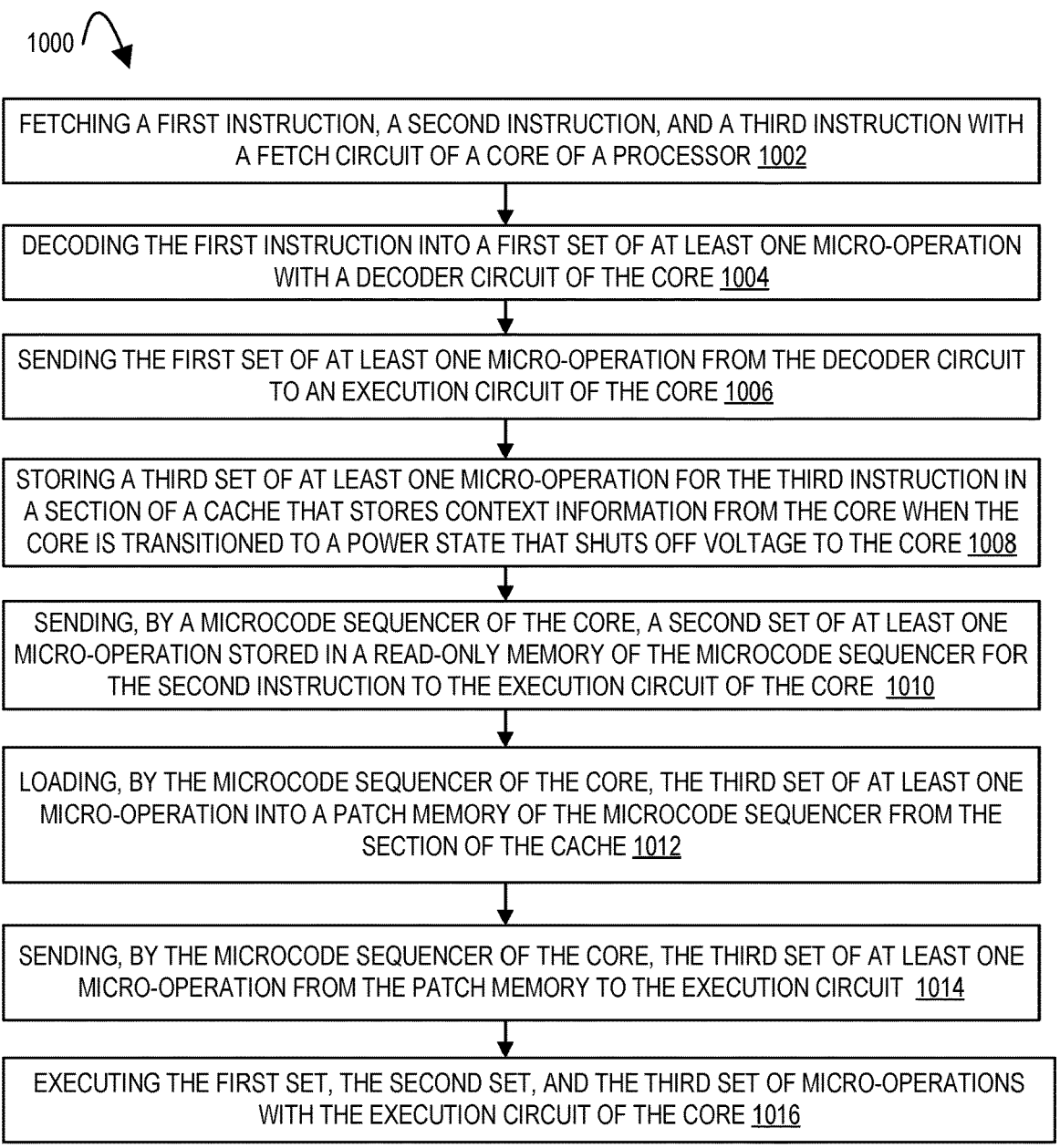
FIG. 10 illustrates a flow diagram for extended patching according to embodiments of the disclosure.

FIG. 10 illustrates a flow diagram 1000 for extended patching according to embodiments of the disclosure. Depicted flow 1000 includes fetching a first instruction, a second instruction, and a third instruction with a fetch circuit of a core of a processor 1002; decoding the first instruction into a first set of at least one micro-operation with a decoder circuit of the core 1004; sending the first set of at least one micro-operation from the decoder circuit to an execution circuit of the core 1006; storing a third set of at least one micro-operation for the third instruction in a section of a cache that stores context information from the core when the core is transitioned to a power state that shuts off voltage to the core 1008; sending, by a microcode sequencer of the core, a second set of at least one micro-operation stored in a read-only memory of the microcode sequencer for the second instruction to the execution circuit of the core 1010; loading, by the microcode sequencer of the core, the third set of at least one micro-operation into a patch memory of the microcode sequencer from the section of the cache 1012; sending, by the microcode sequencer of the core, the third set of at least one micro-operation from the patch memory to the execution circuit 1014; and executing the first set, the second set, and the third set of micro-operations with the execution circuit of the core 1016.

Figure 11:
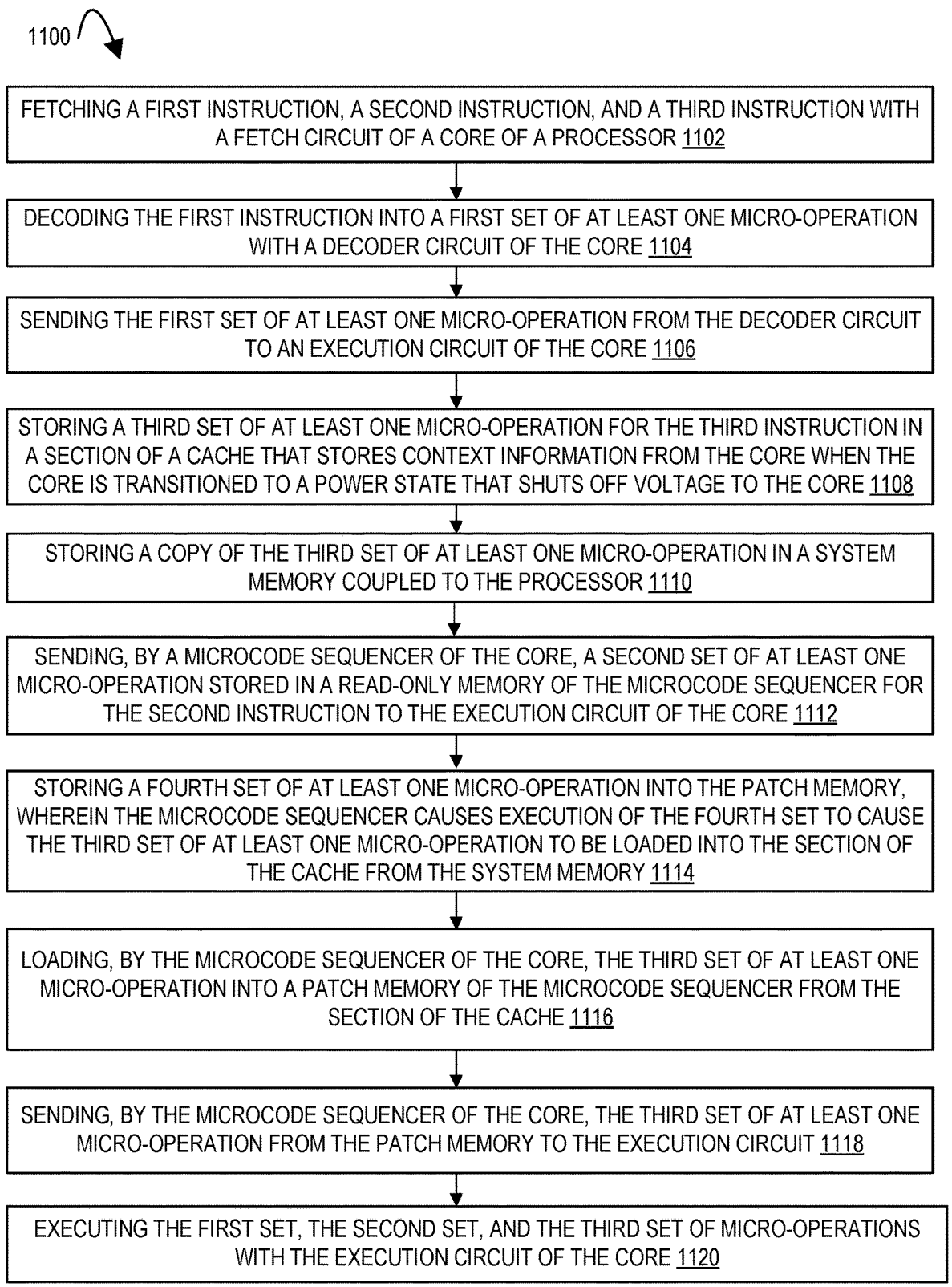
FIG. 11 illustrates a flow diagram for extended patching according to embodiments of the disclosure.

FIG. 11 illustrates a flow diagram 1100 for extended patching according to embodiments of the disclosure. Depicted flow 1100 includes fetching a first instruction, a second instruction, and a third instruction with a fetch circuit of a core of a processor 1102; decoding the first instruction into a first set of at least one micro-operation with a decoder circuit of the core 1104; sending the first set of at least one micro-operation from the decoder circuit to an execution circuit of the core 1106; storing a third set of at least one micro-operation for the third instruction in a section of a cache that stores context information from the core when the core is transitioned to a power state that shuts off voltage to the core 1108; storing a copy of the third set of at least one micro-operation in a system memory coupled to the processor 1110; sending, by a microcode sequencer of the core, a second set of at least one micro-operation stored in a read-only memory of the microcode sequencer for the second instruction to the execution circuit of the core 1112; storing a fourth set of at least one micro-operation into the patch memory, wherein the microcode sequencer causes execution of the fourth set to cause the third set of at least one micro-operation to be loaded into the section of the cache from the system memory 1114; loading, by the microcode sequencer of the core, the third set of at least one micro-operation into a patch memory of the microcode sequencer from the section of the cache 1116; sending, by the microcode sequencer of the core, the third set of at least one micro-operation from the patch memory to the execution circuit 1118; and executing the first set, the second set, and the third set of micro-operations with the execution circuit of the core 1120.

Figure 12:
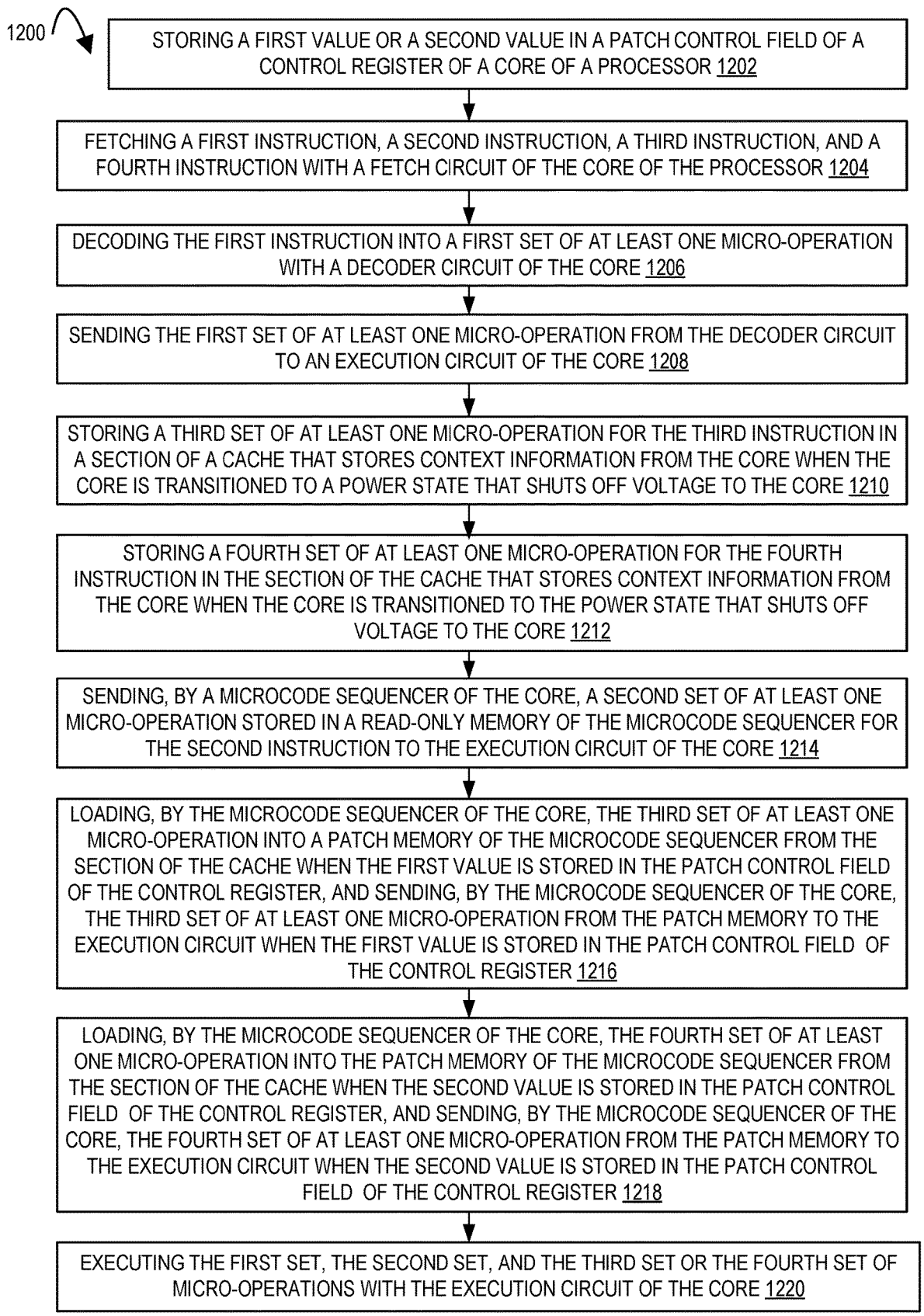
FIG. 12 illustrates a flow diagram for extended patching according to embodiments of the disclosure.

FIG. 12 illustrates a flow diagram 1200 for extended patching according to embodiments of the disclosure. Depicted flow 1200 includes storing a first value or a second value in a patch control field of a control register of a core of a processor 1202; fetching a first instruction, a second instruction, a third instruction, and a fourth instruction with a fetch circuit of the core of the processor 1204; decoding the first instruction into a first set of at least one micro-operation with a decoder circuit of the core 1206; sending the first set of at least one micro-operation from the decoder circuit to an execution circuit of the core 1208; storing a third set of at least one micro-operation for the third instruction in a section of a cache that stores context information from the core when the core is transitioned to a power state that shuts off voltage to the core 1210; storing a fourth set of at least one micro-operation for the fourth instruction in the section of the cache that stores context information from the core when the core is transitioned to the power state that shuts off voltage to the core 1212; sending, by a microcode sequencer of the core, a second set of at least one micro-operation stored in a read-only memory of the microcode sequencer for the second instruction to the execution circuit of the core 1214; loading, by the microcode sequencer of the core, the third set of at least one micro-operation into a patch memory of the microcode sequencer from the section of the cache when the first value is stored in the patch control field of the control register, and sending, by the microcode sequencer of the core, the third set of at least one micro-operation from the patch memory to the execution circuit when the first value is stored in the patch control field of the control register 1216; loading, by the microcode sequencer of the core, the fourth set of at least one micro-operation into the patch memory of the microcode sequencer from the section of the cache when the second value is stored in the patch control field of the control register, and sending, by the microcode sequencer of the core, the fourth set of at least one micro-operation from the patch memory to the execution circuit when the second value is stored in the patch control field of the control register 1218; and executing the first set, the second set, and the third set or the fourth set of micro-operations with the execution circuit of the core 1220.

In one embodiment, a processor includes a core; a cache having a section (e.g., not accessible by a user) to store context information from the core when the core is transitioned to a power state that shuts off voltage to the core; a fetch circuit of the core to fetch a first instruction, a second instruction, and a third instruction; a decoder circuit of the core coupled to the fetch circuit to decode (e.g., without using a microcode sequencer) the first instruction into a first set of at least one micro-operation; an execution circuit to execute micro-operations; and a microcode sequencer of the core coupled to the fetch circuit (and/or decoder circuit) and comprising a patch memory and a read-only memory (e.g., that are not accessible by the user) that stores a plurality of micro-operations, wherein the microcode sequencer sends, to the execution circuit, a second set of at least one micro-operation from the plurality of micro-operations stored in the read-only memory for the second instruction received from the fetch circuit, and causes, for the third instruction received from the fetch circuit, a third set of at least one micro-operation to be loaded into the patch memory from the section of the cache, and sends, to the execution circuit, the third set of at least one micro-operation from the patch memory. The power state may be a C6 (or deeper) power state according to an Advanced Configuration and Power Interface (ACPI) standard. The patch memory may include a fourth set of at least one micro-operation (e.g., enhanced patch code) for the third instruction that, when the microcode sequencer causes the fourth set to be executed, causes the third set of at least one micro-operation to be loaded into the patch memory from the section of the cache. Firmware, stored in non-transitory storage (e.g., hardware initialization manager storage) coupled to the processor, may include an instruction that when decoded and executed by the processor causes the processor to insert the fourth set of at least one micro-operation into the patch memory for the third instruction. The third set of at least one micro-operation loaded into the patch memory may overwrite at least one of a plurality of micro-operations stored in the patch memory, and the microcode sequencer may reload the at least one of the plurality of micro-operations that was overwritten when execution of the third set of at least one micro-operation is complete. The microcode sequencer may cause, for a fourth instruction fetched by the fetch circuit, a fourth set of at least one micro-operation, different than the third set, to be loaded into the patch memory from the section of the cache, and send, to the execution circuit, the fourth set of at least one micro-operation from the patch memory. The processor may include a system memory comprising a copy of the third set of at least one micro-operation coupled to the processor, wherein the patch memory comprises a fourth set of at least one micro-operation that, when the microcode sequencer causes the fourth set to be executed, causes the third set of at least one micro-operation to be loaded (e.g., only after decryption and authentication) into the section of the cache from the system memory. The microcode sequencer may cause the fourth set to be executed when the core is transitioned to a power state (e.g., ACPI C0) that turns on the voltage to the core.

In another embodiment, a method includes fetching a first instruction, a second instruction, and a third instruction with a fetch circuit of a core of a processor; decoding the first instruction into a first set of at least one micro-operation with a decoder circuit of the core; sending the first set of at least one micro-operation from the decoder circuit to an execution circuit of the core; storing a third set of at least one micro-operation for the third instruction in a section of a cache that stores context information from the core when the core is transitioned to a power state that shuts off voltage to the core; sending, by a microcode sequencer of the core, a second set of at least one micro-operation stored in a read-only memory of the microcode sequencer for the second instruction to the execution circuit of the core; loading, by the microcode sequencer of the core, the third set of at least one micro-operation into a patch memory of the microcode sequencer from the section of the cache; sending, by the microcode sequencer of the core, the third set of at least one micro-operation from the patch memory to the execution circuit; and executing the first set, the second set, and the third set of micro-operations with the execution circuit of the core. The power state may be a low (e.g., C6 or C7) power state according to an Advanced Configuration and Power Interface (ACPI) standard. The method may include storing a fourth set of at least one micro-operation for the third instruction into the patch memory of the microcode sequencer, wherein, in response to receipt of a request (e.g., a request for micro-operations for the received (e.g, macro) instruction) for the third instruction, the microcode sequencer causes execution of the fourth set that causes the loading of the third set of at least one micro-operation into the patch memory of the microcode sequencer from the section of the cache, and the sending of the third set of at least one micro-operation from the patch memory to the execution circuit. The method may include storing firmware including an instruction in non-transitory storage coupled to the processor, wherein decoding and executing of the instruction by the processor causes the storing of the fourth set of at least one micro-operation for the third instruction into the patch memory of the microcode sequencer. Wherein, at least when the loading of the third set of at least one micro-operation into the patch memory overwrites at least one of a plurality of micro-operations stored in the patch memory, the method may include reloading, by the microcode sequencer, the at least one of the plurality of micro-operations that was overwritten when execution of the third set of at least one micro-operation is complete. The method may include storing a fourth set of at least one micro-operation for a fourth instruction in the section of the cache that stores context information from the core when the core is transitioned to the power state that shuts off voltage to the core; fetching the fourth instruction by the fetch circuit; loading, by the microcode sequencer of the core, the fourth set of at least one micro-operation into the patch memory of the microcode sequencer from the section of the cache; sending, by the microcode sequencer of the core, the fourth set of at least one micro-operation from the patch memory to the execution circuit; and executing the fourth set of at least one micro-operation with the execution circuit of the core. The method may include storing a copy of the third set of at least one micro-operation in a system memory coupled to the processor; and storing a fourth set of at least one micro-operation into the patch memory, wherein the microcode sequencer causes execution of the fourth set to cause the third set of at least one micro-operation to be loaded into the section of the cache from the system memory. The method may include wherein the microcode sequencer causes the fourth set to be executed when the core is transitioned to a power state that turns on the voltage to the core.

In yet another embodiment, a non-transitory machine readable medium stores code that when executed by a machine causes the machine to perform a method comprising fetching a first instruction, a second instruction, and a third instruction with a fetch circuit of a core of a processor; decoding the first instruction into a first set of at least one micro-operation with a decoder circuit of the core; sending the first set of at least one micro-operation from the decoder circuit to an execution circuit of the core; storing a third set of at least one micro-operation for the third instruction in a section of a cache that stores context information from the core when the core is transitioned to a power state that shuts off voltage to the core; sending, by a microcode sequencer of the core, a second set of at least one micro-operation stored in a read-only memory of the microcode sequencer for the second instruction to the execution circuit of the core; loading, by the microcode sequencer of the core, the third set of at least one micro-operation into a patch memory of the microcode sequencer from the section of the cache; sending, by the microcode sequencer of the core, the third set of at least one micro-operation from the patch memory to the execution circuit; and executing the first set, the second set, and the third set of micro-operations with the execution circuit of the core. The power state may be a low (e.g., C6 or C7) power state according to an Advanced Configuration and Power Interface (ACPI) standard. The method may include storing a fourth set of at least one micro-operation for the third instruction into the patch memory of the microcode sequencer, wherein, in response to receipt of a request (e.g., a request for micro-operations for the received (e.g, macro) instruction) for the third instruction, the microcode sequencer causes execution of the fourth set that causes the loading of the third set of at least one micro-operation into the patch memory of the microcode sequencer from the section of the cache, and the sending of the third set of at least one micro-operation from the patch memory to the execution circuit. The method may include storing firmware including an instruction in non-transitory storage coupled to the processor, wherein decoding and executing of the instruction by the processor causes the storing of the fourth set of at least one micro-operation for the third instruction into the patch memory of the microcode sequencer. Wherein, at least when the loading of the third set of at least one micro-operation into the patch memory overwrites at least one of a plurality of micro-operations stored in the patch memory, the method may include reloading, by the microcode sequencer, the at least one of the plurality of micro-operations that was overwritten when execution of the third set of at least one micro-operation is complete. The method may include storing a fourth set of at least one micro-operation for a fourth instruction in the section of the cache that stores context information from the core when the core is transitioned to the power state that shuts off voltage to the core; fetching the fourth instruction by the fetch circuit; loading, by the microcode sequencer of the core, the fourth set of at least one micro-operation into the patch memory of the microcode sequencer from the section of the cache; sending, by the microcode sequencer of the core, the fourth set of at least one micro-operation from the patch memory to the execution circuit; and executing the fourth set of at least one micro-operation with the execution circuit of the core. The method may include storing a copy of the third set of at least one micro-operation in a system memory coupled to the processor; and storing a fourth set of at least one micro-operation into the patch memory, wherein the microcode sequencer causes execution of the fourth set to cause the third set of at least one micro-operation to be loaded into the section of the cache from the system memory. The method may include wherein the microcode sequencer causes the fourth set to be executed when the core is transitioned to a power state that turns on the voltage to the core.

In another embodiment, a processor includes a core; a control register for the core; a cache having a section to store context information from the core when the core is transitioned to a power state that shuts off voltage to the core; a fetch circuit of the core to fetch a first instruction, a second instruction, a third instruction, and a fourth instruction; a decoder circuit of the core coupled to the fetch circuit to decode the first instruction into a first set of at least one micro-operation; an execution circuit to execute micro-operations; and a microcode sequencer of the core coupled to the fetch circuit and comprising a patch memory and a read-only memory that stores a plurality of micro-operations, wherein the microcode sequencer: sends, to the execution circuit, a second set of at least one micro-operation from the plurality of micro-operations stored in the read-only memory for the second instruction received from the fetch circuit, causes, for the third instruction received from the fetch circuit, a third set of at least one micro-operation to be loaded into the patch memory from the section of the cache, and sends, to the execution circuit, the third set of at least one micro-operation from the patch memory when a first value is stored in a patch control field of the control register, and causes, for the fourth instruction received from the fetch circuit, a fourth set of at least one micro-operation to be loaded into the patch memory from the section of the cache, and sends, to the execution circuit, the fourth set of at least one micro-operation from the patch memory when a second value is stored in the patch control field of the control register. The power state may be a C6 power state according to an Advanced Configuration and Power Interface (ACPI) standard. The patch memory may include a fifth set of at least one micro-operation for the third instruction that, when the microcode sequencer causes the fifth set to be executed, causes the third set of at least one micro-operation to be loaded into the patch memory from the section of the cache when the first value is stored in the patch control field of the control register. Firmware, stored in non-transitory storage coupled to the processor, may include an instruction that when decoded and executed by the processor causes the processor to insert the fifth set of at least one micro-operation into the patch memory for the third instruction. The third set of at least one micro-operation loaded into the patch memory may overwrites at least one of a plurality of micro-operations stored in the patch memory, and the microcode sequencer may reload the at least one of the plurality of micro-operations that was overwritten when execution of the third set of at least one micro-operation is complete. The first value may indicate client mode and the second value may indicates server mode. The processor may include a system memory comprising a copy of the third set of at least one micro-operation coupled to the processor, wherein the patch memory comprises a fifth set of at least one micro-operation that, when the microcode sequencer causes the fifth set to be executed, causes the third set of at least one micro-operation to be loaded into the section of the cache from the system memory. The microcode sequencer may cause the fifth set to be executed when the core is transitioned to a power state that turns on the voltage to the core.

In yet another embodiment, a method includes storing a first value or a second value in a patch control field of a control register of a core of a processor; fetching a first instruction, a second instruction, a third instruction, and a fourth instruction with a fetch circuit of the core of the processor; decoding the first instruction into a first set of at least one micro-operation with a decoder circuit of the core; sending the first set of at least one micro-operation from the decoder circuit to an execution circuit of the core; storing a third set of at least one micro-operation for the third instruction in a section of a cache that stores context information from the core when the core is transitioned to a power state that shuts off voltage to the core; storing a fourth set of at least one micro-operation for the fourth instruction in the section of the cache that stores context information from the core when the core is transitioned to the power state that shuts off voltage to the core; sending, by a microcode sequencer of the core, a second set of at least one micro-operation stored in a read-only memory of the microcode sequencer for the second instruction to the execution circuit of the core; loading, by the microcode sequencer of the core, the third set of at least one micro-operation into a patch memory of the microcode sequencer from the section of the cache when the first value is stored in the patch control field of the control register; sending, by the microcode sequencer of the core, the third set of at least one micro-operation from the patch memory to the execution circuit when the first value is stored in the patch control field of the control register; loading, by the microcode sequencer of the core, the fourth set of at least one micro-operation into the patch memory of the microcode sequencer from the section of the cache when the second value is stored in the patch control field of the control register; sending, by the microcode sequencer of the core, the fourth set of at least one micro-operation from the patch memory to the execution circuit when the second value is stored in the patch control field of the control register; and executing the first set, the second set, and the third set or the fourth set of micro-operations with the execution circuit of the core. The power state may be a C6 power state according to an Advanced Configuration and Power Interface (ACPI) standard. The method may include storing a fifth set of at least one micro-operation for the third instruction into the patch memory of the microcode sequencer, wherein, in response to receipt of a request for the third instruction, the microcode sequencer causes execution of the fifth set that causes the loading of the third set of at least one micro-operation into the patch memory of the microcode sequencer from the section of the cache, and the sending of the third set of at least one micro-operation from the patch memory to the execution circuit when the first value is stored in the patch control field of the control register. The method may include storing firmware including an instruction in non-transitory storage coupled to the processor, wherein decoding and executing of the instruction by the processor causes the storing of the fifth set of at least one micro-operation for the third instruction into the patch memory of the microcode sequencer. The method may include, wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete. The method may include storing a fifth set of at least one micro-operation for a fifth instruction in the section of the cache that stores context information from the core when the core is transitioned to the power state that shuts off voltage to the core; fetching the fifth instruction by the fetch circuit; loading, by the microcode sequencer of the core, the fifth set of at least one micro-operation into the patch memory of the microcode sequencer from the section of the cache; sending, by the microcode sequencer of the core, the fifth set of at least one micro-operation from the patch memory to the execution circuit; and executing the fifth set of at least one micro-operation with the execution circuit of the core. The method may include storing a copy of the third set of at least one micro-operation in a system memory coupled to the processor; and storing a fifth set of at least one micro-operation into the patch memory, wherein the microcode sequencer causes execution of the fifth set to cause the third set of at least one micro-operation to be loaded into the section of the cache from the system memory. The method may include wherein the microcode sequencer causes the fifth set to be executed when the core is transitioned to a power state that turns on the voltage to the core.

In another embodiment, a non-transitory machine readable medium stores code that when executed by a machine causes the machine to perform a method comprising storing a first value or a second value in a patch control field of a control register of a core of a processor; fetching a first instruction, a second instruction, a third instruction, and a fourth instruction with a fetch circuit of the core of the processor; decoding the first instruction into a first set of at least one micro-operation with a decoder circuit of the core; sending the first set of at least one micro-operation from the decoder circuit to an execution circuit of the core; storing a third set of at least one micro-operation for the third instruction in a section of a cache that stores context information from the core when the core is transitioned to a power state that shuts off voltage to the core; storing a fourth set of at least one micro-operation for the fourth instruction in the section of the cache that stores context information from the core when the core is transitioned to the power state that shuts off voltage to the core; sending, by a microcode sequencer of the core, a second set of at least one micro-operation stored in a read-only memory of the microcode sequencer for the second instruction to the execution circuit of the core; loading, by the microcode sequencer of the core, the third set of at least one micro-operation into a patch memory of the microcode sequencer from the section of the cache when the first value is stored in the patch control field of the control register; sending, by the microcode sequencer of the core, the third set of at least one micro-operation from the patch memory to the execution circuit when the first value is stored in the patch control field of the control register; loading, by the microcode sequencer of the core, the fourth set of at least one micro-operation into the patch memory of the microcode sequencer from the section of the cache when the second value is stored in the patch control field of the control register; sending, by the microcode sequencer of the core, the fourth set of at least one micro-operation from the patch memory to the execution circuit when the second value is stored in the patch control field of the control register; and executing the first set, the second set, and the third set or the fourth set of micro-operations with the execution circuit of the core. The power state may be a C6 power state according to an Advanced Configuration and Power Interface (ACPI) standard. The method may include storing a fifth set of at least one micro-operation for the third instruction into the patch memory of the microcode sequencer, wherein, in response to receipt of a request for the third instruction, the microcode sequencer causes execution of the fifth set that causes the loading of the third set of at least one micro-operation into the patch memory of the microcode sequencer from the section of the cache, and the sending of the third set of at least one micro-operation from the patch memory to the execution circuit when the first value is stored in the patch control field of the control register. The method may include storing firmware including an instruction in non-transitory storage coupled to the processor, wherein decoding and executing of the instruction by the processor causes the storing of the fifth set of at least one micro-operation for the third instruction into the patch memory of the microcode sequencer. The method may include, wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete. The method may include storing a fifth set of at least one micro-operation for a fifth instruction in the section of the cache that stores context information from the core when the core is transitioned to the power state that shuts off voltage to the core; fetching the fifth instruction by the fetch circuit; loading, by the microcode sequencer of the core, the fifth set of at least one micro-operation into the patch memory of the microcode sequencer from the section of the cache; sending, by the microcode sequencer of the core, the fifth set of at least one micro-operation from the patch memory to the execution circuit; and executing the fifth set of at least one micro-operation with the execution circuit of the core. The method may include storing a copy of the third set of at least one micro-operation in a system memory coupled to the processor; and storing a fifth set of at least one micro-operation into the patch memory, wherein the microcode sequencer causes execution of the fifth set to cause the third set of at least one micro-operation to be loaded into the section of the cache from the system memory. The method may include wherein the microcode sequencer causes the fifth set to be executed when the core is transitioned to a power state that turns on the voltage to the core.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel@ 64 and IA-32 Architectures Software Developer's Manual, May 2018; and see Intel@ Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
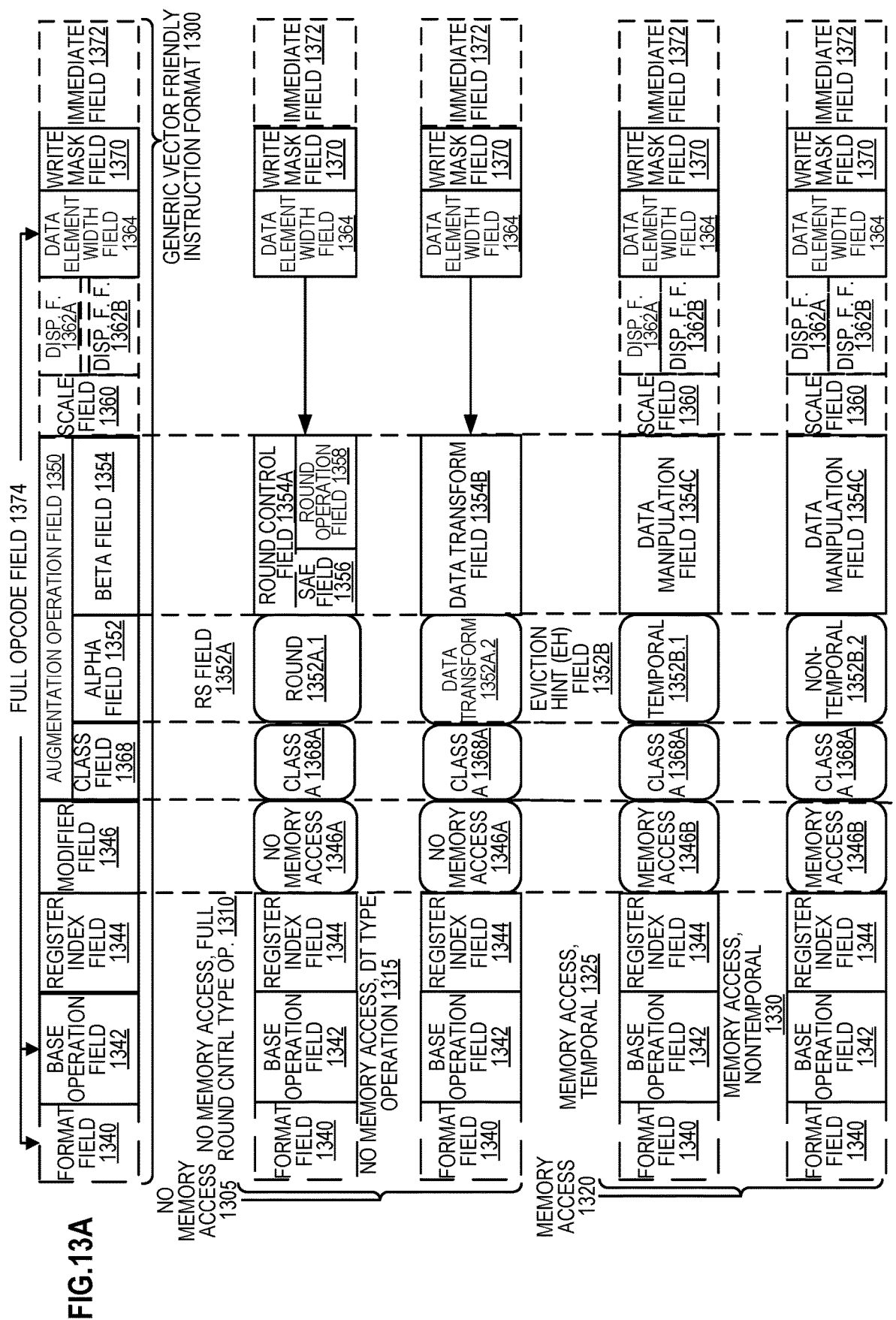
FIG. 13A is a block diagram illustrating a generic vector friendly instruction format and class A instruction templates thereof according to embodiments of the disclosure.
Figure 13B:
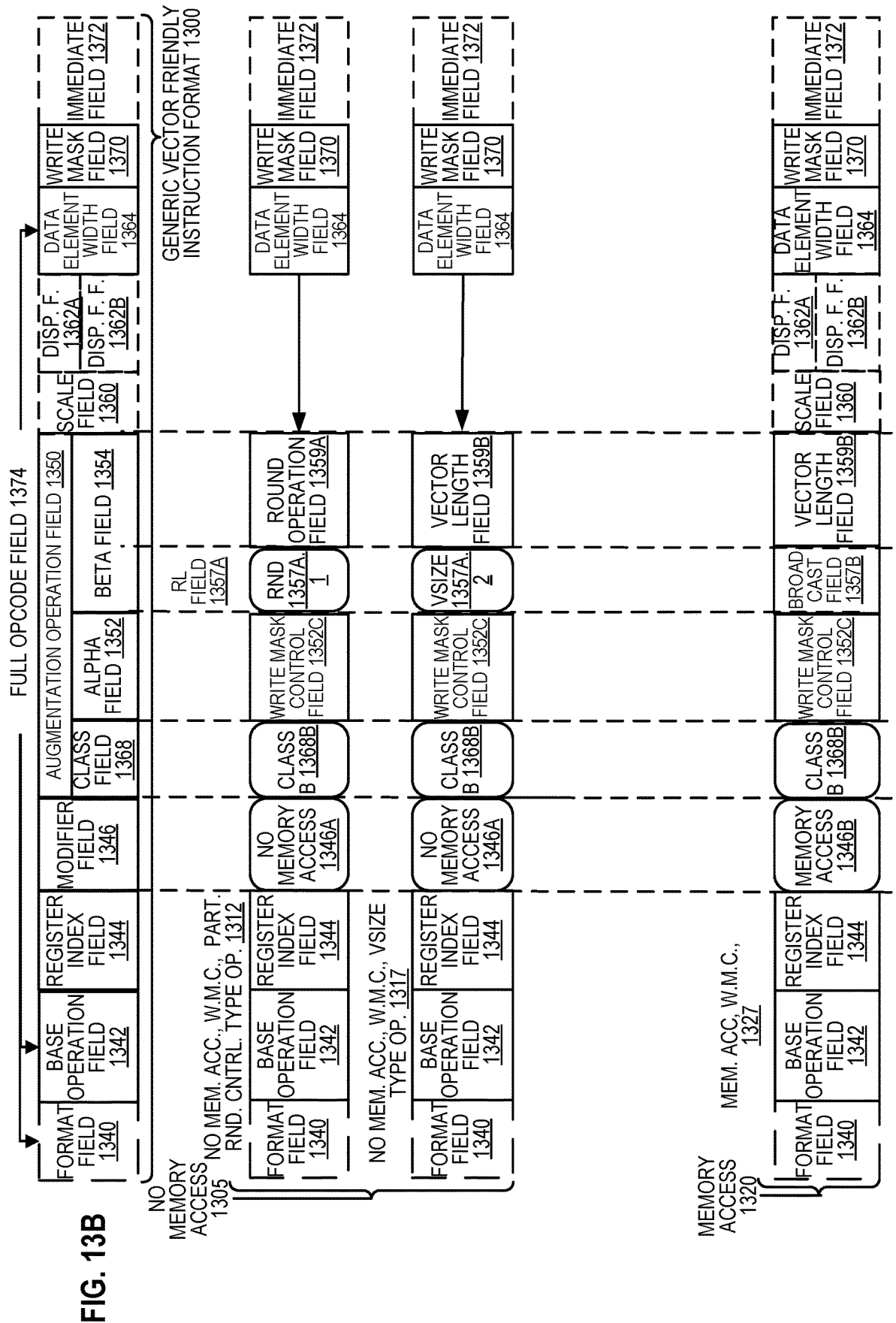
FIG. 13B is a block diagram illustrating the generic vector friendly instruction format and class B instruction templates thereof according to embodiments of the disclosure.

FIGS. 13A-13B are block diagrams illustrating a generic vector friendly instruction format and instruction templates thereof according to embodiments of the disclosure. FIG. 13A is a block diagram illustrating a generic vector friendly instruction format and class A instruction templates thereof according to embodiments of the disclosure; while FIG. 13B is a block diagram illustrating the generic vector friendly instruction format and class B instruction templates thereof according to embodiments of the disclosure. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access (1346B) from those that do not (1346A); that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the disclosure, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*\text{index}+\text{base}$).

Displacement Field 1362A—its content is used as part of memory address generation (e.g., for address generation that uses $2^{scale}*\text{index}+\text{base}+\text{displacement}$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the disclosure are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement factor field 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the disclosure the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the disclosure where a processor includes a control register for specifying rounding modes, the round operation control field's 1358 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement factor field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement factor field 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the disclosure where a processor includes a control register for specifying rounding modes, the round operation control field's 1359A content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement factor field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIGS. 14A-D are block diagrams illustrating an exemplary specific vector friendly instruction format according to embodiments of the disclosure. FIGS. 14A-D show a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 13A-B into which the fields from FIGS. 14A-D map are illustrated.

It should be understood that, although embodiments of the disclosure are described with reference to the specific vector friendly instruction format 1400 in the context of the generic vector friendly instruction format 1300 for illustrative purposes, the disclosure is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the disclosure is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1405 (EVEX Byte 1, bits [7-5])—consists of an EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements). EVEX.vvvv 1420 (EVEX Byte 2, bits [6:3]-vvvv)—the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (is complement) form. Depending on the instruction, an extra different EVEX bit field is used to extend the specifier size to 32 registers. EVEX.U 1368 Class field (EVEX byte 2, bit [2]—U)—If EVEX.U=0, it indicates class A or EVEX.U0; if EVEX.U=1, it indicates class B or EVEX.U1.

Prefix encoding field 1425 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte 1450 (Byte 6)—As previously described, the scale field's 1360 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to one embodiment of the disclosure. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the disclosure. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
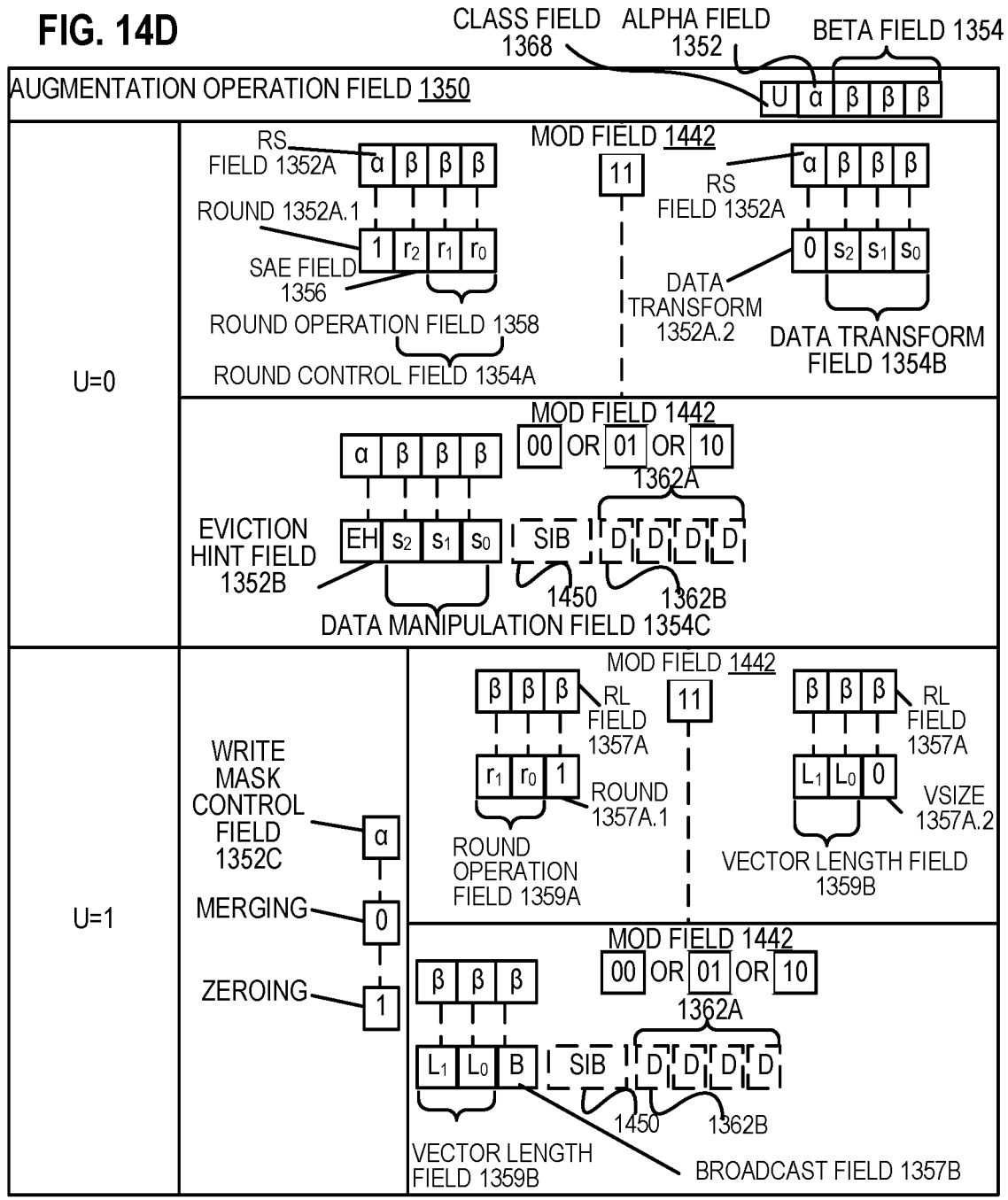
FIG. 14D is a block diagram illustrating the fields of the specific vector friendly instruction format in FIG. 14A that make up the augmentation operation field 1350 according to one embodiment of the disclosure.

FIG. 14D is a block diagram illustrating the fields of the specific vector friendly instruction format 1400 that make up the augmentation operation field 1350 according to one embodiment of the disclosure. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]—EH) is interpreted as the rs field 1352A. When the rs field 1352A contains a 1 (round 1352A.1), the beta field 1354 (EVEX byte 3, bits [6:4]—SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]—SSS) is interpreted as a three bit data transform field 1354B. When U=0 and the MOD field 1442 contains 00, 01, or 10 (signifying a memory access operation), the alpha field 1352 (EVEX byte 3, bit [7]—EH) is interpreted as the eviction hint (EH) field 1352B and the beta field 1354 (EVEX byte 3, bits [6:4]—SSS) is interpreted as a three bit data manipulation field 1354C.

When U=1, the alpha field 1352 (EVEX byte 3, bit [7]—EH) is interpreted as the write mask control (Z) field 1352C. When U=1 and the MOD field 1442 contains 11 (signifying a no memory access operation), part of the beta field 1354 (EVEX byte 3, bit [4]—S$_0$) is interpreted as the RL field 1357A; when it contains a 1 (round 1357A.1) the rest of the beta field 1354 (EVEX byte 3, bit [6-5]–S$_{2-1}$) is interpreted as the round operation field 1359A, while when the RL field 1357A contains a 0 (VSIZE 1357.A2) the rest of the beta field 1354 (EVEX byte 3, bit [6-5]–S$_{2-1}$) is interpreted as the vector length field 1359B (EVEX byte 3, bit [6-5]—L$_{1-0}$). When U=1 and the MOD field 1442 contains 00, 01, or 10 (signifying a memory access operation), the beta field 1354 (EVEX byte 3, bits [6:4]—SSS) is interpreted as the vector length field 1359B (EVEX byte 3, bit [6-5]—L$_{1-0}$) and the broadcast field 1357B (EVEX byte 3, bit [4]—B).

Exemplary Register Architecture

Figure 15:
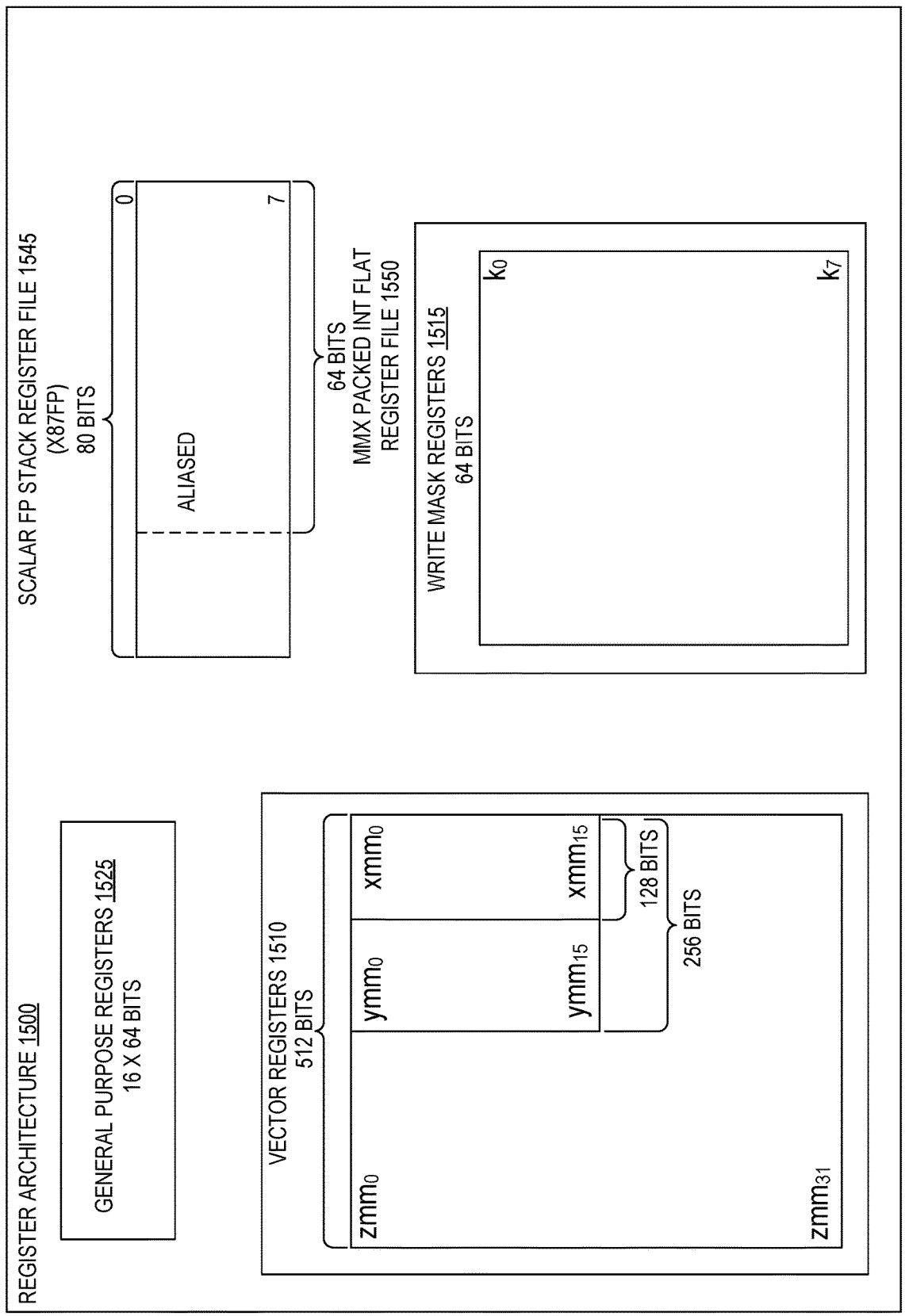
FIG. 15 is a block diagram of a register architecture according to one embodiment of the disclosure.

FIG. 15 is a block diagram of a register architecture 1500 according to one embodiment of the disclosure. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmnm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the disclosure. FIG. 16B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macro-instructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler units 1656. The scheduler unit(s) 1656 represents any number of different schedulers, including reservations stations, central instruction window, etc. The scheduler unit(s) 1656 is coupled to the physical register file unit(s) 1658. Each of the physical register file unit(s) 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1658 comprises a vector registers unit, a write mask registers unit, and a scalar registers unit. These register units may provide architectural vector registers, vector mask registers, and general purpose registers. The physical register file unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register map(s) and a pool of registers; etc.). The retirement unit 1654 and the physical register file unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file unit(s) 1658 and the memory unit 1670 perform the register read/memory read stage 1614; the execution cluster 1660 perform the execute stage 1616; 6) the memory unit 1670 and the physical register file unit(s) 1658 perform the write back/memory write stage 1618; 7) various units may be involved in the exception handling stage 1622; and 8) the retirement unit 1654 and the physical register file unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel@ Hyper-Threading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
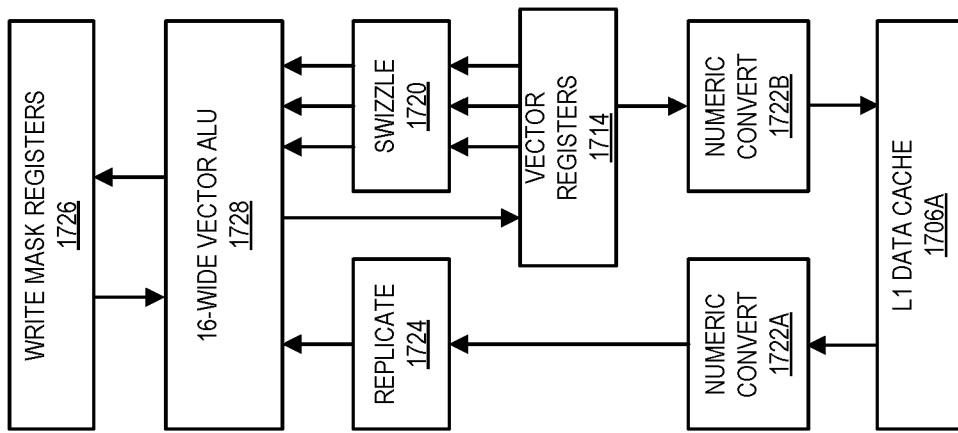
FIG. 17B is an expanded view of part of the processor core in FIG. 17A according to embodiments of the disclosure.
Figure 17A:
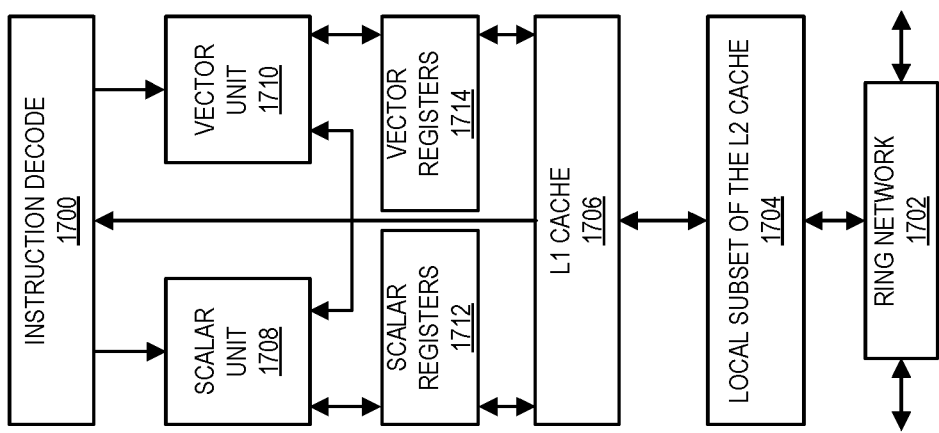
FIG. 17A is a block diagram of a single processor core, along with its connection to the on-die interconnect network and with its local subset of the Level 2 (L2) cache, according to embodiments of the disclosure.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the disclosure. In one embodiment, an instruction decode unit 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the disclosure may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the disclosure. FIG. 17B includes an L1 data cache 1706A that is part of the L1 cache 1706, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
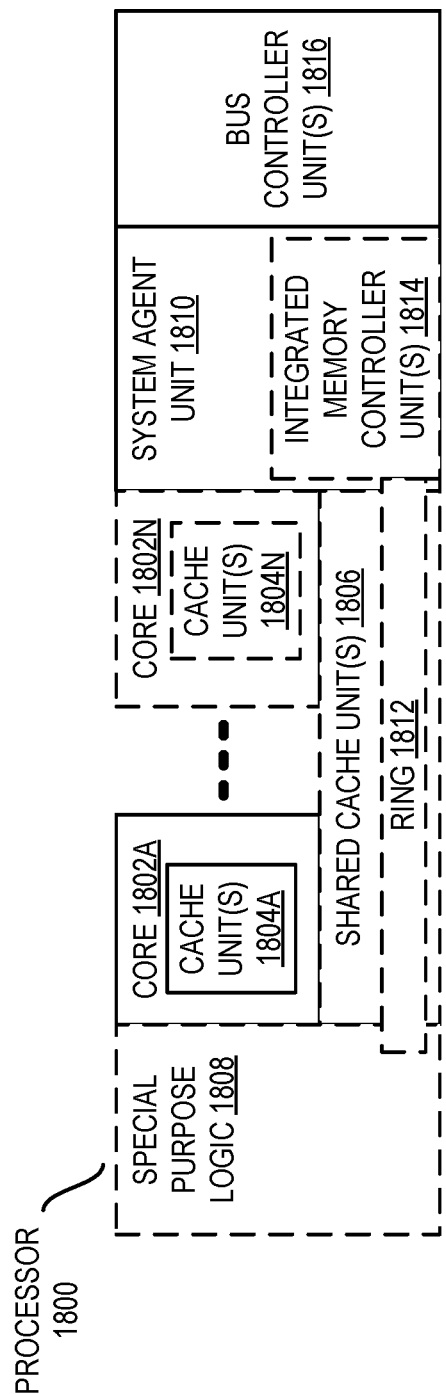
FIG. 18 is a block diagram of a processor that may have more than one core, may have an integrated memory controller, and may have integrated graphics according to embodiments of the disclosure.

FIG. 18 is a block diagram of a processor 1800 that may have more than one core, may have an integrated memory controller, and may have integrated graphics according to embodiments of the disclosure. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache unit(s) 1804A-N within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of executing the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
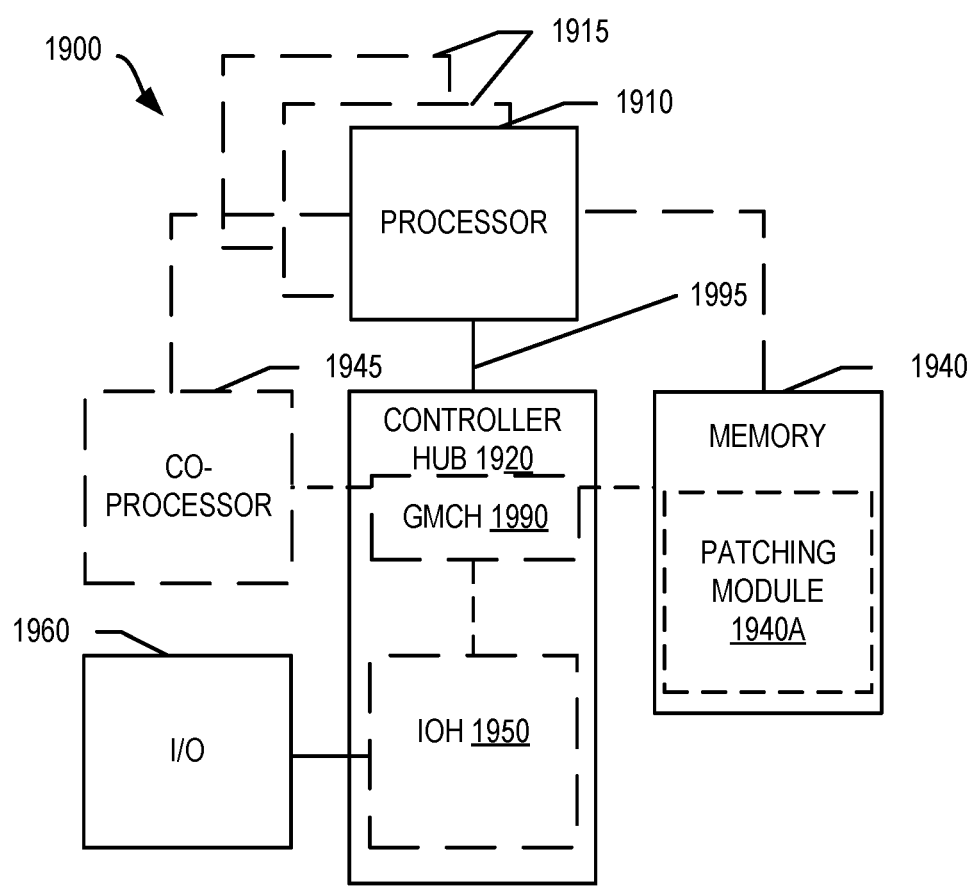
FIG. 19 is a block diagram of a system in accordance with one embodiment of the present disclosure.

Referring now to FIG. 19, shown is a block diagram of a system 1900 in accordance with one embodiment of the present disclosure. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 is in a single chip with the IOH 1950. Memory 1940 may include a patching module 1940A, for example, to store code that when executed causes a processor to perform any method of this disclosure.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as Quickpath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
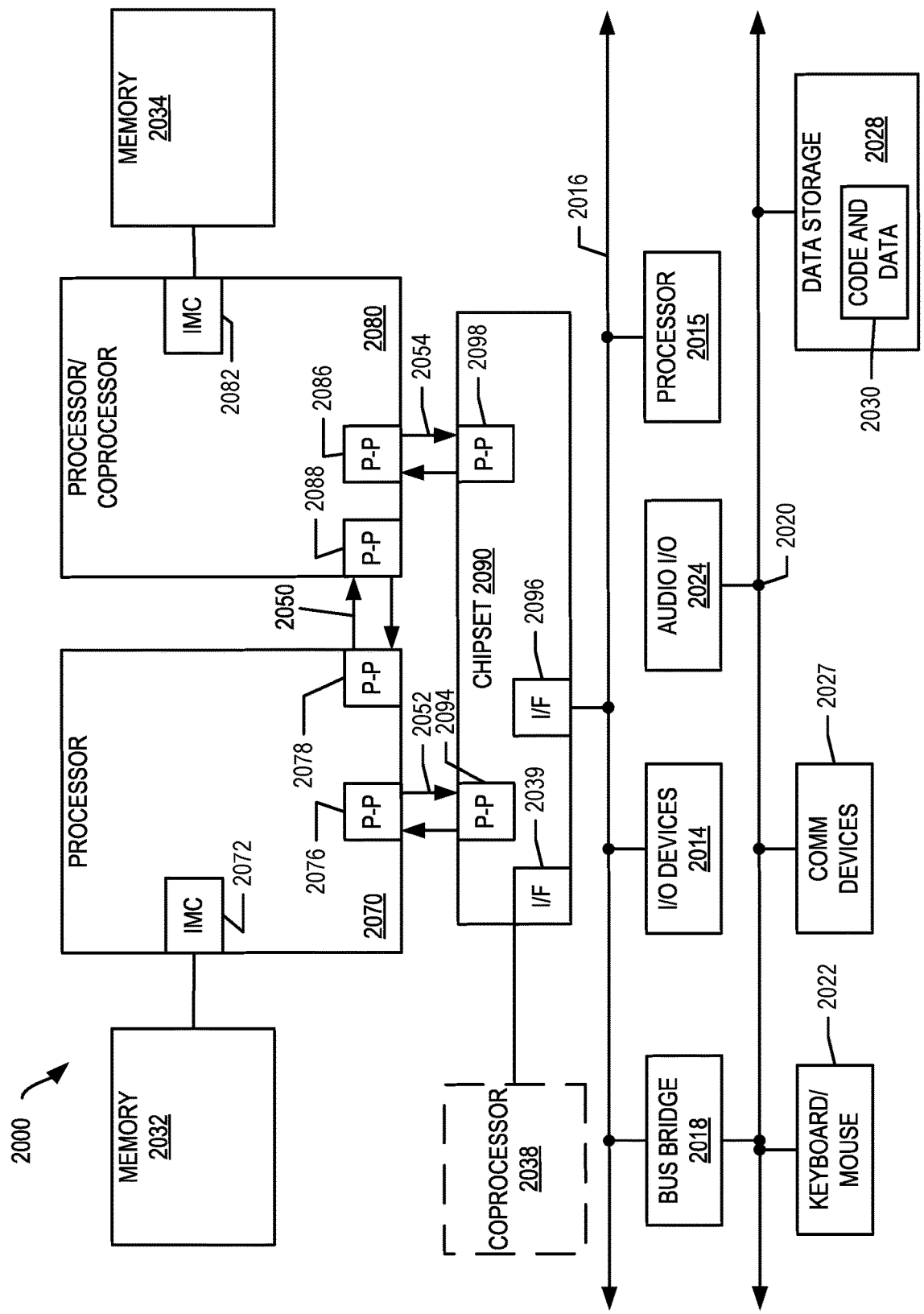
FIG. 20 is a block diagram of a more specific exemplary system in accordance with an embodiment of the present disclosure.

Referring now to FIG. 20, shown is a block diagram of a first more specific exemplary system 2000 in accordance with an embodiment of the present disclosure. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the disclosure, processors 2070 and 2080 are respectively processors 1910 and 1915, while coprocessor 2038 is coprocessor 1945. In another embodiment, processors 2070 and 2080 are respectively processor 1910 and coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present disclosure is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
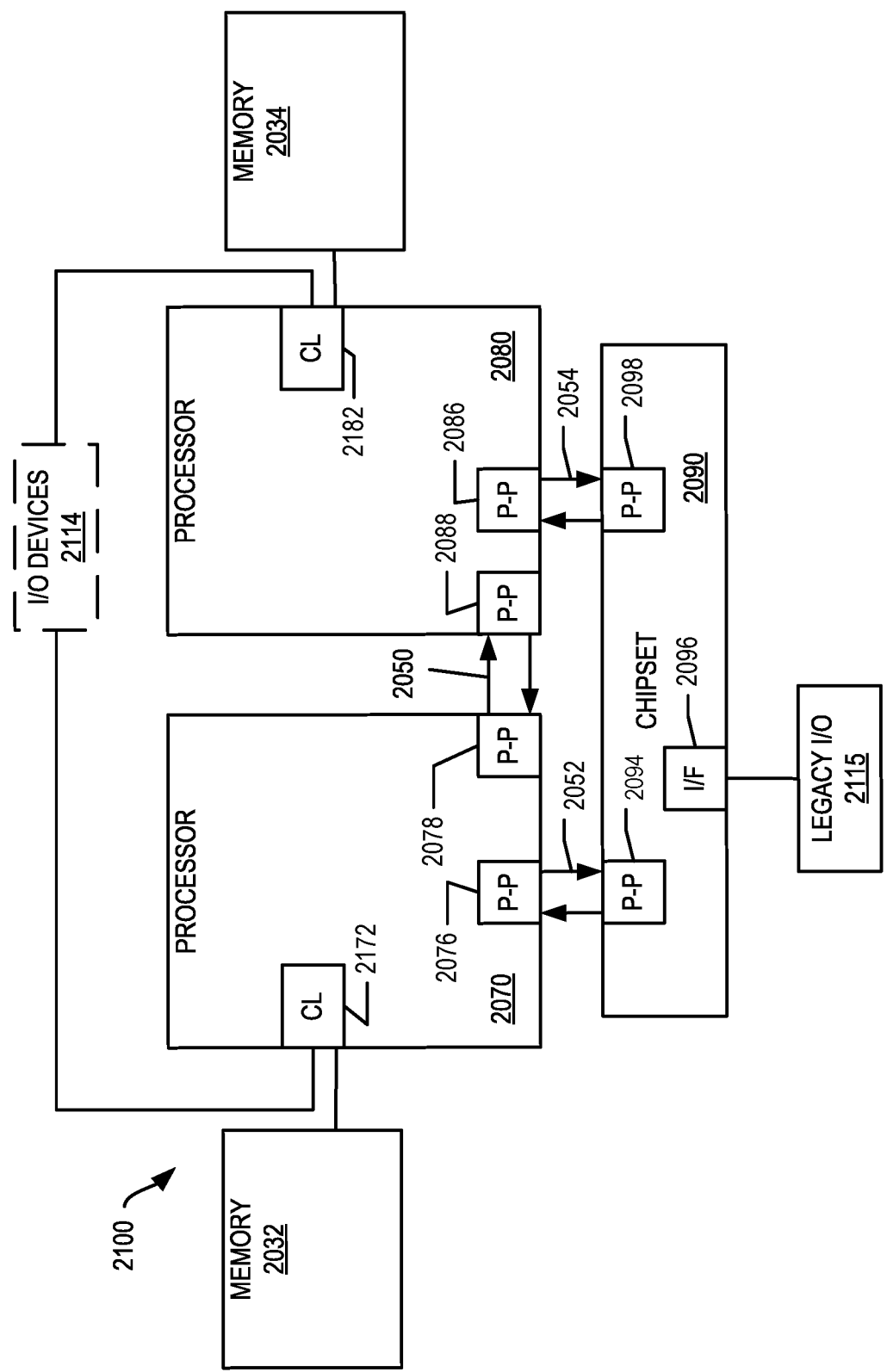
FIG. 21 is a block diagram of a second more specific exemplary system in accordance with an embodiment of the present disclosure.

Referring now to FIG. 21, shown is a block diagram of a second more specific exemplary system 2100 in accordance with an embodiment of the present disclosure. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2172 and 2182, respectively. Thus, the CL 2172, 2182 include integrated memory controller units and include I/O control logic. FIG. 21 illustrates that not only are the memories 2032, 2034 coupled to the CL 2172, 2182, but also that I/O devices 2114 are also coupled to the control logic 2172, 2182. Legacy I/O devices 2115 are coupled to the chipset 2090.

Figure 22:
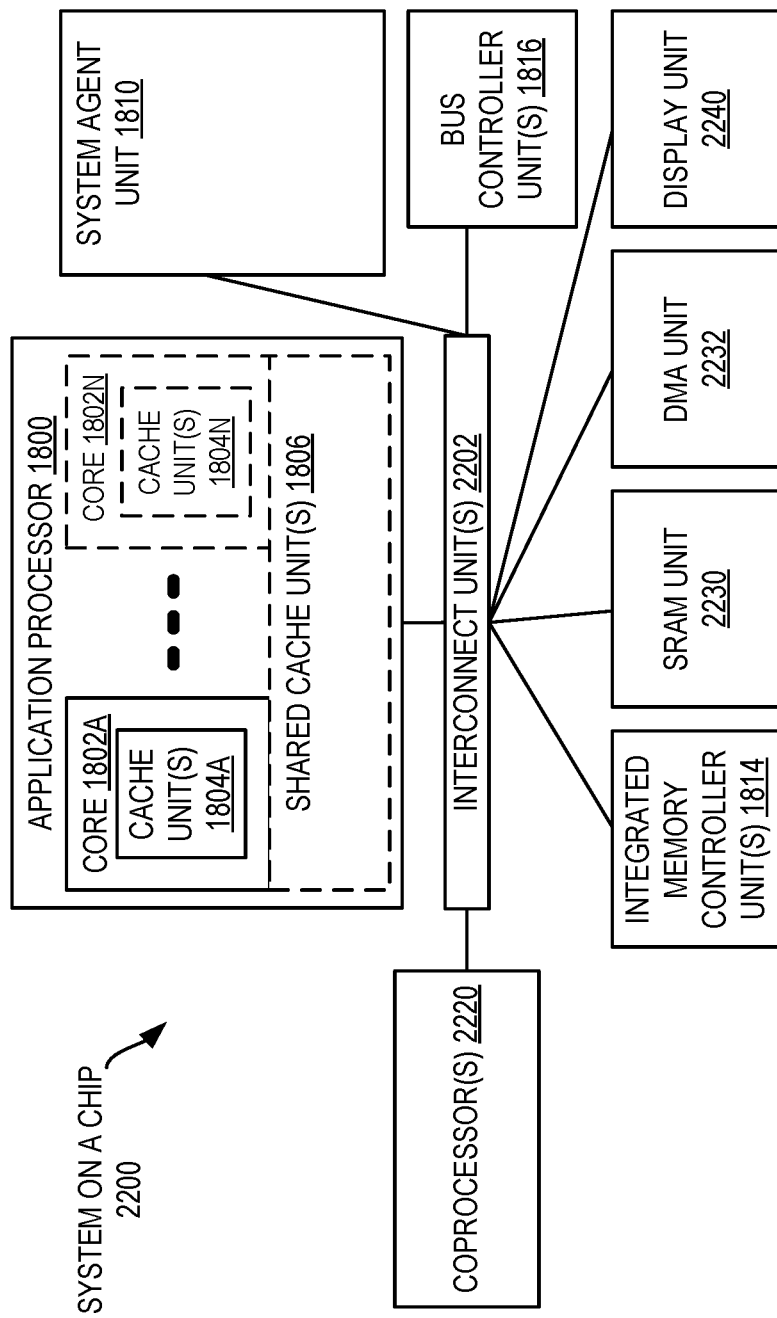
FIG. 22 is a block diagram of a system on a chip (SoC) in accordance with an embodiment of the present disclosure.

Referring now to FIG. 22, shown is a block diagram of a SoC 2200 in accordance with an embodiment of the present disclosure. Similar elements in FIG. 18 bear like reference numerals. Also, dashed lined boxes are optional features on more advanced SoCs. In FIG. 22, an interconnect unit(s) 2202 is coupled to: an application processor 1800 which includes a set of one or more cores 1802A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; a static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
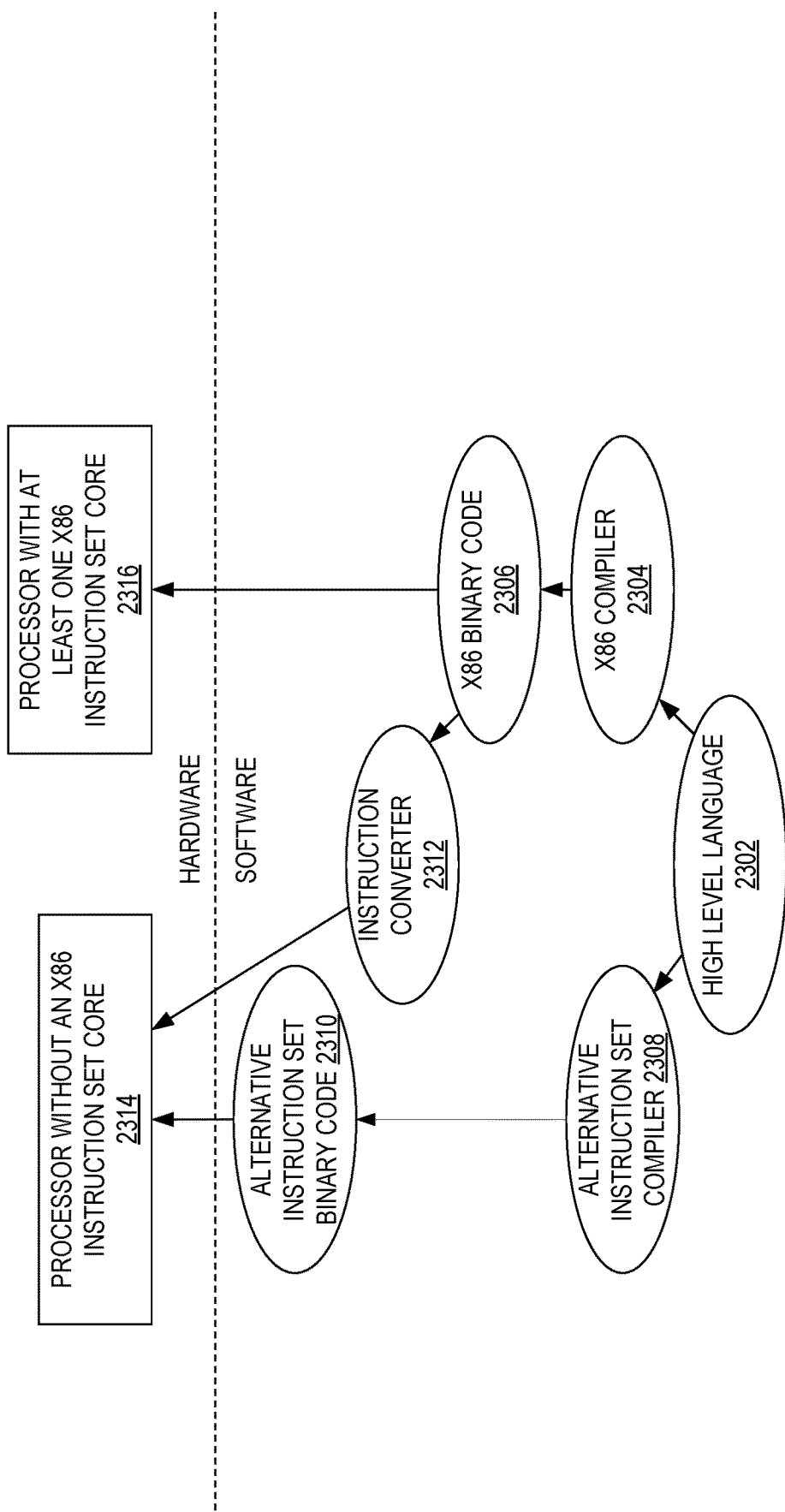
FIG. 23 is a block diagram contrasting the use of a software instruction converter to convert binary instructions in a source instruction set to binary instructions in a target instruction set according to embodiments of the disclosure.

FIG. 23 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel@ processor with at least one x86 instruction set core by compatibly executing or otherwise processing (1) a substantial portion of the instruction set of the Intel@ x86 instruction set core or (2) object code versions of applications or other software targeted to run on an Intel@ processor with at least one x86 instruction set core, in order to achieve substantially the same result as an Intel@ processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

What is claimed is:
1. A processor comprising:
a core comprising:
a fetch circuit to fetch a first instruction, a second instruction, and a third instruction,
a decoder circuit coupled to the fetch circuit to decode the first instruction into a first set of at least one micro-operation, and
an execution circuit to execute micro-operations;
a cache having a section to store context information from the core when the core is transitioned to a power state that shuts off voltage to the core; and
a microcode sequencer of the core coupled to the fetch circuit and comprising a patch memory and a read-only memory that stores a plurality of micro-operations, wherein the microcode sequencer:
sends, to the execution circuit, a second set of at least one micro-operation from the plurality of micro-operations stored in the read-only memory for the second instruction received from the fetch circuit,
causes a store of a third set of at least one micro-operation into a system memory coupled to the processor in response to a microcode patch binary image sent by a manufacturer for the third instruction,
sends, to the execution circuit, a fourth set of at least one micro-operation that, when executed, causes the third set of at least one micro-operation to be loaded into the section of the cache from the system memory, and
causes, in response to the third instruction received from the fetch circuit, the third set of at least one micro-operation to be loaded into the patch memory from the section of the cache, and sends, to the execution circuit, the third set of at least one micro-operation from the patch memory,
wherein, when the third set of at least one micro-operation loaded into the patch memory overwrites at least one of a plurality of micro-operations stored in the patch memory, the microcode sequencer reloads the at least one of the plurality of micro-operations that was overwritten when execution of the third set of at least one micro-operation is complete.

2. The processor of claim 1, wherein the power state is a C6 power state according to an Advanced Configuration and Power Interface (ACPI) standard.

3. The processor of claim 1, wherein the read-only memory comprises a fifth set of at least one micro-operation for the third instruction that, when the microcode sequencer causes the fifth set to be executed, causes the third set of at least one micro-operation to be loaded into the patch memory from the section of the cache.

4. The processor of claim 1, wherein firmware, stored in non-transitory storage coupled to the processor, comprises an instruction that when decoded and executed by the processor causes the processor to insert the third set of at least one micro-operation into the system memory for the third instruction.

5. The processor of claim 1, wherein the microcode sequencer causes, for a fourth instruction fetched by the fetch circuit, a fifth set of at least one micro-operation, different than the third set, to be loaded into the patch memory from the section of the cache, and sends, to the execution circuit, the fifth set of at least one micro-operation from the patch memory.

6. The processor of claim 1, wherein the microcode sequencer causes the fourth set of at least one micro-operation to be executed when the core is transitioned to a power state that turns on the voltage to the core.

7. The processor of claim 1, wherein the microcode sequencer further causes a store of the fourth set of at least one micro-operation into the section of the cache.

8. The processor of claim 1, wherein the microcode sequencer encrypts the third set of at least one micro-operation into an encrypted third set, and the store of the third set into the system memory is a store of the encrypted third set into the system memory.

9. The processor of claim 8, wherein execution of the fourth set of at least one micro-operation authenticates and decrypts the encrypted third set into an authenticated and decrypted third set, and the third set that is loaded into the section of the cache from the system memory is the authenticated and decrypted third set.

10. A method comprising:
fetching a first instruction, a second instruction, and a third instruction with a fetch circuit of a core of a processor;
decoding the first instruction into a first set of at least one micro-operation with a decoder circuit of the core;
sending the first set of at least one micro-operation from the decoder circuit to an execution circuit of the core;
storing a third set of at least one micro-operation into a system memory coupled to the processor in response to a microcode patch binary image sent by a manufacturer for the third instruction;
executing a fourth set of at least one micro-operation that causes the third set of at least one micro-operation to be loaded from the system memory into a section of a cache that stores context information from the core when the core is transitioned to a power state that shuts off voltage to the core;
sending, by a microcode sequencer of the core, a second set of at least one micro-operation stored in a read-only memory of the microcode sequencer for the second instruction to the execution circuit of the core;
loading, by the microcode sequencer of the core in response to the third instruction received from the fetch circuit, the third set of at least one micro-operation into a patch memory of the microcode sequencer from the section of the cache;
sending, by the microcode sequencer of the core, the third set of at least one micro-operation from the patch memory to the execution circuit; and
executing the first set, the second set, and the third set of at least one micro-operation with the execution circuit of the core,
wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete.

11. The method of claim 10, wherein the power state is a C6 power state according to an Advanced Configuration and Power Interface (ACPI) standard.

12. The method of claim 10, wherein, in response to receipt of a request for the third instruction, the microcode sequencer causes execution of a fifth set of at least one micro-operation from the read-only memory that causes the loading of the third set of at least one micro-operation into the patch memory of the microcode sequencer from the section of the cache, and the sending of the third set of at least one micro-operation from the patch memory to the execution circuit.

13. The method of claim 10, further comprising storing firmware including an instruction in non-transitory storage coupled to the processor, wherein decoding and executing of the instruction from the firmware by the processor causes the storing of the third set of at least one micro-operation for the third instruction into the system memory.

14. The method of claim 10, further comprising:
storing a fifth set of at least one micro-operation for a fourth instruction in the section of the cache that stores context information from the core when the core is transitioned to the power state that shuts off voltage to the core;
fetching the fourth instruction by the fetch circuit;
loading, by the microcode sequencer of the core, the fifth set of at least one micro-operation into the patch memory of the microcode sequencer from the section of the cache;
sending, by the microcode sequencer of the core, the fifth set of at least one micro-operation from the patch memory to the execution circuit; and
executing the fifth set of at least one micro-operation with the execution circuit of the core.

15. The method of claim 10, further comprising causing the fourth set of at least one micro-operation to be executed when the core is transitioned to a power state that turns on the voltage to the core.

16. The method of claim 10, further comprising storing, by the microcode sequencer of the core, the fourth set of at least one micro-operation into the section of the cache.

17. The method of claim 10, further comprising encrypting the third set of at least one micro-operation into an encrypted third set, wherein the storing of the third set into the system memory comprises storing the encrypted third set into the system memory.

18. The method of claim 17, wherein the executing the fourth set of at least one micro-operation comprises authenticating and decrypting the encrypted third set into an authenticated and decrypted third set, and the loading of the third set into the section of the cache from the system memory comprises loading the authenticated and decrypted third set into the section of the cache.

19. A non-transitory machine readable medium that stores code that when executed by a machine causes the machine to perform a method comprising:
fetching a first instruction, a second instruction, and a third instruction with a fetch circuit of a core of a processor;
decoding the first instruction into a first set of at least one micro-operation with a decoder circuit of the core;
sending the first set of at least one micro-operation from the decoder circuit to an execution circuit of the core;
storing a third set of at least one micro-operation into a system memory coupled to the processor in response to a microcode patch binary image sent by a manufacturer for the third instruction;
executing a fourth set of at least one micro-operation that causes the third set of at least one micro-operation to be loaded from the system memory into a section of a cache that stores context information from the core when the core is transitioned to a power state that shuts off voltage to the core;
sending, by a microcode sequencer of the core, a second set of at least one micro-operation stored in a read-only memory of the microcode sequencer for the second instruction to the execution circuit of the core;
loading, by the microcode sequencer of the core in response to the third instruction received from the fetch circuit, the third set of at least one micro-operation into a patch memory of the microcode sequencer from the section of the cache;

sending, by the microcode sequencer of the core, the third set of at least one micro-operation from the patch memory to the execution circuit; and executing the first set, the second set, and the third set of at least one micro-operation with the execution circuit of the core, wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete.

20. The non-transitory machine readable medium of claim 19, wherein the power state is a C6 power state according to an Advanced Configuration and Power Interface (ACPI) standard.

21. The non-transitory machine readable medium of claim 19, wherein, in response to receipt of a request for the third instruction, the microcode sequencer causes execution of a fifth set of at least one micro-operation from the read-only memory that causes the loading of the third set of at least one micro-operation into the patch memory of the microcode sequencer from the section of the cache, and the sending of the third set of at least one micro-operation from the patch memory to the execution circuit.

22. The non-transitory machine readable medium of claim 19, wherein the method further comprises:

storing a fifth set of at least one micro-operation for a fourth instruction in the section of the cache that stores context information from the core when the core is transitioned to the power state that shuts off voltage to the core;

fetching the fourth instruction by the fetch circuit;

loading, by the microcode sequencer of the core, the fifth set of at least one micro-operation into the patch memory of the microcode sequencer from the section of the cache;

sending, by the microcode sequencer of the core, the fifth set of at least one micro-operation from the patch memory to the execution circuit; and executing the fifth set of at least one micro-operation with the execution circuit of the core.

23. The non-transitory machine readable medium of claim 19, wherein the method further comprises causing the fourth set of at least one micro-operation to be executed when the core is transitioned to a power state that turns on the voltage to the core.

24. The non-transitory machine readable medium of claim 19, wherein the method further comprises storing, by the microcode sequencer of the core, the fourth set of at least one micro-operation into the section of the cache.

25. The non-transitory machine readable medium of claim 19, wherein the method further comprises encrypting the third set of at least one micro-operation into an encrypted third set, wherein the storing of the third set into the system memory comprises storing the encrypted third set into the system memory.

26. The non-transitory machine readable medium of claim 25, wherein the executing the fourth set of at least one micro-operation comprises authenticating and decrypting the encrypted third set into an authenticated and decrypted third set, and the loading of the third set into the section of the cache from the system memory comprises loading the authenticated and decrypted third set into the section of the cache.

27. A processor comprising:

a core comprising:
- a fetch circuit to fetch a first instruction, a second instruction, and a third instruction,
- a decoder circuit coupled to the fetch circuit to decode the first instruction into a first set of at least one micro-operation, and
- an execution circuit to execute micro-operations;

a cache having a section to store context information from the core when the core is transitioned to a power state that shuts off voltage to the core; and a microcode sequencer of the core coupled to the fetch circuit and comprising a patch memory and a read-only memory that stores a plurality of micro-operations, wherein the microcode sequencer:

sends, to the execution circuit, a second set of at least one micro-operation from the plurality of micro-operations stored in the read-only memory for the second instruction received from the fetch circuit, causes a third set of at least one micro-operation to be stored in the section of the cache in response to a microcode patch binary image sent by a manufacturer for the third instruction, and causes, in response to the third instruction received from the fetch circuit, the third set of at least one micro-operation to be loaded into the patch memory from the section of the cache, and sends, to the execution circuit, the third set of at least one micro-operation from the patch memory, wherein the patch memory comprises a fourth set of at least one micro-operation that, when the microcode sequencer causes the fourth set to be executed, causes the third set of at least one micro-operation to be loaded into the patch memory from the section of the cache, wherein, when the third set of at least one micro-operation loaded into the patch memory overwrites at least one of a plurality of micro-operations stored in the patch memory, the microcode sequencer reloads the at least one of the plurality of micro-operations that was overwritten when execution of the third set of at least one micro-operation is complete.

28. The processor of claim 27, wherein the power state is a C6 power state according to an Advanced Configuration and Power Interface (ACPI) standard.

29. The processor of claim 27, wherein firmware, stored in non-transitory storage coupled to the processor, comprises an instruction that when decoded and executed by the processor causes the processor to store the third set of at least one micro-operation into the section of the cache.

30. The processor of claim 27, wherein the microcode sequencer causes, for a fourth instruction fetched by the fetch circuit, a fifth set of at least one micro-operation, different than the third set, to be loaded into the patch memory from the section of the cache, and sends, to the execution circuit, the fifth set of at least one micro-operation from the patch memory.

31. The processor of claim 27, wherein the microcode sequencer causes a store of the third set of at least one micro-operation into a system memory coupled to the processor, and sends, to the execution circuit, a fifth set of at least one micro-operation that, when executed, causes the third set of at least one micro-operation to be loaded into the cache from the system memory.

32. The processor of claim 31, wherein the microcode sequencer causes the fifth set to be executed when the core is transitioned to a power state that turns on the voltage to the core.

33. A method comprising:
fetching a first instruction, a second instruction, and a third instruction with a fetch circuit of a core of a processor;
decoding the first instruction into a first set of at least one micro-operation with a decoder circuit of the core;
sending the first set of at least one micro-operation from the decoder circuit to an execution circuit of the core;
storing a third set of at least one micro-operation for the third instruction, in a section of a cache that stores context information from the core when the core is transitioned to a power state that shuts off voltage to the core, in response to a microcode patch binary image sent by a manufacturer for the third instruction;
sending, by a microcode sequencer of the core, a second set of at least one micro-operation stored in a read-only memory of the microcode sequencer for the second instruction to the execution circuit of the core;
loading, by the microcode sequencer of the core, the third set of at least one micro-operation into a patch memory of the microcode sequencer from the section of the cache;
sending, by the microcode sequencer of the core, the third set of at least one micro-operation from the patch memory to the execution circuit; and
executing the first set, the second set, and the third set of micro-operations with the execution circuit of the core, wherein, in response to receipt of a request to decode the third instruction, the microcode sequencer causes execution of a fourth set of at least one micro-operation from the patch memory that causes the loading of the third set of at least one micro-operation into the patch memory of the microcode sequencer from the section of the cache, and the sending of the third set of at least one micro-operation from the patch memory to the execution circuit,
wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that were overwritten when execution of the third set of at least one micro-operation is complete.

34. The method of claim 33, wherein the power state is a C6 power state according to an Advanced Configuration and Power Interface (ACPI) standard.

35. The method of claim 33, further comprising storing firmware including an instruction in non-transitory storage coupled to the processor, wherein decoding and executing of the instruction from the firmware by the processor causes the storing of the third set of at least one micro-operation into the section of the cache.

36. The method of claim 33, further comprising:
storing a fifth set of at least one micro-operation for a fourth instruction in the section of the cache that stores context information from the core when the core is transitioned to the power state that shuts off voltage to the core;
fetching the fourth instruction by the fetch circuit;
loading, by the microcode sequencer of the core, the fifth set of at least one micro-operation into the patch memory of the microcode sequencer from the section of the cache;
sending, by the microcode sequencer of the core, the fifth set of at least one micro-operation from the patch memory to the execution circuit; and
executing the fifth set of at least one micro-operation with the execution circuit of the core.

37. The method of claim 33, further comprising:
storing a copy of the third set of at least one micro-operation in a system memory coupled to the processor; and
storing a fifth set of at least one micro-operation into the patch memory, wherein the microcode sequencer causes execution of the fifth set to cause the third set of at least one micro-operation to be loaded into the section of the cache from the system memory.

38. The method of claim 37, further comprising causing the fifth set to be executed when the core is transitioned to a power state that turns on the voltage to the core.

39. A non-transitory machine readable medium that stores code that when executed by a machine causes the machine to perform a method comprising:
fetching a first instruction, a second instruction, and a third instruction with a fetch circuit of a core of a processor;
decoding the first instruction into a first set of at least one micro-operation with a decoder circuit of the core;
sending the first set of at least one micro-operation from the decoder circuit to an execution circuit of the core;
storing a third set of at least one micro-operation for the third instruction, in a section of a cache that stores context information from the core when the core is transitioned to a power state that shuts off voltage to the core, in response to a microcode patch binary image sent by a manufacturer for the third instruction;
sending, by a microcode sequencer of the core, a second set of at least one micro-operation stored in a read-only memory of the microcode sequencer for the second instruction to the execution circuit of the core;
loading, by the microcode sequencer of the core, the third set of at least one micro-operation into a patch memory of the microcode sequencer from the section of the cache;
sending, by the microcode sequencer of the core, the third set of at least one micro-operation from the patch memory to the execution circuit; and
executing the first set, the second set, and the third set of micro-operations with the execution circuit of the core, wherein, in response to receipt of a request to decode the third instruction, the microcode sequencer causes execution of a fourth set of at least one micro-operation from the patch memory that causes the loading of the third set of at least one micro-operation into the patch memory of the microcode sequencer from the section of the cache, and the sending of the third set of at least one micro-operation from the patch memory to the execution circuit,
wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that were overwritten when execution of the third set of at least one micro-operation is complete.

40. The non-transitory machine readable medium of claim 39, wherein the power state is a C6 power state according to an Advanced Configuration and Power Interface (ACPI) standard.

41. The non-transitory machine readable medium of claim 39, wherein the method further comprises:
   storing a fifth set of at least one micro-operation for a fourth instruction in the section of the cache that stores context information from the core when the core is transitioned to the power state that shuts off voltage to the core;
   fetching the fourth instruction by the fetch circuit;
   loading, by the microcode sequencer of the core, the fifth set of at least one micro-operation into the patch memory of the microcode sequencer from the section of the cache;
   sending, by the microcode sequencer of the core, the fifth set of at least one micro-operation from the patch memory to the execution circuit; and
   executing the fifth set of at least one micro-operation with the execution circuit of the core.

42. The non-transitory machine readable medium of claim 39, wherein the method further comprises:
   storing a copy of the third set of at least one micro-operation in a system memory coupled to the processor; and
   storing a fifth set of at least one micro-operation into the patch memory, wherein the microcode sequencer causes execution of the fifth set to cause the third set of at least one micro-operation to be loaded into the section of the cache from the system memory.

43. The non-transitory machine readable medium of claim 42, wherein the method further comprises causing the fifth set to be executed when the core is transitioned to a power state that turns on the voltage to the core.

44. A processor comprising:
   a core comprising:
      a fetch circuit to fetch a first instruction, a second instruction, and a third instruction,
      a decoder circuit coupled to the fetch circuit to decode the first instruction into a first set of at least one micro-operation, and
      an execution circuit to execute micro-operations;
   a cache having a section to store context information from the core when the core is transitioned to a power state that shuts off voltage to the core; and
   a microcode sequencer of the core coupled to the fetch circuit and comprising a patch memory and a read-only memory that stores a plurality of micro-operations, wherein the microcode sequencer:
      sends, to the execution circuit, a second set of at least one micro-operation from the plurality of micro-operations stored in the read-only memory for the second instruction received from the fetch circuit, and
      causes, for the third instruction received from the fetch circuit, a third set of at least one micro-operation to be loaded into the patch memory from the section of the cache, and sends, to the execution circuit, the third set of at least one micro-operation from the patch memory, wherein, when the third set of at least one micro-operation loaded into the patch memory overwrites at least one of a plurality of micro-operations stored in the patch memory, the microcode sequencer is to reload the at least one of the plurality of micro-operations that was overwritten when execution of the third set of at least one micro-operation is complete.

45. The processor of claim 44, wherein the power state is a C6 power state according to an Advanced Configuration and Power Interface (ACPI) standard.

46. The processor of claim 44, wherein the read-only memory comprises a fourth set of at least one micro-operation for the third instruction that, when the microcode sequencer causes the fourth set to be executed, causes the third set of at least one micro-operation to be loaded into the patch memory from the section of the cache.

47. The processor of claim 44, wherein firmware, stored in non-transitory storage coupled to the processor, comprises an instruction that when decoded and executed by the processor causes the processor to store the third set of at least one micro-operation into the section of the cache.

48. The processor of claim 44, wherein the microcode sequencer causes, for a fourth instruction fetched by the fetch circuit, a fourth set of at least one micro-operation, different than the third set, to be loaded into the patch memory from the section of the cache, and sends, to the execution circuit, the fourth set of at least one micro-operation from the patch memory.

49. The processor of claim 44, wherein the microcode sequencer causes a store of the third set of at least one micro-operation into a system memory coupled to the processor, and sends, to the execution circuit, a fifth set of at least one micro-operation that, when executed, causes the third set of at least one micro-operation to be loaded into the cache from the system memory.

50. The processor of claim 49, wherein the microcode sequencer causes the fifth set to be executed when the core is transitioned to a power state that turns on the voltage to the core.

51. A method comprising:
   fetching a first instruction, a second instruction, and a third instruction with a fetch circuit of a core of a processor;
   decoding the first instruction into a first set of at least one micro-operation with a decoder circuit of the core;
   sending the first set of at least one micro-operation from the decoder circuit to an execution circuit of the core;
   storing a third set of at least one micro-operation for the third instruction in a section of a cache that stores context information from the core when the core is transitioned to a power state that shuts off voltage to the core;
   sending, by a microcode sequencer of the core, a second set of at least one micro-operation stored in a read-only memory of the microcode sequencer for the second instruction to the execution circuit of the core;
   loading, by the microcode sequencer of the core, the third set of at least one micro-operation into a patch memory of the microcode sequencer from the section of the cache;
   sending, by the microcode sequencer of the core, the third set of at least one micro-operation from the patch memory to the execution circuit; and
   executing the first set, the second set, and the third set of micro-operations with the execution circuit of the core, wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete.

52. The method of claim 51, wherein the power state is a C6 power state according to an Advanced Configuration and Power Interface (ACPI) standard.

53. The method of claim 51, further comprising, in response to receipt of a request for the third instruction, the microcode sequencer causing execution of a fourth set of at least one micro-operation from the read-only memory that causes the loading of the third set of at least one micro-operation into the patch memory of the microcode sequencer from the section of the cache, and the sending of the third set of at least one micro-operation from the patch memory to the execution circuit.

54. The method of claim 51, further comprising storing firmware including an instruction in non-transitory storage coupled to the processor, wherein decoding and executing of the instruction from the firmware by the processor causes the storing of the third set of at least one micro-operation into the section of the cache.

55. The method of claim 51, further comprising:
storing a fourth set of at least one micro-operation for a fourth instruction in the section of the cache that stores context information from the core when the core is transitioned to the power state that shuts off voltage to the core;
fetching the fourth instruction by the fetch circuit;
loading, by the microcode sequencer of the core, the fourth set of at least one micro-operation into the patch memory of the microcode sequencer from the section of the cache;
sending, by the microcode sequencer of the core, the fourth set of at least one micro-operation from the patch memory to the execution circuit; and
executing the fourth set of at least one micro-operation with the execution circuit of the core.

56. The method of claim 51, further comprising:
storing a copy of the third set of at least one micro-operation in a system memory coupled to the processor; and
storing a fourth set of at least one micro-operation into the patch memory, wherein the microcode sequencer causes execution of the fourth set to cause the third set of at least one micro-operation to be loaded into the section of the cache from the system memory.

57. The method of claim 56, further comprising causing the fourth set to be executed when the core is transitioned to a power state that turns on the voltage to the core.

58. A non-transitory machine readable medium that stores code that when executed by a machine causes the machine to perform a method comprising:
fetching a first instruction, a second instruction, and a third instruction with a fetch circuit of a core of a processor;
decoding the first instruction into a first set of at least one micro-operation with a decoder circuit of the core;
sending the first set of at least one micro-operation from the decoder circuit to an execution circuit of the core;
storing a third set of at least one micro-operation for the third instruction in a section of a cache that stores context information from the core when the core is transitioned to a power state that shuts off voltage to the core;
sending, by a microcode sequencer of the core, a second set of at least one micro-operation stored in a read-only memory of the microcode sequencer for the second instruction to the execution circuit of the core;
loading, by the microcode sequencer of the core, the third set of at least one micro-operation into a patch memory of the microcode sequencer from the section of the cache;
sending, by the microcode sequencer of the core, the third set of at least one micro-operation from the patch memory to the execution circuit; and
executing the first set, the second set, and the third set of micro-operations with the execution circuit of the core, wherein, at least when the loading of the third set of at least one micro-operation into the patch memory overwrites at least one of a plurality of micro-operations stored in the patch memory, the method further comprises reloading, by the microcode sequencer, the at least one of the plurality of micro-operations that was overwritten when execution of the third set of at least one micro-operation is complete.

59. The non-transitory machine readable medium of claim 58, wherein the power state is a C6 power state according to an Advanced Configuration and Power Interface (ACPI) standard.

60. The non-transitory machine readable medium of claim 58, wherein the method further comprises, in response to receipt of a request for the third instruction, the microcode sequencer causing execution of a fourth set of at least one micro-operation from the read-only memory that causes the loading of the third set of at least one micro-operation into the patch memory of the microcode sequencer from the section of the cache, and the sending of the third set of at least one micro-operation from the patch memory to the execution circuit.

61. The non-transitory machine readable medium of claim 58, wherein the method further comprises:
storing a fourth set of at least one micro-operation for a fourth instruction in the section of the cache that stores context information from the core when the core is transitioned to the power state that shuts off voltage to the core;
fetching the fourth instruction by the fetch circuit;
loading, by the microcode sequencer of the core, the fourth set of at least one micro-operation into the patch memory of the microcode sequencer from the section of the cache;
sending, by the microcode sequencer of the core, the fourth set of at least one micro-operation from the patch memory to the execution circuit; and
executing the fourth set of at least one micro-operation with the execution circuit of the core.

62. The non-transitory machine readable medium of claim 58, wherein the method further comprises:
storing a copy of the third set of at least one micro-operation in a system memory coupled to the processor; and
storing a fourth set of at least one micro-operation into the patch memory, wherein the microcode sequencer causes execution of the fourth set to cause the third set of at least one micro-operation to be loaded into the section of the cache from the system memory.

63. The non-transitory machine readable medium of claim 62, wherein the method further comprises causing the fourth set to be executed when the core is transitioned to a power state that turns on the voltage to the core.

* * * * *